(12) United States Patent
Ikeda et al.

(10) Patent No.: US 6,731,446 B2
(45) Date of Patent: May 4, 2004

(54) METHOD FOR FORMING A MAGNETIC PATTERN IN A MAGNETIC RECORDING MEDIUM, METHOD FOR PRODUCING A MAGNETIC RECORDING MEDIUM, MAGNETIC PATTERN FORMING DEVICE, MAGNETIC RECORDING MEDIUM AND MAGNETIC RECORDING DEVICE

(75) Inventors: Hiroyuki Ikeda, Kanagawa (JP); Youji Arita, Kanagawa (JP); Masahiro Kawashima, Kanagawa (JP); Takeshi Kuriwada, Kanagawa (JP); Yuzo Seo, Kanagawa (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 216 days.

(21) Appl. No.: 09/773,610

(22) Filed: Feb. 2, 2001

(65) Prior Publication Data

US 2001/0048568 A1 Dec. 6, 2001

(30) Foreign Application Priority Data

| Feb. 3, 2000 | (JP) | 2000-025854 |
| Feb. 25, 2000 | (JP) | 2000-048721 |
| Mar. 17, 2000 | (JP) | 2000-075226 |
| Apr. 12, 2000 | (JP) | 2000-110418 |
| May 8, 2000 | (JP) | 2000-134611 |
| Aug. 2, 2000 | (JP) | 2000-234227 |
| Aug. 25, 2000 | (JP) | 2000-255876 |

(51) Int. Cl.[7] .................................................. G11B 5/02
(52) U.S. Cl. ....................................... 360/59; 369/13.25
(58) Field of Search ........................... 360/59; 369/13.01, 369/13.02, 13.24, 13.25

(56) References Cited

U.S. PATENT DOCUMENTS 3,869,711 A  3/1975  Bernard et al.
4,733,944 A * 3/1988 Fahlen et al. ............... 350/167

(List continued on next page.)

FOREIGN PATENT DOCUMENTS

| DE | 196 51 579 | 6/1997 |
| EP | 0125535 | 11/1984 |
| EP | 0 899 721 | 3/1999 |
| EP | 0915456 | 5/1999 |
| JP | 60-64376 | 4/1985 |
| JP | 62-43816 | 2/1987 |
| JP | 62-192025 | 8/1987 |
| JP | 63-166050 | 7/1988 |
| JP | 4-34744 | 2/1992 |
| JP | 7-65536 | 3/1995 |
| JP | 7-73509 | 3/1995 |
| JP | 8-45114 | 2/1996 |
| JP | 8-161750 | 6/1996 |
| JP | 11-213310 | 8/1999 |
| WO | WO 99/30318 | 6/1999 |
| WO | WO 01/35396 | 5/2001 |

OTHER PUBLICATIONS

Johnson et al, Sep. 1996, "Thin–film media—Current and future technology", IBM J. Res. Develop., vol. 40, No. 5, pp. 527–531.*

(List continued on next page.)

Primary Examiner—Andrew L. Sniezek
Assistant Examiner—Dan I. Davidson
(74) Attorney, Agent, or Firm—Oblon, Spivak, McClelland, Maier & Neustadt, P.C.

(57) ABSTRACT

A method and device for forming a magnetic pattern in a magnetic recording medium, a magnetic recording medium formed thereby and a magnetic recording device that includes a magnetic recording medium formed by this method and/or device. The magnetic recording medium has a magnetic layer, a protective layer, and a lubricant layer formed on a substrate in this order, and the magnetic pattern is formed by locally heating the magnetic layer and applying an external magnetic field to the magnetic layer.

60 Claims, 27 Drawing Sheets

U.S. PATENT DOCUMENTS

| | | | |
|---|---|---|---|
| 4,797,303 A | | 1/1989 | Frew et al. |
| 5,175,642 A | * | 12/1992 | Funato .................. 359/298 |
| 5,248,990 A | | 9/1993 | Ishikawa et al. |
| 5,270,987 A | * | 12/1993 | Kaku et al. ................ 369/13 |
| 5,289,231 A | | 2/1994 | Magome et al. |
| 5,325,244 A | | 6/1994 | Takano et al. |
| 5,353,268 A | * | 10/1994 | Hintz ........................ 369/13 |
| 5,389,954 A | * | 2/1995 | Inaba et al. ............... 347/258 |
| 5,486,276 A | | 1/1996 | Kitamoto et al. |
| 5,502,001 A | | 3/1996 | Okamoto |
| 5,858,477 A | * | 1/1999 | Veerasamy et al. ......... 427/562 |
| 5,928,759 A | | 7/1999 | Arita et al. |
| 5,976,714 A | | 11/1999 | Arita et al. |
| 5,981,902 A | | 11/1999 | Arita et al. |
| 5,991,104 A | | 11/1999 | Bonyhard |
| 6,055,139 A | | 4/2000 | Ohtsuka et al. |
| 6,057,984 A | | 5/2000 | Arita et al. |
| 6,078,385 A | | 6/2000 | Yoshiyama et al. |
| 6,217,970 B1 | | 4/2001 | Arita et al. |
| 6,359,747 B1 | * | 3/2002 | Kuo .......................... 360/75 |
| 6,455,174 B1 | * | 9/2002 | Takao et al. ............... 428/632 |
| 6,490,117 B1 | * | 12/2002 | Sacks et al. ................ 360/75 |

OTHER PUBLICATIONS

Ross et al, Feb. 1999, "Digital Archaeology: Rescuing Neglected and Damaged Data Resources", JISC, p. 18.*

"Readback Properties of Novel Magnetic Contact Duplication of High Recording Density Floppy Disk" M. Nishikawa et al. p. 1–4 Apr. 2000.

"High–Density Storage by Means of Magnetic Holography on Amorphous Tb–Fe Thin Films"; p. 223 H. Horimai, et al. Nov. 1983.

Patent Abstracts of Japan, JP 57 092437, Jun. 9, 1982.

Patent Abstracts of Japan, JP 03 037845, Feb. 19, 1991.

Patent Abstracts of Japan, JP 62 043816, Feb. 25, 1987.

W. Kautek, et al., Database Inspect Online, AN 6103497, XP–002198092, pp. 1–2, "Doped Diamond–Like Carbon Films Grown by Large Area Ultra–High Vacuum pulsed Laser Deposition", Aug. 31–Sep. 5, 1997.

U.S. patent application Ser. No. 09/773,610, filed Feb. 2, 2001.

U.S. patent application Ser. No. 09/854,679, filed May 15, 2001.

U.S. patent application Ser. No. 09/773,610, filed Feb. 2, 2001.

U.S. patent application Ser. No. 10/022,875, filed Dec. 20, 2001.

U.S. patent application Ser. No. 10/058,872, filing date unknown.

U.S. patent application Ser. No. 09/773,610, filed Feb. 2, 2001.

U.S. patent application Ser. No. 10/212,688, filed Aug. 7, 2002.

* cited by examiner

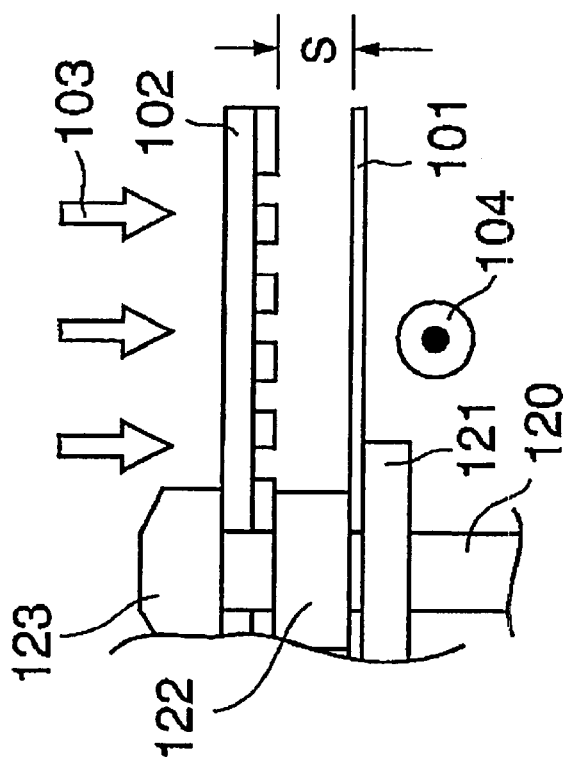
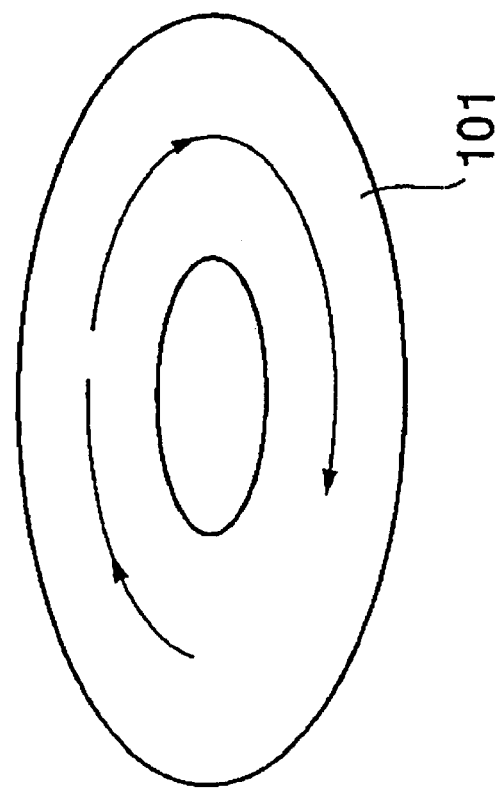

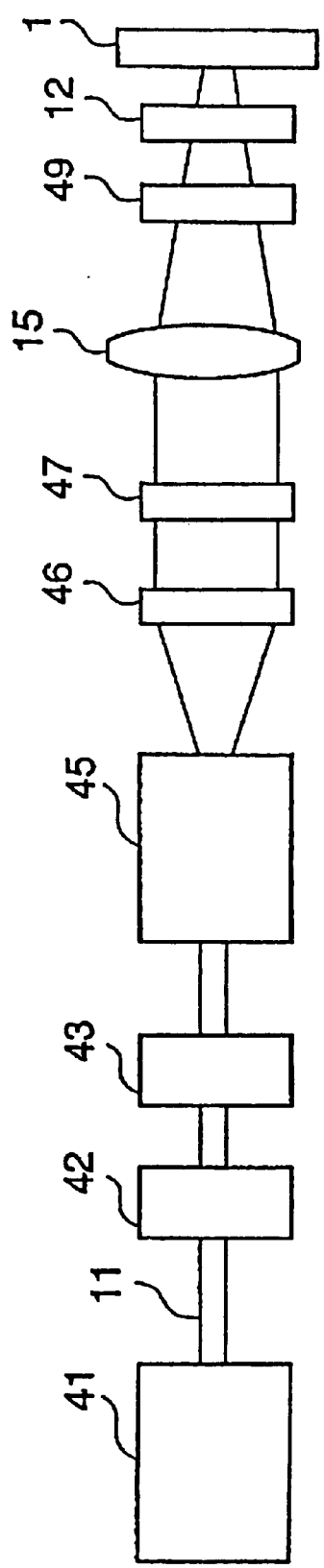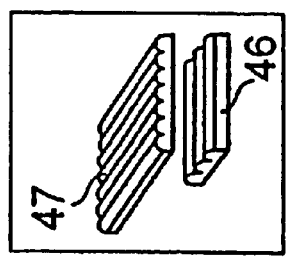
FIG. 5A
FIG. 5B

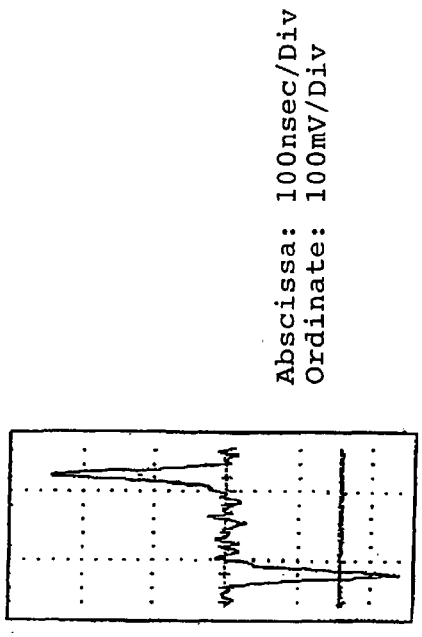
F I G. 24(a)
Abscissa: 100nsec/Div
Ordinate: 100mV/Div
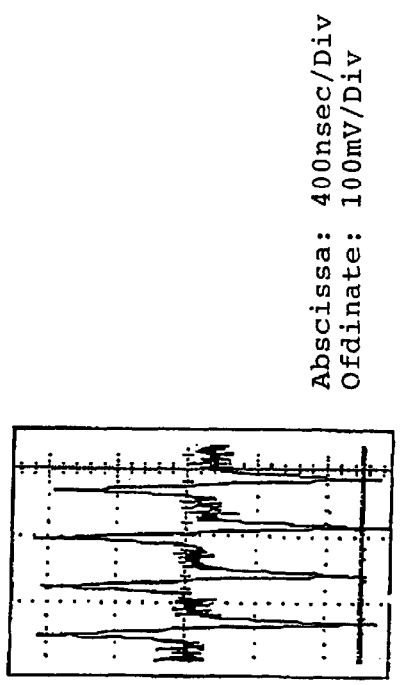
F I G. 24(b)
Abscissa: 400nsec/Div
Ofdinate: 100mV/Div
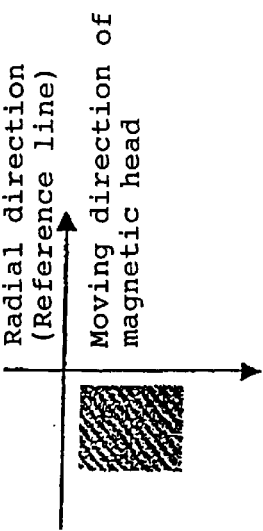
F I G. 24(c)
Radial direction (Reference line)
Moving direction of magnetic head

- INDICATE AN ERROR
- A LARGE MARK INDICATES A CONCENTRATION OF ERRORS
  THE NUMERAL IN THE BOX INDICATES THE NUMBER OF ERRORS

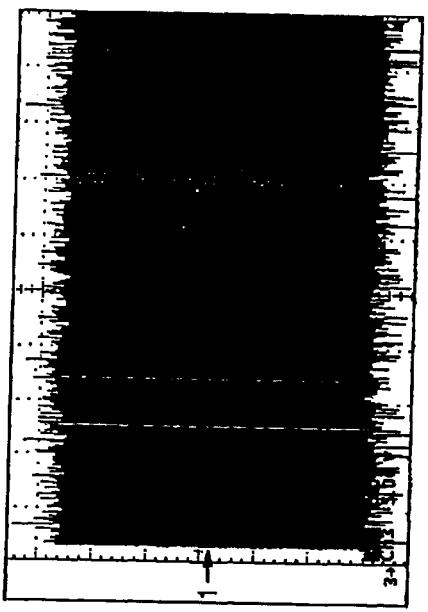
FIG. 27(c) (θ=35°)
Abscissa : 2msec/Div
Ordinate : 200mV/Div
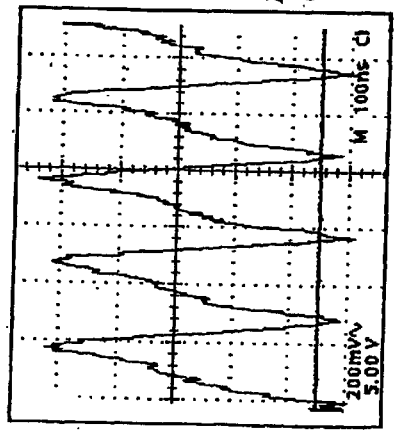
FIG. 27(a)
Abscissa : 100nsec/Div
Ordinate : 200mV/Div
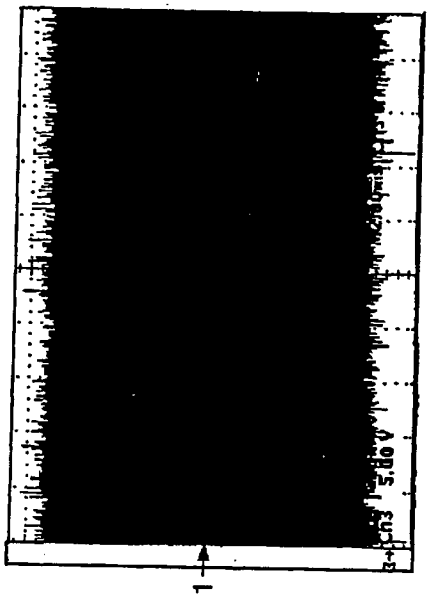
FIG. 27(b) θ=0°
Abscissa : 2msec/Div
Ordinate : 200mV/Div Magnetic field intensity of horizontal component in the vicinity of each magnet 61, 61': 1.9 KG 62, 62': 1.9 KG 63, 63': 1.9 KG 64, 64': 1.9 KG 65, 65': 1.9 KG

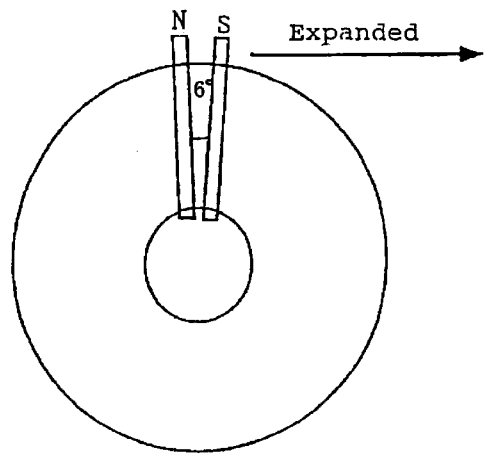
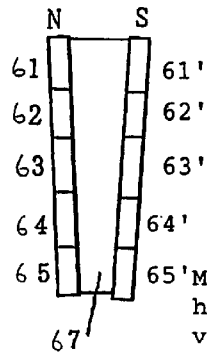
FIG. 30
Magnetic field intensity of horizontal component in the vicinity of each magnet
61, 61': 2.7 KG
62, 62': 2.3 KG
63, 63': 1.9 KG
64, 64': 1.5 KG
65, 65': 1.2 KG
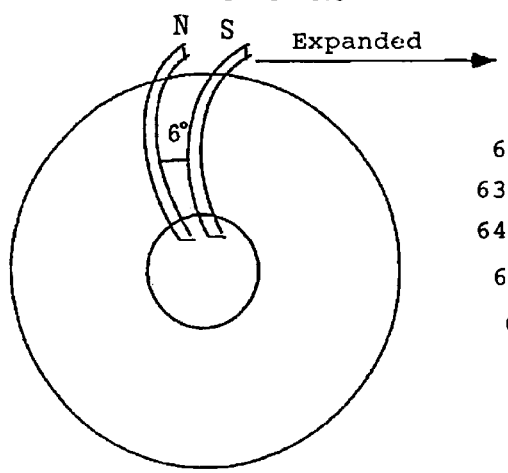
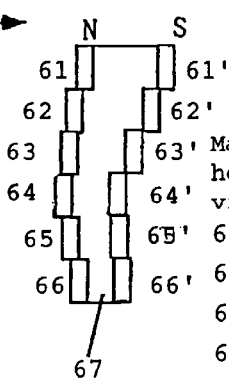
Magnetic field intensity of horizontal component in the vicinity of each magnet
61, 61': 2.7 KG
62, 62': 2.3 KG
63, 63': 1.9 KG
64, 64': 1.6 KG
65, 65': 1.4 KG
66, 66': 1.2 KG
FIG. 31

METHOD FOR FORMING A MAGNETIC PATTERN IN A MAGNETIC RECORDING MEDIUM, METHOD FOR PRODUCING A MAGNETIC RECORDING MEDIUM, MAGNETIC PATTERN FORMING DEVICE, MAGNETIC RECORDING MEDIUM AND MAGNETIC RECORDING DEVICE

CROSS-REFERENCE TO RELATED APPLICATIONS

This applications claims the priority of Japanese Patent Nos. 2000-025854, 2000-048721, 2000-075226, 2000-110418, 2000-134611, 2000-234227, 2000-255876, the contents of all of which are incorporated herein by reference.

BACKGROUND OF THE INVENTION

1. Field of the Invention

The present invention relates to a method for forming a magnetic pattern in a is magnetic recording medium used for a magnetic recording device, a magnetic recording medium, or a magnetic recording device. In particular, the present invention relates to a method for forming a magnetic pattern in a magnetic recording medium, a magnetic recording medium, or a magnetic recording device wherein the magnetic recording medium has a magnetic layer, a protective layer, and a lubricant layer, where a flying/contact magnetic head used for recording or reproducing.

2. Background of the Invention

Magnetic recording devices such as a magnetic disk device (a hard disk drive) have widely been used as external memory devices for information processing devices such as computers, and have recently been used as recording devices for devices for recording dynamic images or set-top boxes.

A typical magnetic disk device includes a shaft for holding a single or plurality of magnetic disks while penetrating the center of the magnetic disk or disks, a motor for rotating the magnetic disk or disks that is or are connected to the shaft by interposing a bearing or bearings, a magnetic head for recording/reproduction information, an arm for supporting the magnetic head, and an actuator for moving the magnetic head via the arm to a desired position on the magnetic recording medium. As the recording/reproduction head, a flying magnetic head capable of moving above the magnetic recording medium at a constant flight height is generally used.

In addition to a flying magnetic head, a contact magnetic head is proposed in order to reduce the distance from the magnetic head to the medium. The magnetic recording medium to be placed in the magnetic disk device is prepared, in general, by forming a NiP layer on the surface of a substrate that includes an aluminum alloy, applying a smoothening treatment, a texturing treatment, or the like thereon, and then forming a metallic underlayer, a magnetic layer (an information recording layer), a protective layer, a lubricant layer, and the like in this order thereon. Or, the magnetic recording medium is prepared by forming a metallic underlayer, a magnetic layer (an information recording layer), a protective layer, a lubricant layer, and the like on the surface of a substrate made of glass or the like. The magnetic recording medium includes a longitudinal magnetic recording medium and a perpendicular magnetic recording medium. In the longitudinal magnetic recording medium, longitudinal recording is generally conducted.

The rate of increase in the density of magnetic recording media is increased year by year, and various techniques for increasing density have been proposed. For example, there are attempts to make the flying height of the magnetic head smaller, to employ a GMR head as the magnetic head, to improve a magnetic material used for the recording layer of the magnetic disk so as to have a strong coercive force, and to reduce the space between tracks for recording information in the magnetic disk. For example, a density of track of 100 ktpi or more is needed in order to realize 100 Gbit/inch$^2$.

In each track, a magnetic pattern for controlling the magnetic head is formed. For example, it produces signals used for controlling the position of the magnetic head or signals used for synchronous control. When the space between adjacent information recording tracks is narrowed to increase the number of tracks, it is necessary to increase the density of the signals for controlling the position of a data-recording/reproduction head (hereinbelow, referred to as "a servo signal") in the radial direction of the disk. In other words, in response to the increased number of tracks, an increased number of signals for controlling the position of a data-recording/reproduction head much is required so that precision control can be performed.

Further, there is an increased demand for increases in the width of the data recording area. This would allow an increase in the data recording capacity by reducing the surface area not used for recording data, namely, the servo areas used for recording servo signals and the gap portions between the servo areas and the data recording areas. Thus, it is necessary to increase the data content of the servo signals or to increase the accuracy of synchronizing signals.

In a conventional method that is used widely in manufacturing, an opening is formed in the vicinity of the head actuator of the drive (magnetic recording device) and a pin with an encoder is inserted into the opening to engage the actuator with the pin. Servo signals are then recorded by moving the head to a correct position. However, methods based upon this approach encountered difficulty in correctly recording the servo signals because the position of the center of gravity of the actuator was different from the position of the center of gravity of a positioning mechanism, so that highly accurate track position control could not be obtained.

On the other hand, it has been proposed that laser beams be irradiated onto a magnetic disk to locally deform the surface of the disk. Minute projections and recesses can thus be physically formed and servo signals recorded by the minute projections and recesses. In this technique, however, there are problems such as the fact that: the projections and recesses make the flying magnetic head unstable and adversely influence the recording and/or reproduction of information; costly high power lasers are necessary for forming the projections and recesses; and relatively large amounts of time were required to successively form the individual projections and recesses.

In view of the above, several servo signal forming methods have been proposed.

For example, in one method a servo pattern is formed in a master disk having a magnetic layer with a high coercive force. The master disk is brought into close contact with a magnetic recording medium and then an external auxiliary magnetic field is applied to the magnetic recording medium, thus printing a magnetic pattern, as described in U.S. Pat. No. 5,991,104.

In another exemplary method, a medium that has previously been magnetized along a certain direction is formed. First, a ferromagnetic layer that includes a soft magnetic layer is formed by patterning on a master disk, and the master disk is brought into close contact with the medium.

Then, an external magnetic field is applied. The soft magnetic layer functions as a shield, and a magnetic pattern is printed to an unshielded area, as described in Japanese Patent JP-A-50-60212, U.S. Pat. No. 3,869,711, Japanese Patent JP-A-10-40544, EP915456, and the article "Readback Properties of Novel Magnetic Contact Duplication Signals with High Recording Density FD" authored by R. Sugita et al., and published by IEEE in the Digest of InterMag 2000, GP-06 on Apr. 9, 2000.

With respect to forming a shield or using a magnetic recording source, the above-mentioned techniques use a master disk, and a magnetic pattern is formed in the medium by applying a strong magnetic field.

The intensity of a magnetic field generally is a function of distance. When a magnetic pattern is recorded by applying a magnetic field, the transitions in the magnetic pattern are apt to be blurred due to a leakage of the magnetic field. Accordingly, it is necessary to bring the master disk into intimate contact with the medium in order to minimize the influence of the leakage of the magnetic field. As the magnetic pattern becomes finer, it is necessary to intimately contact the master disk to the medium without any gap. Usually, both members are press-contacted using vacuum suction.

Further, the higher that the coercive force of the medium is, the larger the magnetic field required for transfer and, accordingly, the leakage of the magnetic field increases. Therefore, nearly perfect contact is required.

The above-mentioned techniques are applicable to a magnetic disk having a low coercive force or a flexible floppy disk that is easy to press contact. However, it is very difficult to use a magnetic disk for high density recording that includes a hard substrate where the coercive force is 3,000 Oe or more using these techniques.

Namely, with a magnetic disk that includes a hard substrate, there is the possibility that fine dust will deposit thereon before or during contact, causing a defect in the medium or even damaging the expensive master disk. In the particular case of a glass substrate, the deposition of dust may cause insufficiently close contact and it may become impossible to conduct magnetic printing. In some case, the magnetic recording medium cracked.

Further, in the technique described in Japanese Patent JP-A-50-60212 and U.S. Pat. No. 3,869,711, patterns at an angle oblique to the direction of tracks in a disk possessed only weak signal intensities, although recording was still possible. For a magnetic recording medium having a relatively high coercive force of 2,000–2,500 Oe or more, it is essential that a ferromagnetic material (as a shielding material) for forming a pattern in the master disk (such as permalloy or a soft magnetic material having a large saturation magnetic flux density such as sendust) be used in order to assure a sufficient magnetic field intensity for printing.

However, in the case of oblique patterns, a magnetic field formed by reversing the magnetization was oriented in a direction perpendicular to the gap produced by the ferromagnetic layer of the master disk, and it was impossible to incline the magnetization in a desired direction. As a result, a part of the magnetic field escapes into the ferromagnetic layer and a sufficient magnetic field could not be applied to a desired position during magnetic printing. Thus, a sufficient pattern of reversed magnetization could not be obtained, and it was difficult to produce high intensity signals. The reduction of a reproduced output using the oblique magnetic pattern was larger than the reduction by an azimuth loss, in comparison with a magnetic pattern perpendicular to the tracks.

SUMMARY OF THE INVENTION

Accordingly, it is one object of the present invention to provide a method of forming a magnetic pattern capable of efficiently and accurately forming various fine magnetic patterns without damaging the medium or the mask and without increasing defects in the medium.

It is another object of the present invention to provide a magnetic recording medium and a magnetic recording device that are capable of high density recording and can be produced in a short time in an economical manner.

The inventors of this application have studied extensively on the problems described above and have achieved the present invention by recognizing that a magnetic pattern can be effectively and accurately formed in a magnetic recording medium by combining local heating of the magnetic layer and with the application of an external magnetic field to the magnetic layer.

In accordance with a first aspect of the present invention, a method for forming a magnetic pattern in a magnetic recording medium having a magnetic layer, a protective layer, and a lubricant layer formed, in this order, on a substrate is described. This method is characterized by including local heating the magnetic layer and the application of an external magnetic field to the magnetic layer.

According to a second aspect of the present invention, a magnetic recording medium with a magnetic pattern is described. This magnetic pattern can be formed by the method for forming a magnetic pattern described in the first aspect of the present invention.

According to a third aspect of the present invention, a magnetic recording device is described. This magnetic recording device includes a magnetic recording medium in which a magnetic pattern is formed by the method of forming a magnetic pattern described in the first aspect, a driver configured to drive the magnetic recording medium in a recording direction, a magnetic head that includes a recording portion and a reproducing portion, a motion mechanism configured to move the magnetic head relative to the magnetic recording medium, and a recording/reproduction signal processor that supplies a recording signal to the magnetic head and receives a reproducing signal from the magnetic head.

According to a fourth aspect of the present invention, a magnetic pattern forming device is described. In this magnetic pattern forming device, a magnetic pattern is formed in a magnetic recording medium including a magnetic layer on a substrate by irradiating energy beams onto the magnetic recording medium to locally heat the magnetic layer and applying an external magnetic field to the magnetic layer. The magnetic pattern forming device is characterized in that it includes a medium support configured to hold the magnetic recording medium, an external magnetic field source configured to apply the external magnetic field to the magnetic recording medium, an energy beam source configured to emit energy beams, an energy beam irradiation device configured to direct the energy beams emitted from the energy beam source toward the magnetic recording medium, and a mask which is located between the energy beam source and the magnetic recording medium to change the spatial intensity distribution of the energy beam in order to form a desired magnetic pattern.

According to a fifth aspect of the present invention, a method for producing a magnetic recording medium is described. This magnetic recording medium includes a magnetic layer, a protective layer, and a lubricant layer formed on a substrate in this order. A magnetic pattern is formed in the magnetic layer, and the method is characterized in that it includes a step of forming the magnetic layer and the protective layer on the substrate, a step of forming the lubricant layer on the protective layer, and a step of forming the magnetic pattern by local heating of the magnetic layer together with the application of an external magnetic field.

BRIEF DESCRIPTION OF THE DRAWINGS

A more complete appreciation of the invention and many of the attendant advantages thereof will be readily obtained as the same become better understood be reference to the following detailed description when considered in connection with the accompanying drawings, wherein FIG. 1 is a diagram that illustrates an exemplary method of forming a magnetic pattern according to the present invention;

FIG. 5 is a diagram of an exemplary optical system for irradiating energy beams according to the present invention;

FIGS. 24(a) and 24(b) are graphical representations of waveforms of reproducing signals in an embodiment of the present invention;

FIG. 24(c) shows a microphotograph of an exemplary magnetic pattern;

FIGS. 27(a)–27(c) show exemplary waveforms of reproducing signals in the present invention;

FIG. 30 is a diagram showing another exemplary external magnetic field source; and FIG. 31 is a diagram showing another exemplary external magnetic field source.

DETAILED DESCRIPTION OF THE PREFERRED EMBODIMENTS

Figure 2A:
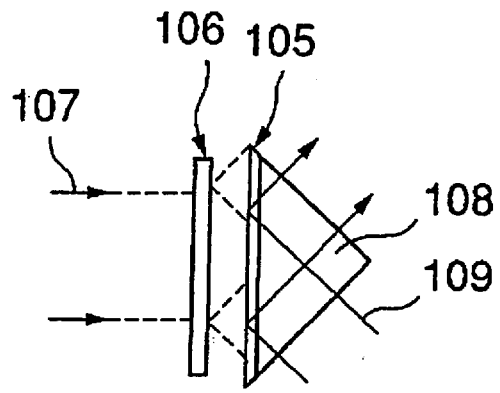
FIGS. 2(a)–2(c) are diagrams that illustrate another exemplary method of forming a magnetic pattern according to the present invention.

Other features of the invention will become apparent in the course of the following detailed description of exemplary embodiments which are given for illustration of the invention and are not intended to be limiting thereof.

In a first aspect of the present invention, a magnetic pattern is formed on a magnetic recording medium having a magnetic layer, a protective layer, and a lubricant layer formed on a substrate in this order by locally heating the magnetic layer and applying an external magnetic field to the magnetic layer.

According to the present invention, it is unnecessary to use a strong external magnetic field as in conventional techniques because local heating and the application of an external magnetic field are used in conjunction to form a magnetic pattern. Further, even when the magnetic field is applied to an area other than the heated area, this other area is not magnetized. Accordingly, the patterning can be limited to the heated area. Thus, the boundary of the magnetic domains is clear and, for a pattern of the magnetic domains, a small magnetic transition width, a steep magnetic transition at the boundary of the magnetic domains, and high quality output signals can be formed.

Further, it is unnecessary to press-contact the medium to the master disk as in conventional techniques. Accordingly, there is no danger of damaging the medium or the mask and increasing the defects in the medium.

Further, the formation of the protective layer on the magnetic layer prevents damage to the magnetic layer due to collisions with the magnetic head. The formation of the lubricant layer lubricates between the magnetic head and the medium. As a result, a flying and/or contact magnetic head can be used. If the surface of the disk before the formation of a magnetic pattern has a defect such as a projection, dust, or the like and energy beams are irradiated onto the surface, an irregular reflection results and a magnetic pattern formed at or around that area is disordered. Accordingly, in the present invention, it is important to use a defect-free medium. Therefore, it is desirable to inspect for defects by a magnetic head prior to the formation of the pattern to remove media having a defect prior to the formation of a magnetic pattern. For inspection by the magnetic head, a lubricant layer is preferably already formed on the medium. Accordingly, in the present invention, the formation of a lubricant layer before the formation of the magnetic pattern is the most efficient route for manufacturing. In addition, since the method of the present invention does not create an uneven surface on the medium and minimizes damage to and increases in the defects of the medium, the surface roughness of the medium can be minimized, and operations of the magnetic head flying above or contacting the medium can be stable. Accordingly, the distance between the magnetic layer and the head can be reduced by using the flying and/or contact head whereby the recording of high density information can be effectively conducted, especially in comparison to an optical disk or a magneto-optical disk using a magnetic head of another type.

In order to not adversely affect the formation of a magnetic pattern, the lubricant layer is preferably thin (i.e., 10 nm or less). However, the thickness of the layer is preferably 0.5 nm or greater in order to obtain a sufficient lubricating performance.

The protective layer serves to prevent damage to the magnetic layer due to collisions of the head or the penetration of dust between the magnetic layer and the mask. In the present invention, the protective layer also favorably prevents the oxidation of the heated magnetic layer. The magnetic layer can generally oxidize, especially when the magnetic layer is heated. In the present invention, since the magnetic layer is locally heated by energy beams, it is necessary to previously form the protective layer on the magnetic layer as an anti-oxidizing member.

It is preferable that the protective layer be thin because, if the layer is too thick, thermal conduction in a lateral direction can result and the magnetic transition area of a magnetic pattern may dull (broaden). Further, in the magnetic recording medium, it is desirable to make a hard protective layer thin in order to minimize the distance between the head and the magnetic layer. Accordingly, the thickness of the hard protective layer is preferably 50 nm or less. However, the thickness of the hard protective layer is preferably 0.1 nm or more in order to obtain sufficient durability.

An carbonic material is preferably used as the protective layer from the viewpoints of impact resistance and lubrication properties. In particular, diamond-like carbon is preferable because it functions to prevent damage to the magnetic layer during the application of energy beams and it is very resistant to damage of the magnetic layer due to collisions with the head. The magnetic pattern forming method of the present invention can be applied to an opaque protective layer such as a carbonic protective layer.

As a result of the present invention, an uneven surface is not created on the medium and the master disk is not brought into contact with the medium. Accordingly, the surface roughness of the medium after the formation of a magnetic pattern can be maintained as it was before the formation of a magnetic pattern, and there is no risk of causing instability with the flying and/or contact head. It is preferable that the surface roughness Ra be 3 nm or less. In this specification, the surface roughness Ra of the medium indicates the roughness of the medium surface (without including the lubricant layer) obtained by measurement over a measurement length of 400 $\mu$m with a contact finger surface roughness meter (Tencor P-12 Disk Profiler (KLA Tencor)), calculated according to JIS B0601.

The present invention is preferably applicable to the formation of a magnetic pattern having information for controlling a recording/reproduction device. The information for controlling can be used to a control a recording/reproduction device such as a magnetic head. For example, the information for controlling includes servo information which indicates the position of the magnetic head relative to a data track, address information showing a position of the magnetic head on the medium, synchronous information for controlling the recording/reproduction speed of the magnetic head, and the like. Further, the information for controlling also includes standard information upon which later-written servo information is based.

The magnetic pattern for controlling should be formed with high accuracy. In particular, the servo pattern is a pattern for controlling the position of data tracks. If the accuracy of the servo pattern is poor, position control of the head becomes rough and a data pattern with a higher accuracy than the servo pattern cannot be recorded.

Accordingly, as the recording density of the medium is increased, the servo pattern should be formed with increasing accuracy. Thus, when the recording density of the medium is high, the servo pattern should be accurately formed.

In the present invention, since a highly accurate servo pattern or standard pattern can be obtained, the present invention is remarkably effective when it is applied to, in particular, a magnetic recording medium of high density recording such as a magnetic recording medium having a track density of 40 kTPI or more.

Further, since a magnetic pattern that extends obliquely with respect to tracks can be formed, the present invention is particularly suitable for an oblique pattern of phase servo signals.

The present invention is advantageous in that a servo pattern can be recorded beyond an area where the head is movable without using a magnetic head. Accordingly, even when the head is out of a data recording area, the servo pattern detection range is widened and hence the head can easily be returned.

Further, in accordance with the present invention, it has been found that a fine magnetic pattern having a minimum width of 2 $\mu$m or less can be formed accurately.

It has been considered difficult to accurately form a pattern with a feature size in the order of $\mu$m in cases where energy beams are irradiated onto a medium through a gap formed between the medium and a mask (mask exposure). In particular, diffraction of the energy beams due to the mask results and the outer portion of the pattern becomes unclear.

In the present invention, however, the entirety of an area subject to energy beam irradiation is not magnetized by an external magnetic field, but rather only an area heated to a magnetization erasure temperature or higher in the irradiated area is magnetized. Namely, when the temperature does not exceed the threshold value, the influence of the external magnetic field is minimal and the blurring of the pattern caused by the diffraction light can be significantly reduced and a fine pattern with a feature size in the order of $\mu$m can be formed. There is no lower limit on the feature size when forming patterns, and a fine pattern can theoretically be formed at the diffraction limit of the energy beams. For example, with an excimer laser, a pattern with a feature size on the order of about 100 nm is possible.

According to a method of the present invention, a precise magnetic pattern can easily be formed in a magnetic disk in a short time while defects can be minimized and the surface roughness is kept small. Accordingly, the influence of the present invention in practical applications is overwhelmingly positive when applied to a medium for recording/reproduction information with a flying and/or contact magnetic head.

A fairly long time ago, it was proposed to apply a technique to a magneto-optical recording medium wherein light is irradiated onto the magneto-optical recording medium through a mask to thereby form magnetic domains (as described in, e.g., "High Density Magnetic Holography Using Non-Crystal Thin TbFe Film" (1983, November), the 7th Japan Applied Magnetism Academy Lecture Summaries, 9pA-11, Japanese Patent JP-A-60-64376, Japanese Patent JP-A-63-166050, and Japanese Patent JP-A-60-35336 (EP125535A)). The magneto-optical recording medium indicates a medium that is reproduced by employing the Kerr effect or the Faraday effect.

However, these proposed techniques have not been practically implemented since, in the magneto-optical recording medium, projections and recesses for control information or guide grooves for tracking are formed in the resinous substrate. In the magneto-optical recording medium, the distance between the recording layer and the optical head is about 1 mm. Accordingly, projections and recesses in the recording layer do not cause significant problems. It is unnecessary to form magnetic patterns for the control information because injection molding, which is inexpensive and convenient, can be used for forming the projections and recesses in the resinous substrate.

On the other hand, recording and reproduction are conducted in the present invention on the magnetic recording medium using a flying magnetic head. Accordingly, the magnetic recording medium has a unique structure in that the protective layer and the lubricant layer are provided to protect the magnetic layer, and the formation of projections and recesses in the substrate is extremely rare. In the present invention, a magnetic pattern can be formed even in such magnetic recording medium by combining a heat treatment and application of an external magnetic field.

The following four methods are exemplary of the present invention in that they combine local heating of the magnetic layer with the application of an external magnetic field to the magnetic layer.

Method 1: Before heating, a strong external magnetic field is applied to a magnetic layer to uniformly magnetize the magnetic layer along a desired direction. Then, a selected area of the magnetic layer is heated to a magnetization erasure temperature, e.g., around the Curie temperature, to remove the magnetization in this selected area and thereby form a magnetic pattern. In this method, the magnetic pattern can be formed relatively easily. Further, since the magnetic layer is uniformly magnetized, magnetic recording can be conducted as usual after the formation of the magnetic pattern.

Method 2: Before heating, a strong external magnetic field is applied to a magnetic layer to uniformly magnetize the magnetic layer along a desired direction. Then, a selected area of the magnetic layer is heated to a magnetization erasure temperature, e.g., around the Curie temperature, and, at the same time, a weak magnetic field is applied to that area along a direction different than the uniform magnetization direction to thereby remove the magnetization in this selected area. Thereby, a magnetic pattern is formed. In this method, almost complete erasure can be achieved, and therefore, a magnetic pattern that is capable of producing strong signals can be obtained.

Method 3: Heating and the application of a weak external magnetic field are conducted simultaneously to thereby magnetize only the heated area in a direction along the external magnetic field, thereby forming a magnetic pattern. In this method, the magnetic pattern is relatively easy to form. Further, the applied external magnetic field may be relatively weak.

Method 4: Before heating, a strong external magnetic field is applied to a magnetic layer to uniformly magnetize it along a desired direction. Then, a selected area of the magnetic layer is heated and, at the same time, a weak magnetic field is applied to the selected area along a direction opposite to the uniform magnetization direction to thereby magnetize the area whereby a magnetic pattern is formed. In this method, a magnetic pattern that produces the strongest signals and excellent C/N (carrier to noise) and S/N (signal to noise) is obtainable.

Method 1 will now be described in more detail.

A strong external magnetic field is applied to the magnetic disk to uniformly magnetize the entire magnetic layer along a desired magnetization direction. A device that is suitable for applying the external magnetic field may be a magnetic head. A plurality of electromagnets or permanent magnets may be arranged so that magnetic fields are produced along the desired magnetization direction(s). Further, a combination of such members with other devices and/or mechanisms may be used.

The desired magnetization direction indicates the same direction as or the opposite direction to the translation direction of the data recording/reproduction head (the direction of relative movement between the medium and the head) in the case where a medium in which the easily magnetizable axis extends along a longitudinal direction is used. Further, the desired magnetization direction indicates a perpendicular direction (an upward direction or a downward direction) in the case where a medium in which the easily magnetizable axis extends vertically with respect to the longitudinal direction is used. Accordingly, the external magnetic field is applied so as to magnetize the magnetic layer along a desired magnetization direction as described above.

The uniform magnetization of the entire magnetic layer in a desired direction means that the majority of the magnetic layer is magnetized in substantially the same direction. In a strict sense, however, it is not always necessary to magnetize the entirety of the magnetic layer, but rather only an area where a magnetic pattern is to be formed may be magnetized.

The intensity of the magnetic field varies depending on the characteristics of the magnetic layer of the magnetic recording medium. It is preferable that the magnetic layer be magnetized by a magnetic field having a coercive force twice as large as the coercive force of the magnetic layer at room temperature. When it is weaker than that value, magnetization may be insufficient. However, magnetization should be carried out with a coercive force of about 5 times or less than the coercive force of the magnetic layer at room temperature.

After magnetization, a selected portion of the surface of the magnetic layer of the magnetic disk is heated to a magnetization erasure temperature of the magnetic layer, e.g., around the Curie temperature, to thereby erase the magnetization of this portion. In this case, the magnetized area need not be perfectly erased, and a state where the selected portion of the magnetic layer is more weakly magnetized than the uniformly magnetized area in the desired magnetization direction may result.

In Method 2, the direction and the intensity of the external magnetic field before heating are the same as those in Method 1. The direction of the magnetic field applied at the same time as the heat is perpendicular to the longitudinal direction in the case of a medium in which the easily magnetizable axis extends in the longitudinal direction, or the longitudinal direction of the medium in the case where the easily magnetizable axis extends perpendicular to the longitudinal direction. The magnetization can be erased by applying such a magnetic field.

Further, the intensity of the magnetic field varies depending on the characteristics of the magnetic layer of the magnetic recording medium. The higher that the intensity of the magnetic field is, the easier that the magnetic pattern is to form. However, the intensity of the applied magnetic field should be smaller than the coercive force of the magnetic layer at room temperature. It is preferable to apply a magnetic field with a coercive force of $\frac{1}{8}$ the coercive force of the magnetic layer or higher at room temperature. When the applied magnetic field is lower than this value, the heated area may be again magnetized in the same direction as the circumferential area due to the influence of magnetic domains in the circumferential area during cooling.

However, the applied magnetic field is preferably $\frac{2}{3}$ the coercive force of the magnetic layer at room temperature or less. When the applied magnetic field is larger, the magnetic domains in the circumferential areas of the heated area may be affected. More preferably, the applied magnetic field is $\frac{1}{2}$ the coercive force of the magnetic layer at room temperature or less.

Heating should be conducted to the extent such that the coercive force of the magnetic layer is decreased. The temperature during heating is the magnetization erasure temperature and, e.g., can be around the Curie temperature. The temperature during heating is preferably 100° C. or higher. A magnetic layer that can be easily magnetized under the influence of an external magnetic field at temperatures of 100° C. or below is also unstable at room temperature. Further, the temperature during heating is preferably 700° C. or below. When the temperature during heating exceeds this temperature, the magnetic layer may possibly be deformed.

In Method 3, the direction of the external magnetic field applied during heating varies depending on the nature of the magnetic layer of the magnetic recording medium. When a medium in which the easily magnetizable axis extends in a longitudinal direction is used, the external magnetic field should be applied to the magnetic layer so that the magnetic layer is magnetized in the same or the opposite direction to the translation direction of the data writing/reproducing head (the direction of movement of the medium relative to the magnetic head). When a medium in which the easily magnetizable axis extends perpendicular to the longitudinal direction is used, the magnetic field should be applied to the magnetic layer so that the magnetic layer is magnetized in the perpendicular direction (an upward direction or a downward direction).

The intensity of the magnetic field is the same as the intensity of the external magnetic field applied during heating in Method 2. Further, the temperature during heating is also the same as that in Method 2.

In Method 4, the direction and the intensity of the external magnetic field applied before heating are the same as those in Method 1.

Although the intensity of the magnetic field applied during heating is the same as that in Method 2, the direction of the magnetic field is opposite to that applied prior to heating so that the magnetic layer is locally magnetized in the opposite direction. The temperature during heating is the same as in Method 2.

According to Method 4, a magnetic pattern is preferably formed through the application of an external magnetic field to the magnetic layer to uniformly magnetize the magnetic layer along a desired direction, followed by locally heating the magnetic layer and simultaneously applying an external magnetic field to thereby magnetize the heated area in a direction opposite to the desired direction. According to this method, magnetic domains having a magnetic direction of one direction and magnetic domains having the opposite direction can clearly be formed, and a magnetic pattern having a strong signal intensity and excellent C/N and S/N is obtainable.

Alternatively, according to Method 1, it is possible to produce a magnetic recording medium wherein the magnetic layer has a pattern that is not magnetized in a local area (or a pattern having a local area that is weakly magnetized along the desired direction). This is done in the larger area that has been uniformly magnetized in the desired direction. Such media can easily be produced in a very short time by uniformly magnetizing the entire surface of the medium in a single step, which is then followed by light exposure through a mask to erase local magnetization.

A description of a method of locally heating the magnetic layer in the present invention will now be given.

It is sufficient for the heating device to locally heat the surface of the magnetic layer. However, in consideration of the undesirable diffusion of heat and the desire to regulate the input of heat, it is preferable to use an energy beams heat source such as laser since it is relatively easy to control the power flux and the size of an area that is heated.

In this case, use of a mask is preferable because a plurality of magnetic patterns can be simultaneously formed by transmitting the energy beams through the mask. This technique can reduce the time required for magnetic pattern formation and is furthermore easy to use.

Moreover, it is preferable to generate pulsed energy beams rather than continuous irradiation in order to control the position of a heated area and heating temperature.

In particular, the use of a pulsed laser light source is desirable. A pulsed laser source can intermittently oscillate between lasing and not lasing in a series of pulses. Use of a pulsed laser source is preferable since a laser having a high peak power can be irradiated in a very short time and the storage of heat is minimized, especially relative to cases where a continuous laser is pulsed by an optical device such as an acoustic optical device (AO) or an electro-optical device (EO).

When the continuous laser is pulsed by such an optical device, the magnitude of the power in a pulse is substantially equal over the pulse width. On the other hand, in pulsed laser sources, for example, energy is resonantly stored in the pulsed laser source and a laser beams are emitted as a pulse. Accordingly, the power of a pulse is very large at its peak, and then decreases thereafter. In the present invention, use of the pulsed laser source is suitable because, during the formation of a magnetic pattern having a high contrast and high accuracy, it is preferred to quickly heat and cool.

The surface of a medium in which a magnetic pattern is formed should have a large temperature difference between times when the surface is illuminated and times when the surface is not illuminated by the pulsed energy beams. This increases the contrast ratio of the pattern and correspondingly allows an increase in the recording density. Accordingly, the substrate is preferably maintained at room temperature or lower when not illuminated by the pulsed energy beams. As used herein, room temperature is about 25° C. When the medium is locally heated by the pulsed energy beams and an external magnetic field is applied thereto at the same time, the external magnetic field may be continuously applied or pulsed in synchronization with the pulsed energy beams.

It is preferred that the wavelength of the energy beams be 1,100 nm or less. When the wavelength is within such range, a fine magnetic pattern is easily formed because the diffraction effect is small and resolution is increased. More preferably, the wavelength is 600 nm or less. Such wavelengths provide not only a high resolution but also minimize diffraction, whereby the distance between the mask and the magnetic recording medium can be relatively large. Thus, handling is made easier and the assembly of a magnetic pattern forming device is made easier. Further, the wavelength in standard lithographic approaches is preferably 150 nm or more. When the wavelength is less than 150 nm, the absorption of heat by conventional synthesized quartz masks is large, and insufficient heating may be caused. When the wavelength is 350 nm or more, optical glass can be used for the mask.

Specifically, an excimer laser (248 nm), a second harmonic wave (532 nm), a 3rd harmonic wave (355 nm) or a 4th harmonic wave (266 nm) of Q-switch YAG laser (1,064 nm), Ar laser (488 nm, 514 nm), or ruby laser (694 nm) can be used.

Although the power of the energy beams can be optimized in consideration of the magnitude of the external magnetic field, it is preferable that the power of the pulsed energy beams per pulse be 1,000 mJ/cm$^2$ or less. The application of more power may damage the surface of the magnetic recording medium and cause deformation. When the surface roughness Ra is increased to 3 nm or more, or the degree of undulation Wa is increased to 5 nm or more by the deformation, trouble may arise during movement of the flying and/or contact head.

Therefore, the power is preferably 500 mJ/cm$^2$ or less and, more preferably, 100 mJ/cm$^2$ or less. In this range, a magnetic pattern having a high resolution is easily formed even when a substrate with a relatively large thermal diffusivity is used. Further, the power is preferably 10 mJ/cm$^2$ or more. When a smaller power is used, the temperature rise in the magnetic layer is minimal and it is difficult to perform magnetic printing.

When the substrate used in the present invention is composed of metal such as Al or an alloy thereof, the substrate has a large thermal conductivity. In this case, the power is preferably in a range of 30–120 mJ/cm$^2$ so as not to cause the deformation of a magnetic pattern by the conduction of heat from the locally heated area to an undesired area, or to prevent physical damage of the substrate by the application of excessive amounts of energy.

In cases where the substrate is made from ceramics such as glass, the power is preferably in a range of 10–100 mJ/cm$^2$ because the thermal conductivity is small in comparison with Al or the like and the heat storage at positions where the pulsed energy beams are irradiated is large.

In cases where the substrate is made from a resin such as polycarbonate, the power is preferably in a range of 10–80 mJ/cm$^2$ because the heat storage at the position where the pulsed energy beams are irradiated is large and the melting point is low in comparison with glass.

Further, when thermal damage to the magnetic layer, the protective layer, and/or the lubricant layer by the energy beams is especially problematic, it is possible to increase the intensity of the simultaneously applied magnetic field while decreasing the power of the energy beams. For example, a potentially large magnetization intensity of 25–75% of the coercive force at room temperature can be applied to a longitudinally recording medium to thereby allow a decrease in the energy of the energy beams. In the case of perpendicularly recording media, a potentially large intensity of 1–50% of the coercive force at room temperature can be applied to reduce the energy of the energy beams.

When the pulsed energy beams are irradiated onto the magnetic layer through the protective layer and the lubricant layer, the lubricant layer may again be deposited after irradiation due to damage (e.g., decomposition, polymerization) to the lubricant.

It is desirable that the pulse width of the pulsed energy beams be 1 μsec or smaller. When the pulse width is wider, heat from the pulsed energy beams disperses in the magnetic recording medium and the resolution of the pattern is apt to decrease. With the power per pulse being equal, the pulse width should be shortened to (substantially) instantaneously generate a relatively large temperature increase while the dispersion of heat is small. The resolution of a magnetic pattern then tends to increase. More preferably, the pulse width is 100 nsec or smaller. By using a pulse width in this range, it is relatively easy to form a magnetic pattern at a high resolution even when a substrate made of a metal such as Al (and having a relatively high thermal conductivity) is used. In forming a pattern having a feature size of 2 μm or less, it is preferred that the pulse width be 25 nsec or smaller. Namely, in primary consideration of the resolution, the pulse width should be as short as possible. However, the pulse width is preferably 1 nsec or larger because the temperature rise should be maintained until the magnetization transition in the magnetic layer is completed.

As exemplary pulsed lasers, lasers that are capable of generating high frequency ultra-short pulses in picoseconds or femtoseconds, such as mode-locked lasers, are available. In a period in which several ultra-short pulses are applied at high frequency, the laser is not irradiated in a very short period between each ultra-short pulse. However, since the time between pulses is very short, the portion to be heated does not cool substantially. Namely, an area which is heated to more than the Curie temperature can be maintained at a temperature higher than the Curie temperature.

In such cases, accordingly, a continuous irradiation period (which includes the time in which no laser light is irradiated between each ultra-short pulse) is denoted as one pulse. Further, the integrated irradiation energy of the entire continuous irradiation period is denoted as the power (mJ/cm$^2$) per pulse.

Preferably, the spatial variation of the intensity of the energy beams in an energy irradiation area is 15%. In other words, the maximum intensity per unit area and the minimum intensity per unit area are within +/−7.5% of the weighted mean average of the total intensity. Thus, the temperature variations in the irradiated area can be minimized and the spatial variation of the intensity of magnetization of a magnetic pattern can also be minimized. Accordingly, a magnetic pattern having a highly uniform signal intensity can be formed when the signal intensity is read using a magnetic head.

Energy beams such as a laser generally have a spatial variation of intensity (a distribution of energy density) within a beam spot. Even when the energy beams are irradiated to locally heat, a temperature difference arises due to differences in energy density. Therefore, local differences in the intensity of magnetization due to uneven heating arise. When a pulsed laser such as an excimer laser or YAG-Q-switch laser is used, the intensity variation in a beam spot is generally within about 30%.

Accordingly, the spatial intensity variation of an energy beam at a beam spot should be reduced to be within 15%, for example, by using an energy beam source having a small spatial intensity variation, by passing only a portion of the energy beam having a small spatial intensity variation through a shade plate or the like wherein the transmitted portion may be expanded thereafter as needed, or by using a homogenizer or other optical element.

Energy beams that are previously subjected to such a treatment that equalizes their intensity spatial variation minimize the heat gradients within the irradiated area and therefore gradients in the magnetization of the irradiated area can also be suppressed. Accordingly, a magnetic pattern having a highly uniform signal intensity can be formed when the signal intensity is read using a magnetic head.

The intensity variation equalizing treatment may include the use of a homogenizer or other optical element(s), or transmitting only a portion of the energy beam that has a relatively small intensity distribution through a shade plate or a slit to the surface. The transmitted portion can be expanded thereafter as needed.

Preferably the energy beams are subjected to an equalizing treatment by optically dividing the energy beams into a plurality of portions and then overlaying the portions. In this case, the energy beams can be thoroughly and efficiently utilized. In the present invention, as described above, it is desirable to irradiate high intensity energy beams over a short time to heat the magnetic layer. It is thus preferable to use as much of the energy of the energy beams as possible without any losses.

Figure 6:
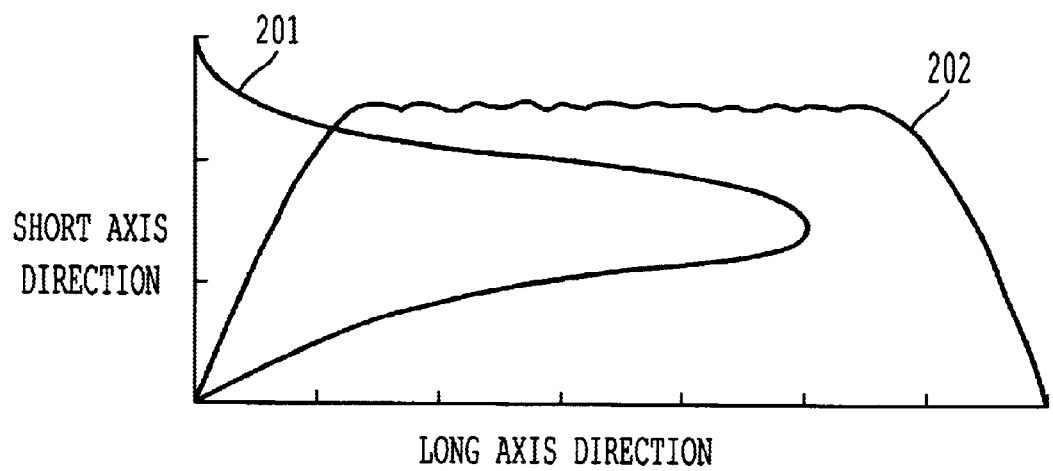
FIG. 6 is a diagram showing an energy density distribution of energy beams.

FIG. 6 is a diagram that illustrates an example of the intensity spatial distribution of energy beams and a method for dividing energy beams. Supposing that energy beams having an elliptic beam shape have a distribution 201 in the short axis direction and a distribution 202 in the long axis direction. In this case, the differences in intensity across the beam can be reduced by dividing the length of beam along the short axis direction into, for example, three portions using a prism array (cylindrical lens) or the like. The three divided portions can then be overlayed and thus the intensity distribution in the short axis direction can, to a certain extent, be equalized. Further, the intensity distribution in a long axis direction can be equalized to a certain extent by dividing the length of the beam in the long axis direction into, e.g., seven portions using a prism array (cylindrical lens) or the like and then overlaying the seven divided portions. By combining both of these approaches, highly uniform energy beams with small intensity distributions are obtainable. As needed, the division and overlay may be conducted for only one axis. When the distribution in intensity is large, the number of divisions should be increased to increase uniformity.

When energy beams are passed through two or more prism arrays in the same axial direction, a similar effect as that obtained by increasing the number of divisions can be obtained. Alternatively, the intensity distribution in two axial directions may be simultaneously divided using a fly eye lens having a number of lenses along the two axial directions.

Alternatively, the intensity distribution can be equalized by passing the energy beams through an aspheric lens such as a cylindrical lens. In particular, when the energy beams have a small beam diameter, a sufficient equalization can be performed using even this technique. Furthermore, the optical system can be simplified. As used herein, small diameter indicates a diameter of about 0.05–1 mm.

When equalization using the above-mentioned treatment (s) is insufficient, a shade plate may be added to cut a peripheral portion of the beam or choke the beam and provide further equalization.

In the present invention, energy beams are preferably irradiated through a mask to locally heat a desired area. The use of a mask allows the formation of a magnetic pattern of desired shape on the medium. Accordingly, complicated patterns or unique patterns which are difficult to form using conventional techniques can easily be formed.

In a phase servo system for a magnetic disk, for example, a magnetic pattern which extends from an inner periphery to an outer periphery, obliquely or linearly to the diameter of tracks, is used. It is difficult to form a pattern along the radial direction or a pattern oblique to the radial direction using conventional servo pattern forming methods wherein servo signals are recorded for each track while the disk is rotated. In the present invention, however, complicated calculations and/or complicated device structures are unnecessary and such magnetic patterns can be formed easily and in a short time by irradiating several beams at a time.

The mask need not always cover the whole surface area of the magnetic disk but rather may define a repeating unit that covers a subsection of the magnetic pattern. Such a mask can be used by successively translating it to new positions in order to complete a desired pattern. Therefore, such a mask can be simple and inexpensive.

The mask can be capable of changing the intensity distribution of energy beams to correspond to a magnetic pattern to be formed on the surface of the magnetic disk. As examples, a photomask having a transmitting portion that transmits energy beams according to a pattern or a hologram mask in which a hologram for forming a specified pattern on the medium can be used. Since such masks permit the formation of a plurality of magnetic patterns or a large surface area pattern at a single time, the magnetic pattern formation can easily be performed in a short time. Although a sharp, clear pattern can be formed with use of a hologram mask even when the mask is distant from the medium, a photomask is advantageous from the viewpoint of ease and cost.

The material of the mask is not limited. However, when the mask is made of a non-magnetic material, a clear magnetic pattern can be uniformly formed even though it is of an arbitrary pattern, and uniform and strong reproducing signals can be obtained.

A mask that contains a ferromagnetic material is not desirable because the magnetic field distribution is disturbed by the magnetic properties of the mask. In cases where a pattern is oblique to the radial direction of a magnetic disk or a circular pattern extends in the radial direction of a magnetic disk, it is difficult to obtain high quality signals because the external magnetic field does not sufficiently oppose the magnetic field in the magnetic transition area if a ferromagnetic material is used.

The mask is disposed between the energy beam source and the magnetic layer (the magnetic recording medium). When the accuracy of a magnetic pattern is considered to be most significant, it is preferred to contact the entirety or a portion of the mask to the medium, thereby minimizing the influence of diffraction of the laser beams and forming a high resolution magnetic pattern. For example, when the mask is placed on the medium, there is a portion of the mask that contacts the medium and a portion that does not contact the medium due to the undulation of several $\mu$m in the medium surface. However, a pressure of 100 g/cm$^2$ or less should be applied to the mask, and hence to the medium, so as to not significantly compress and/or damage the medium.

In order to minimize the occurrence of defects and/or damage in the mask or the medium, it is preferable to separate the mask from the medium over at least the area where a magnetic pattern is formed in the medium. This separation can minimize the occurrence of damage and/or defects in the medium or the mask which are caused by the deposition or penetration of foreign material such as dust. Further, when a lubricant layer is formed before the formation of a magnetic pattern, the separation of the mask and the medium is particularly preferable so as to prevent the lubricant from depositing on the mask.

As a method for separating the mask from the magnetic pattern forming area of the magnetic recording medium, both members can be kept at a predetermined distance. For example, a specified tool for maintaining the mask and the medium at a predetermined distance may be used. Further, spacers may be placed between the mask and the medium at positions other than the magnetic pattern forming area. Further, the spacers may be integral to the mask. When spacers are provided between the mask and the magnetic recording medium in an outer peripheral portion and/or an inner peripheral portion of the magnetic pattern forming area of the medium, they can reduce the undulation of the surface of the magnetic recording medium thereby increasing the accuracy of the magnetic pattern.

Referring now to the drawings, wherein like reference numerals designate identical or corresponding parts throughout the several views, and more particularly to FIG. 1, wherein a diagram showing an exemplary magnetic pattern forming method using a photomask is provided.

A magnetic disk 101 that has been previously uniformly magnetized along a circumferential direction through the application of an external magnetic field is illustrated. The magnetic disk 101 is then attached to a spindle 120. Specifically, the disk is placed on a turntable 101, and a photomask 102 is place on the disk with a spacer 122 interposed therebetween. Further, a pressing plate 103 is placed on the photomask 102 and fixed by screws (not shown). Namely, a separation distance S is maintained between the magnetic disk 101 and the photomask 102. Then, pulsed laser beams 103 are irradiated and, at the same time, an external magnetic field 104 is applied. The direction of the applied external magnetic field is opposite to the direction of the external magnetic field previously used for the uniform magnetization.

A mask having a plurality of transmitting portions (corresponding to a magnetic pattern to be formed) may be used. Through such a mask, laser beams are irradiated onto the magnetic layer. In this case, it is preferable that the diameter of beam be made large or the shape of beam formed in a longitudinally elongated elliptical shape. The laser beams are irradiated onto a plurality of tracks or a plurality of sectors to form a magnetic pattern. If this is done simultaneously, the efficiency of recording can be further increased. Further, the undesirable increase in servo signal recording time with increased recording medium capacity can be minimized.

The photomask may be a mask that is provided with a transmitting portion or portions and a non-transmitting portion or portions according to a desired magnetic pattern. Such masks can be formed, e.g., by sputtering metal such as Cr or the like on a transparent original disk such as quartz glass or soda lime glass, depositing a photoresist thereon, patterning the photoresist, and etching the exposed metal. Thus, predetermined transmitting portions and non-transmitting portions can be formed. In this case, the portions having a Cr layer on the original disk block energy beams, and portions exposing the original disk transmit the energy beams.

A mask thus prepared generally has an uneven surface wherein protruding portions do not transmit energy beams. The protruding portions are brought close to the medium or they are brought almost into contact with the medium. Alternatively, material for transmitting energy beams may be embedded in the recessed portions after the formation of the mask so that the surface area that contacts the medium is flat.

The material that forms the spacer between the mask and the medium should be hard. Further, it is preferable that the material that forms the spacer not be magnetized because an external magnetic field is used for forming the pattern. Metal, such as stainless steel or copper, or a resin, such as polyimide, is preferably used. The height of the spacer is generally several $\mu$m to several hundred $\mu$m. The spacer, however, is optional. FIG. 2 is a diagram illustrating an exemplary magnetic pattern forming method using a hologram mask.

As shown in FIG. 2(a), object light 107 is irradiated to a sheet of photopolymer 105 on a prism 108 through a photomask 106 in which transmitting portions and non-transmitting portions are formed based on the desired magnetic pattern to be formed in the magnetic disk. Reference light 109 is irradiated to the sheet of photopolymer 105 through the prism to record a hologram obtained by the interference of the object light 107 and the reference light 109 on the photopolymer 105.

Instead of using the photomask, a pattern that is to be exposed to light is calculated, and according to a result of the calculation, a hologram mask may be produced.

Figure 2B:
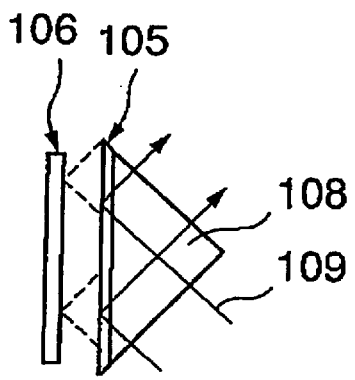
Figure 2C:
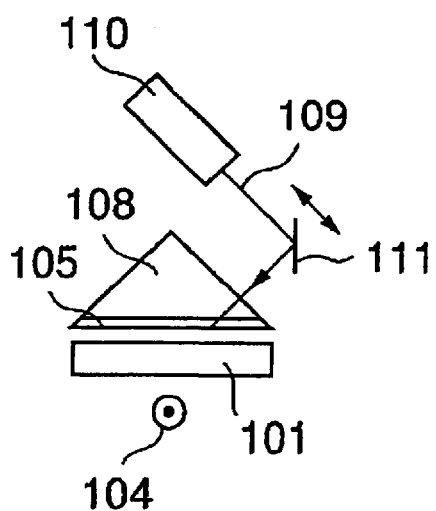

When the reference light 109 is irradiated through the prism as shown in FIG. 2(b), a holographic image pattern is formed at a predetermined distance from the photopolymer. By using this principle, laser light (reference light) 109 is irradiated from a laser light source 110 to the photopolymer 105 through the prism 108, a magnetic disk is placed in a plane in which the holographic image pattern is formed, and a reflective plate 111 is moved to scan the reference light 109 on the sheet of photopolymer 105 and, at the same time, an external magnetic field 104 is applied, thereby forming a magnetic pattern (FIG. 2(c)).

In cases where the external magnetic field is applied together with heat, the external magnetic field should be simultaneously applied to the plurality of transmitting portions of the mask.

The minimum separation distance between the mask and the magnetic recording medium is preferably 0.1 μm or more, thereby avoiding contact between the lubricant and the mask. The size of dust which adheres to the medium and is not relatively easy to remove using blown air is generally less than 0.1 μm, and when the separation distance is less than 0.1 μm, the portion where the magnetic pattern is formed may unexpectedly contact the mask due to undulations of the medium surface, and the mask and/or the magnetic recording medium may be damaged. Accordingly, the separation distance is more preferably 0.2 μm or larger. Further, the separation distance should be 1 mm or less. When the separation distance is larger, the diffraction of energy beams increases and a resultant magnetic pattern is apt to be unclear.

For example, when an excimer laser (248 nm) is used to transfer a 2×2 μm pattern (a pattern having an alternate 2 μm transmitting portion and 2 μm non-transmitting portion ) formed in the photomask to the medium, it is necessary to maintain the separation distance between the mask and the medium at about 25–45 μm or less. When the separation distance exceeds this value, brightness and darkness in the illumination pattern become unclear due to diffraction. In a case of a 1×1 μm pattern (pattern having an alternate 1 μm transmitting portion and a 1 μm non-transmitting portion), the separation distance should be about 10–15 μm or less.

In using the photomask, the separation distance between the mask and the medium should be as small as possible within the above-mentioned range because, as the separation distance is increased, the magnetic pattern becomes increasingly unclear due to the deflection of energy beams for irradiation. In order to improve this problem and to obtain a clearer pattern, a slender transmitting portion or portions that function as a diffraction grating should be formed at the outer side of the transmitting portion of the mask or a half-wave plate should be provided at the outer side of the transmitting portion of the mask in order to cancel the deflected light by interference.

On the other hand, when using a hologram mask, the distance to the image plane of the holographic image pattern is determinative. Accordingly, the distance from the mask to the medium is adjusted based on this distance. As shown in FIG. 2, the distance between the mask and the medium can be reduced by using a prism.

In case magnetic layers are to be formed on both principal surfaces of a magnetic disk, the formation of a magnetic pattern according to the present invention may be conducted for each principal surface sequentially, or for both surfaces simultaneously by arranging masks, energy irradiation systems, and an external magnetic field generator at both sides of the magnetic disk.

In case two or more magnetic layers are to be formed on a single surface, and when a different pattern is to be formed in each magnetic layer, irradiated energy beams should be focused on each layer and heating of each layer should be separately conducted in order to form individual patterns.

When forming a magnetic pattern, it is preferred to prevent (re-)irradiation of energy beams in areas where irradiation is undesirable by disposing a shading plate capable of selectively blocking energy beams between the energy beam source and the mask or between the mask and the medium.

As a shading plate, a shading plate that blocks a certain wavelength band of the applied energy beams is sufficient, or a shading plate that reflects and/or absorbs the applied energy beams is sufficient. However, it is preferable that the shading plate have a relatively high thermal conductivity and a high reflectivity because heat is released by the absorption of energy beams. The released heat can potentially adversely affects the formation of a magnetic pattern. For example, a metallic plate such as Cr, Al, Fe, or the like may be used.

Further, a reduced image forming technique is preferably used for the optical system. An image is formed on the medium surface by reducing patterned energy beams having an intensity distribution corresponding to a magnetic pattern to be formed. According to the reduced image forming technique, the accuracy of the magnetic pattern, which depends on the accuracy of the patterning or the alignment of the mask, is not restricted in comparison to cases where energy beams are throttled by an objective lens and then passed through a mask, i.e., cases of proximity exposure of light. Accordingly, a finer magnetic pattern can be formed with good accuracy. Further, there is little possibility of the image being influenced by dust because the mask is separated from the medium. Herein, this technique is referred to as a reduced image forming technology (an imaging optical system).

The spatial distribution of the intensity of energy beams emitted from a beam source is changed by a mask to form a reduced image on the medium surface after having passed through an image forming device such as an imaging lens. Herein, the imaging lens is referred to as a projection lens, and the reduced image is referred to as a reduced projection.

The mask may be capable of providing a certain intensity (i.e., an energy density) of energy beams on the medium according to a magnetic pattern to be formed. Such a mask may be, e.g., a photomask which includes transmitting portions and non-transmitting portions according to a pattern to be formed or a hologram mask in which a hologram is recorded in order to form an image in a specified pattern on the medium.

In the above-described technique, an image forming device is provided between the mask and the medium. In conventional techniques, when energy beams are irradiated onto a medium which contacts a photomask, the photomask may be heated due to the absorption of the energy beams. This is dependent on, e.g., the photomask material used, and the temperature of the medium surface where it is in contact with the photomask is also increased and a clear magnetic pattern may not result. According to the present invention, however, this problem can be eliminated.

Namely, the medium surface on which a magnetic pattern is formed should have a large temperature difference between the time when it is illuminated by pulsed energy beams and the time when it is not illuminated, in order to increase the contrast ratio of the pattern or increase recording density. Accordingly, when it is not illuminated, the medium surface is preferably at room temperature or lower, wherein room temperature is about 25° C.

Further, since energy beams are directed to the mask through a condenser lens, the intensity distribution of the energy beams can be equalized and hence the energy beams can efficiently be introduced into an image forming lens.

The reduced image forming technique is applicable for the formation of a magnetic pattern of any size or any shape as long as the minimum beam diameter of the energy beams and the maximum intensity of an external magnetic field are applicable. A finer magnetic pattern increases the effect. When the smallest feature size of a magnetic pattern is 2 μm or less, the mask alignment process becomes particularly difficult. In this case, the above-mentioned technique is preferably used. The smallest feature size is more preferably 1 µm or less. There is no lower limit on is size of the pattern to be formed. Theoretically, a fine pattern can be formed at the limit of the wavelength of the energy beams. For example, the wavelength of an excimer laser is about 100 nm.

Further, according to this technique, a finer magnetic pattern can be formed by forming a reduced image. Accordingly, it is particularly significant for the formation of a controlling pattern used for controlling a data recording/reproduction head.

According to this technique, a reduced image is formed by the imaging means through the mask. Accordingly, when the reduction ratio of is large, a further fine pattern can be formed. In this case, however, since the beam diameter of the energy beams becomes small due to throttling of the beam, the area where a pattern is formed also becomes small. Accordingly, this technique is particularly suitable for high density and small diameter magnetic disks such as, in particular, a magnetic disk that has a diameter of 65 mm or less.

Generally, a small diameter magnetic disk, although it may possess a small recording surface area, is required to have a large recording capacity. Therefore, it has a very high recording density. This technique is preferably used for magnetic disks with a diameter of 1.8 inches or less and, in particular, a diameter of 1 inch or less.

For example, it is possible to instantaneously record data in a very small magnetic disk with a diameter of 1 inch or less. In the case of a perpendicularly magnetic recording magnetic disk, an external magnetic field can easily be applied to the entirety of the disk and information can instantaneously be recorded over the entire surface.

In addition to the above-mentioned, this technique can also be applied to a magnetic recording medium that has a large diameter such as one with a diameter of 3.5 in. In this case, the shape of the beam is manipulated to have a laterally elongated elliptical shape, and a magnetic pattern for a plurality of tracks or a plurality of sectors is irradiated at a single time. This increases recording efficiency, shortens the servo signal recording time relative to conventional techniques where servo signals are written by a magnetic head, and increases the accuracy of the recording.

In the present invention, irradiation can include scanning the energy beam(s) over the medium. This allows a wider area to be quickly irradiated even when the beams are throttled to have a small diameter. For example, the beam scan may be performed by placing a part or the whole of an energy beam irradiating optical system on a translation device that can move. Alternatively, a galvanometer and a f-θ lens may be used. The beam scan over the medium can be performed by introducing the energy beams into the f-θ lens through the galvanometer while the angle of the galvanometer is changed. In order to scan a wider range in a short time, it is preferable to generate short pulse energy beams at a high rate.

In the present invention, preferably, pulsed energy beams are irradiated while the energy beam irradiation spot and the mask for the magnetic recording medium are moved, where the irradiation of the pulsed energy beams is synchronized with the movement.

The area onto which energy beams can be irradiated at a single time is limited to about ten mm to several tens of mm. It is thus difficult to irradiate the entire surface of a 3.5 in. or 2.5 in diameter magnetic disk at a single time. Accordingly, the irradiation of energy beams by continuously scanning the medium surface can be performed. When this is done, however, double irradiation of energy beams or long duration irradiation of the same location is apt to occur.

In another method that addresses this problem, a disk-like mask is coaxially fixed to the disk and the disk is divided into a plurality of imaginary sector regions. Pulsed energy beams are irradiated once onto each sector region through the mask. The disk and the mask can then be rotated together at a low speed, and the pulsed energy beams irradiated in synchronization with the speed of rotation. When the sector region spans an angle of 12° and the disk is rotated at 2 rpm (one revolution in 30 sec), the energy beams irradiation is performed at a frequency of 1 Hz. Therefore, synchronization of the rotation with the irradiation is possible. The speed of rotation can be kept constant using an encoder or the like.

As another method, a sector mask is arranged on a disk, and one energy beam pulse is applied to an imaginary sector region of the disk through the mask. Then, only the mask or the disk is rotated and, after it has been rotated through a predetermined angle, another pulse is applied to the adjacent imaginary sector region through the mask. When each sector spans an angle of 12° and the disk or the mask is rotated at 2 rpm (1 revolution in 30 sec), synchronization of the rotation with the irradiation is obtainable by irradiating the energy beams at a frequency of 1 Hz. The speed of rotation can be kept constant using an encoder or the like.

When the energy beam pulse width is sufficiently short, the disk can be rotated continuously during the irradiation of energy beams. However, it is preferred to stop the disk intermittently during irradiation so that the clarity of the magnetic pattern can be increased.

Using these methods of the present invention, double irradiation of energy beams onto the same location can be prevented. Accordingly, signal deterioration due to thermo-demagnetization, blurring of the boundary of a magnetic pattern due to thermal storage, or a damage to the medium can be minimized and a precise, defect-free magnetic pattern can be formed.

In a preferred magnetic pattern forming method, pulsed energy beams are irradiated while the position of the mask and/or the magnetic recording medium (and hence the energy beam irradiation spot) are moved, and the irradiation of the pulsed energy beams, the detection of this irradiation, the movement and the detection of this movement are performed sequentially. This allows the double irradiation of the energy beams onto the same location to be prevented.

For example, an oscillation signal (an external trigger signal or the like) is used to trigger the firing of the pulsed energy beams and, after detection of the oscillation signal, a motor that moves the magnetic recording medium actuates to rotate and/or translate the medium to a desired position. When a signal indicating that the relative movement has been completed is detected, the detected signal is used as the oscillation signal (perhaps after a suitable delay) and supplied to the energy beam generating source to trigger the generation of the next energy beam pulse. Synchronization is obtainable by repeating such operations.

In the present invention, several methods for moving the energy beam irradiation spot and the mask and/or the magnetic recording medium are described herein, although the present invention is not limited thereto.

For example, the energy beam irradiation spot is fixed, and the medium is moved independently or together with the mask attached to the spindle, by way of a motor or the like.

Alternatively, the medium and the mask are fixed onto a parallel slider which is moved along a parallel direction by a motor or the like. When the medium is in a disk form (i.e., a magnetic disk is used), rotation is recommended as the simplest and most accurate approach.

On the other hand, it is possible to move the energy beam irradiation spot while the medium and the mask are fixed. For example, a part or the whole of the energy beam irradiation system may be mounted on a movable support such as a translation stage. Alternatively, the energy beam irradiation spot may be moved using an f-θ lens or the like provided that the angle of the energy beams is changed by a dichroic mirror or a galvanometer installed in the energy beam irradiation system.

Further, a combination of the above-described approaches may be employed. In the case where the energy beam diameter is small, it is difficult to irradiate the entire surface of a magnetic disk along the radial direction at a single time. In this case, the magnetic disk and the mask can be fixed onto a parallel slider and the magnetic disk moved along its radial direction. Irradiation is then performed several times and the entire surface of the disk can be irradiated.

For example, the disk and the mask are rotated and, at the same time, the energy beam irradiation system is mounted on a translation stage and gradually moved along the radial direction to perform the irradiation. Alternatively, the disk and the mask are rotated and, at the same time, the energy beam irradiation spot may be moved in the radial direction provided that the angle of the energy beams is gradually changed by a dichroic mirror or a galvanometer.

Alternatively, the following steps may be repeated: the energy beam irradiation spot is moved along the radial direction to irradiate the disk, and the disk and the mask are rotated a little and, at the same time, the energy beam irradiation spot is moved along the radial direction to again thoroughly irradiate the disk.

In order to scan a broad region in as short a time as possible, it is preferred that short pulse energy beams be generated at a high speed. Thus, a magnetic pattern can be formed by irradiation of the pulsed energy beams onto the entire surface of the magnetic recording medium while the medium is moved.

If a pattern to be formed in the medium is written on a single mask, the mask can be fixed to the medium and the mask and the medium moved together. Pulsed energy beams are then irradiated onto the medium during the (perhaps intermittent) movement. A single mask is suitable for forming a pattern that lacks periodicity in the circumferential direction or the radial direction of the disk.

When a pattern repeats a unit pattern (i.e., is periodic), the irradiation of the pulsed energy beams can be conducted by moving only the magnetic recording medium without moving the mask in which the unit pattern is formed, or by moving only the mask without moving the medium. This method is suitable for forming a pattern that is periodic in the circumferential direction or the radial direction of the disk. More preferably, the movement includes rotation of the medium or the mask.

In order to make the direction of magnetization in a so-called longitudinal magnetic recording disk coincident with a circumferential direction of the magnetic recording medium, rotation is more suitable than a parallel movement.

In order to synchronize the mask and/or the magnetic recording medium with the energy beams, the number of irradiation events necessary to print a pattern in the entire magnetic recording medium is first calculated based on the surface area onto which energy beams are irradiated. The optimum repetition frequency is then selected on the basis of the repetition oscillation frequency of the energy beams and the time needed to form the pattern, and the movement speed is determined.

As used herein, an energy beam irradiation system indicates the entirety or a part of an optical system such as a lens and/or a mirror which transmits energy beams emitted from an energy beam source onto the magnetic recording medium. For example, it includes an objective lens, a projection lens, a galvanomirror, a dichroic mirror, and so on for irradiating laser emitted from a light source onto the magnetic recording medium.

It is preferable that the shape of the irradiated energy beams emitted from a light source be changed into a desired shape by an optical treatment. In applications involving a magnetic disk, the shape of the beams is preferably sector shaped. Further, it is desirable to optically make the intensity uniform, expand, reduce, and/or change the energy beam shape in light of the shape of the substrate. Optical uniformity of the energy beam can be obtained using a homogenizer which equalizes the energy distribution in the beam spot. The optical expansion of energy beams can be achieved using a beam expander which elongates the beams along a direction.

In the present invention, since energy beams are absorbed by the mask during the irradiation of the energy beams onto the medium through the mask, the temperature of the mask increases. This causes thermal expansion and, depending on the conditions, the error per unit area may become large. Therefore, it is preferable to cool the mask when the energy beams are irradiated onto the medium through the mask. With such a measure, the thermal expansion of the mask can be prevented, and a desired magnetic pattern can be accurately formed with a minimum dimensional error.

Devices that cool the mask include a system that supplies an air stream to the mask (an air cooling system), a system that circulates cooling water (a water cooling system), a system that uses another method of transporting heat, and so on. The heat generated by the irradiation of energy beams should be removed from the mask to an extent necessary to limit substantial thermal deformation of the mask. For example, an air gun may be disposed in the vicinity of the mask, air may be supplied to the surface of the mask onto which energy beams are irradiated, or a pipe may be arranged so that cooling water is circulated around the mask.

Further, the cooling of the mask may be conducted from any side or surface such as the front surface onto which the energy beams are irradiated, the back surface, or a side surface. The cooling position is also not limited. However, the cooling of the region where the energy beams are directly irradiated or the vicinity thereof (adjacent region) is particularly effective because the temperature increase in this region is large.

When pulsed energy beams are irradiated, irradiation is repeatedly alternated with times when no irradiation is occurring. Cooling may be conducted only during irradiation, only during times when no irradiation is occurring, or during both as needed. When cooling is performed during irradiation, it is necessary to use a cooling device that does not shield the mask. However, this is not a consideration when cooling is performed only during times when no irradiation is occurring.

Further, the temperature of the mask may be monitored by a temperature sensor or the like so that cooling is controlled based on the detected temperature. Thus, the temperature can be kept constant. For example, if a water cooling system is used, the cooling time, water temperature, and so on can be controlled. If an air cooling system is used, the cooling time, air quantity, air temperature, and so on can be controlled.

The gas used in an air cooling system may be any gas that will not damage the mask. For example, an inert gas such as $N_2$, Ar, and/or air is usable. Air is preferable from the viewpoint of cost. More preferably, clean air or air filtered to remove fine particles, dust, and so on is used from the viewpoint of minimizing errors at the time of printing. The mask is cooled by blowing clean air from an air gun.

In a water cooling system, it is preferable to contact temperature controlled water to the entire mask or part of the mask through an interposed water bag or metallic member having a high thermal conductivity.

If a water cooling system or another coolant is used, care should be taken that condensation does not occur on the mask so that energy beams may be cleanly transmitted through the mask. For this reason, it is preferred to reduce the ambient temperature.

By keeping the temperature of the mask within a predetermined range using such cooling devices, it is possible to limit thermal expansion of the mask and to form a more precise magnetic pattern. The temperature of the mask is preferably maintained between 0° C. and 30° C. However, when pulsed energy beams having a high peak intensity are used, the temperature of the mask sharply rises in the instant that the mask is illuminated. Accordingly, it may be that the temperature of the mask cannot be maintained within the above range during irradiation of the energy beams.

This approach is preferably used in environments such as clean rooms in which fine particles, dust, temperature, and humidity are controlled. The ambient temperature is preferably 0° C.–30° C.

If the magnetic recording medium is held by a medium support such as a spindle, a guide, a pressing plate, or so on, energy beams may be irradiated onto the medium support. As a result, the medium support may absorb energy and expand due to the temperature increase making the measurement error large with respect to the dimensions of the pattern. For example, the eccentricity of the medium may become large when the spindle or the pressing plate expands.

Accordingly, the medium support should be cooled to minimize the eccentricity and to form an accurate magnetic pattern with less error. Preferably, the accuracy is increased by removing heat generated in both the mask and the medium support.

The medium support indicates the entirety of the mechanism that holds the medium. Specifically, it may include a spacer(s) and a turntable in addition to the above-described members. The cooled region may be the entirety or a part of the medium support and it should include the region that receives energy beam irradiation or a region susceptible to heating due to the irradiation.

Materials used to form the medium support may be chosen at will provided that they possess a strength that is sufficient to support the magnetic recording medium. However, materials that are thermally stable (in size), such as metals, alloys, resins, ceramics, glasses and so on are preferable. In particular, metals or alloys are preferable in that they can rapidly disperse heat from the energy beams. In particular, metals or alloys that have a large thermal conductivity are preferred.

Devices that cool and the methods and conditions for cooling the medium support are the same as those for cooling the mask. However, the method and the conditions for cooling the medium support may also be different from those for cooling the mask. It is sufficient to directly cool the area where the energy beams are incident, or to cool the vicinity thereof through the conduction of heat. The accuracy of a pattern can be increased by continuously supplying clean air of about 20° C. to both the rear surface of the mask and the medium support at a rate of 2 kgf/cm$^2$ using an air gun. For example, in comparison to cases where this approach is not used, an improvement in pattern accuracy of about 0.1 μm with a pattern of 1 μm in width can be obtained.

Next, the external magnetic field will be described.

When a circular disk-like medium is used, it is preferable that the direction of an applied external magnetic field is one of a circumferential direction, a radial direction, and a direction perpendicular to the medium surface.

When the external magnetic field is applied simultaneously with the heating, the external magnetic field may be applied over as wide an area as is heated. In this way, a plurality of magnetic patterns can be formed at the same time.

In order to apply the external magnetic field to the magnetic layer, a magnetic head may be used, or a plurality of electromagnets or permanent magnets may be arranged in order to generate a magnetic field along a predetermined magnetization direction. Further, a combination of these devices may be used. In order to efficiently magnetize a medium that has a high coercive force which is suitable for high density recording, a permanent magnet such as a ferrite magnet, a neodymium type rare earth magnet, a samarium-cobalt type rare earth magnet, or the like is preferable.

Figure 29:
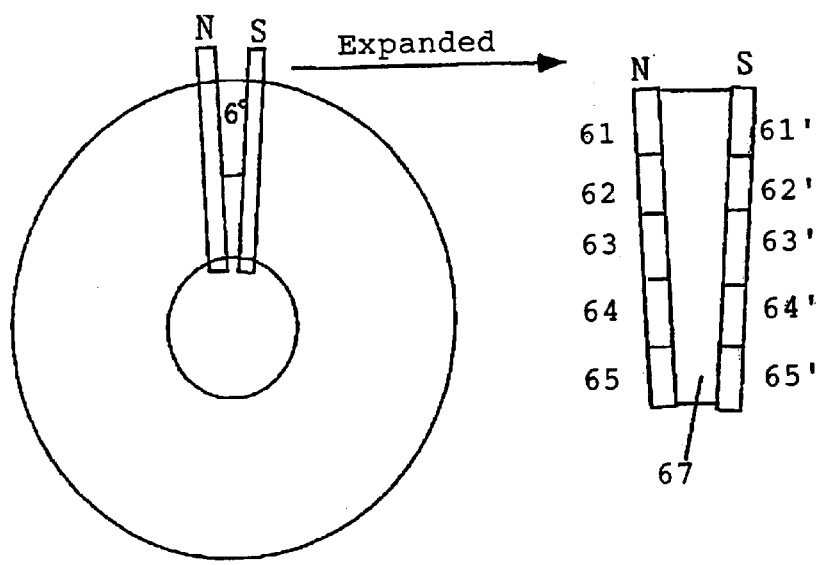
FIG. 29 is a diagram that illustrates another example of the external magnetic field source.

FIG. 29 shows an exemplary arrangement of permanent magnets used to apply an external magnetic field along the circumferential direction of a 2.5 in. magnetic disk.

A number of NdFe magnets, each having a magnetic field intensity of 1.9 k Gauss, are arranged in two lines with their magnetic poles opposing each other on a magnetic yoke 67, as shown in FIG. 29. The dimensions of each magnet are 6.0 mm×6.0 mm×6.0 mm. The end portion of the magnet located at the innermost periphery is positioned 10 mm from the center of the disk, and the other magnets are successively arranged adjacent thereto in a radial direction so that the lines of magnets extends radially with an angle of 6° between them. The distance between the disk and the magnets is about 5 mm so that the magnetic field intensity applied to the disk at the center between opposing magnets 63, 63' is 1.3 k Gauss. Measurement of the magnetic field intensity is conducted in the vicinity of each of the magnets on a line connecting the N pole and the S pole of opposing magnets.

When a circular disk medium is used, it is preferable that the external magnetic field intensity be changed along the radial direction of the medium. When forming a magnetic pattern in a circular disk medium by irradiating energy beams during the application of a magnetic field, it is efficient to section the recording area into sector regions.

In a medium in which recording is performed by rotation at a constant angular velocity, the linear recording density is low toward the medium's outer circumference. When recording is performed through rotation at a constant angular velocity, the length available for recording of magnetic domains becomes long toward the outer periphery. Accordingly, when forming a magnetic pattern in each track of the medium, the pattern is expanded in a sector shape toward the outer periphery.

Accordingly, the magnetic field is applied along the radial direction to substantially cover a sector area.

When a general magnet, i.e., a magnet having a uniform magnetic field intensity, is used to apply a magnetic field to a sector area, the magnetic field intensity actually applied to the disk becomes small toward the outer circumferential portion and it is difficult to clearly form a magnetic pattern because, as the distance between opposing magnetic poles increases, the magnetic field intensity decreases.

Therefore, the magnetic field intensity of the external magnetic field should be changed as a function of position along the radial direction of the disk. Thus, the magnetic field intensity applied to the disk can be uniform, and a magnetic pattern can clearly and uniformly be formed over the entire surface of the disk.

This method is particularly effective when the irradiation of energy beams and the application of a magnetic field are conducted simultaneously. If a magnetic field is applied twice, i.e., prior to the irradiation of energy beams and during the irradiation, this method may be used for either application alone or for both.

The magnetic field intensity may be linearly, curvilinearly, or stepwise changed. Further, there is a difference of 5% or more between the maximum value and the minimum value of the magnetic field intensity. Although there is no upper limit in this value, it is preferable that the difference be about 5 times or less when using a 2.5 inch magnetic disk.

If an electromagnet is used, the number of turns and/or the density of the coil is changed along the radial direction, hence changing the magnetic field intensity. It is possible to change the magnetic field intensity by changing the number of turns and/or the density of the coil in a single electromagnet, or by arranging, in the radial direction, several electromagnets each having a different number of turns and/or coil density. A structure that includes a plurality of permanent magnets is preferred since different magnetic field intensities can easily be provided in inner and outer circumferential portions by changing the magnetic intensity of individual magnets. Further, a variety of arrangements is possible. The used magnets may be selected based on the desired magnetic field.

It is preferable that the external magnetic field be applied by two magnetic field sources whose magnetic polarity is different from each other, and that both sources be opposed in the same plane of the magnetic recording medium. This arrangement can be simple. When the two magnetic field sources are radially arranged (along the radial direction) of the magnetic recording medium, a magnetic pattern can be uniformly formed along the radial direction of the magnetic recording medium without causing a skew loss.

For example, the same permanent magnets can be arranged at the innermost peripheral portion of the disk to oppose the N pole and the S pole of paired magnets along the circumferential direction. Other permanent magnets having a stronger magnetic intensity can be arranged adjacent to these magnets so as to increase the distance between magnetic poles. Further, other permanent magnets having increasingly stronger fields are arranged adjacent to the second permanent magnets so as to increase the distance between magnetic poles. By repeating such operations, final permanent magnets that reach the outermost peripheral portion of the disk can also be added. Thus, a linear arrangement of magnets having the N pole at the outer free end and a linear arrangement of magnets having the S pole at the outer free end can be substantially radially arranged.

A U-shaped permanent magnet having, on both ends, a N pole and a S pole may be arranged so that the ends oppose each other.

"Substantially radially" indicates that the distance between magnetic poles gradually increases in the direction of the outer circumference, and includes linearly radial and curvilinearly radial arrangements. In particular, this is effective to match with the sector shape of the magnetic recording medium. For example, a magnetic pattern can be formed in a circular disk magnetic recording medium over the entire periphery by sectioning the circular disk at a certain angle, or a magnetic pattern can be formed by rotating the medium.

Further, when the magnetic field intensity of the opposing magnetic poles is substantially equal, the arrangement and structure is made simple.

As used herein, the magnetic field intensity indicates the maximum magnetic field intensity of the external magnetic field source, which is measured at a location very close to the source. For example, a measurement can be made in the vicinity of either magnetic pole along a line connecting the N pole and the S pole.

FIGS. 30 and 31 show examples of the arrangement of permanent magnets as described above.

Two sets of NdFe magnets, each set of magnets having magnetic field intensities of 2.7 k Gauss, 2.3 k Gauss, 1.9 k Gauss, 1.5 k Gauss, and 1.2 k Gauss, are arranged in two opposing lines with their polarities opposing each other by interposing a magnetic yoke 67 as shown in FIG. 30. The dimensions of magnet are 6.0 mm×6.0 mm×6.0 mm. The end portion of the magnet located at the innermost periphery is positioned 10 mm distant from the center of the disk, and the other magnets are arranged adjacent thereto along the radial direction, with an angle of 6° between the opposing lines. The distance between the disk and the magnets is about 5 mm, and thus the magnetic field intensity applied to the disk at the center between the magnets 63 and 63' is 1.3 k Gauss. Thus, the magnetic field distribution at the center along a line that connects paired magnets can be maintained in the range of 1.2 k Gauss–1.6 k Gauss. As a result, scatter in the output of a formed pattern can be suppressed.

Alternatively, two sets of NdFe magnets, each set having magnetic field intensities of 2.7 k Gauss, 2.3 k Gauss, 1.9 k Gauss, 1.6 k Gauss, 1.4 k Gauss, and 1.2 k Gauss, are arranged in two opposing lines on the magnetic yoke 67 with their magnetic poles opposing each other. The dimensions of each of magnet are 5.0 mm×5.0 mm×5.0 mm. The end portion of the magnet located at the innermost periphery is positioned 10 mm distant from the center of the disk, and the other magnets are arranged in the radial direction with an angle of 6° between the opposing lines. The distance between the disk and magnets is about 4 mm and thus the magnetic field intensity applied to the disk at the center between magnets 63 and 63' is 1.3 k Gauss. Thus, the magnetic field distribution at the center of a line that connects paired magnets can be maintained in the range of 1.2 k Gauss–1.6 k Gauss. As a result, scatter in the output of the formed pattern can be suppressed.

In the magnetic pattern forming method of the present invention, a second lubricant layer is preferably deposited after the formation of the magnetic pattern. When a magnetic pattern is formed by combining local heating and the application of an external magnetic field, the lubricant on the magnetic recording medium is heated and partially evaporates. Further, the amount of lubricant on the magnetic recording medium may be reduced due to lubricant adhesion to the mask.

The reduction of the amount of lubricant on the magnetic recording medium reduces the impact resistance and/or the durability to the magnetic head. Accordingly, it is preferable that, after a magnetic pattern has been formed by combining local heating and the application of an external magnetic field, a lubricant layer again be formed by depositing a lubricant layer of sufficient layer thickness to achieve a high impact resistance and to obtain a durable magnetic head.

As described above, according to the present invention, a precise magnetic pattern can be formed. Accordingly, this method is very effective when applied to the formation of a control pattern used to control a data recording/reproduction head. More preferably, the control pattern includes a servo pattern or a standard pattern for recording the servo pattern.

Further, according to the present invention, high signal intensities can be obtained even if the magnetic pattern includes a pattern that extends obliquely to the tracks, as described above. Accordingly, the present invention is suitable for forming an oblique pattern for phase servo signals and so on.

An obliquely extending pattern is a pattern that has a certain inclination with respect to a reference line along a direction perpendicular to the translation direction of the head. The inclination of the reference line is preferably within ±45°, whereby signals sufficiently suitable for use as servo signals can be produced. Alternatively, a signal from a magnetic pattern formed according to the present invention may be used directly for the inspection of defects on the medium. A recording step in the inspection of defects can be spared and the manufacturing time can be shortened to reduce the manufacturing cost.

According to the present invention, a magnetic pattern that has a high quality output signal can accurately and effectively be formed by optimizing the above-mentioned conditions. Namely, a pattern that has a high quality output signal where the magnetic transition width is small and the magnetic transitions at the boundaries of magnetic domains are very steep can be formed. By selection of conditions as described herein, it is possible to obtain a magnetic transition width of 1 $\mu$m or less, preferably, 0.5 $\mu$m or less, or, more preferably, 0.3 $\mu$m or less. As used herein, the magnetic transition width indicates a pulse width (e.g., a half value width) of a reproduced signal waveform where 50% of the maximum magnetization of the reproduced signal waveform of a magnetic pattern is present.

In particular, when a reduced image forming technique is used, the accuracy of the magnetic pattern is not restricted by the accuracy in patterning or alignment of the mask. Accordingly, a further fine magnetic pattern can accurately be formed.

Further, the magnetic pattern can easily be formed in a very short time, and the occurrence of damage or defects is rare because the mask does not contact the master disk as in conventional technique.

In particular, as recording density increases, the writing of servo signals becomes increasingly difficult and manufacturing costs are increased. Accordingly, the advantages of the present invention with media for recording high density data are very significant. Further, the present invention can easily be applied to a perpendicular magnetic recording medium because it is easy to apply a magnetic field.

Next, the structures of exemplary magnetic recording media according to the present invention will be described.

The substrate of magnetic recording media according to the present invention should not cause vibrations even when rotated at high speed during the reproduction of signals at high speeds. Therefore, a hard substrate is usually used. In order to obtain a sufficient rigidity, the thickness of the substrate is preferably 0.3 mm or more. However, a thicker substrate is contrary to the demand to reduce the thickness of magnetic recording devices. Accordingly, 3 mm or thinner is preferable. For example, an Al alloy substrate with Al as the main component (such as an Al—Mg alloy substrate), a Mg alloy substrate containing Mg as the main component (such as a Mg—Zn alloy substrate), a substrate composed of material such as common soda glass, aluminosilicate glass, non-crystalline glass, silicon, titanium, ceramics or various resins, or a substrate produced by combining such materials can be used. In particular, it is preferred that an Al alloy substrate, a substrate made of glass such as crystallized glass from the viewpoint of strength, or a substrate made of resin be used from the viewpoint of cost.

The present invention provides a remarkable effect when applies to media that have a hard substrate. In conventional magnetic transfer methods, a medium made from a hard substrate may insufficiently contact the master disk and flaws or defects may be produced. In fact, the transition of printing magnetic domains may become so unclear that the PW50 may expand. On the other hand, the present invention does not suffer from such problems because the mask is not brought into press contact with the medium. In particular, the present invention is effectively used for a medium that has a glass substrate in which cracks are apt to develop.

In usual approaches to manufacturing a magnetic disk, washing and drying are generally performed upon the substrates. In the present invention, washing and drying are advantageously conducted before the formation of layers and the contact properties of each layer are better maintained. In manufacturing the magnetic recording medium of the present invention, a metallic layer such as NiP or the like may be formed on the substrate surface.

In order to form a metallic layer, various techniques for forming a thin film may be used, such as, e.g., electroless plating, sputtering, vacuum deposition, CVD, and so on. When a substrate made of an electrically conductive material is used, electrolytic plating may be used. The thickness of the metallic layer is preferably 50 nm or more. However, in consideration of the production time of a magnetic disk medium, the thickness is preferably 500 nm or less, and more preferably 300 nm or less.

Further, it is desirable to form the metallic layer on the entire substrate surface. However, it is possible to form the metallic layer only on a part such as, for example, an area where texturizing is performed.

Further, the texturizing may be concentrically formed on the substrate surface or on the surface of a non-magnetic metallic layer which is formed on the substrate. As used herein, "concentrically textured" indicates a state where a large number of fine grooves are formed in the circumferential direction of the substrate by grinding the substrate in the circumferential direction. This can be done, for example, mechanically using abrasive grains and a texture tape, optically utilizing laser beams, or using these techniques in combination.

As an exemplary abrasive grain that can be used for mechanical texturizing, a diamond grain, in particular, such as a grain having graphitized surface, is most preferable. As another exemplary grain that can be used for mechanical texturizing, alumina grains are widely used. However, diamond grains exhibit excellent performance from the viewpoint that a longitudinally oriented medium naturally provides an easy magnetization axis oriented along the textured grooves.

In order to realize a high density recording, it is desirable to reduce the flying height of the head as much as possible. Further, the flatness or smoothness of the substrate is one of the design features that should be considered. Accordingly, a surface roughness Ra of a substrate is preferably 2 nm or less, more preferably 1 nm or less, and particularly preferably 0.5 µm or less. The surface roughness Ra is obtained over a measurement length of 400 µm with a contact finger surface roughness meter (Tencor P-12 Disk Profiler (KLA Tencor)) and calculated based on the measured value according to JIS B0601. In this case, the size of the end of the measurement finger is about 0.2 µm.

An underlayer may be formed between the magnetic layer and the substrate. The underlayer makes the crystal fine and controls the orientation of the crystal face. For these reasons, materials containing Cr as the main component are preferably used.

As an underlayer material that contains Cr as the main component, in addition to pure Cr, materials such as an alloy composed of at least one element selected from the group consisting of V, Ti, Mo, Zr, Hf, Ta, W, Ge, Nb, Si, Cu and B, or chromium oxide may be used in order to obtain good crystallographic matching with the recording layer.

Among these materials, pure Cr or an alloy obtained by adding one or more elements selected from the group consisting of Ti, Mo, W, V, Ta, Si, Nb, Zr, and Hf to Cr is preferable. Although the optimum amounts vary depending on the elements used, the concentration of the second and third elements are preferably 1 atomic %–50 atomic % in general, more preferably 5 atomic %–30 atomic %, and even more preferably 5 atomic %–20 atomic %.

The thickness of the underlayer should be sufficient to obtain the desired anisotropy and is preferably between 0.1–50 nm, more preferably between 0.3–30 nm, and even more preferably between 0.5–10 nm. When an underlayer that contains Cr as the main component is formed, the substrate may or may not be heated.

A soft magnetic layer may be formed between the underlayer and the recording layer, depending on conditions. The formation of a soft magnetic layer is very influential and is preferably used for, in particular, a storage medium including a keeper medium that reduces magnetic transition noises or a perpendicularly recording medium wherein magnetic domains orient along a direction perpendicular to the longitudinal direction of the medium.

The soft magnetic layer may be made of a material that has a relatively high magnetic permeability and a small magnetic loss. However, materials like a NiFe alloy or an alloy with added Mo or the like as the third element are preferably used. The optimum magnetic permeability varies largely depending on the characteristics of the head and the recording layer used for recording data. Generally, a maximum magnetic permeability of about 10–1,000,000 (H/m) is preferred.

Further, a CoCr series interlayer may be formed on the Cr underlayer.

Then, when forming the recording layer (magnetic layer), a layer made the same material as the underlayer or layer made of a non-magnetic material may be interposed between the recording layer and the soft magnetic layer. When the recording layer is formed, the substrate may not be heated. As a recording layer, a Co magnetic alloy, a rare earth type magnetic layer such as TbFeCo, or a multi-layer transition metal and a noble metal such as a multi-layer made from Co and Pd is preferably used.

The Co alloy magnetic layer may be made of pure Co or a Co alloy magnetic material which is generally used as a magnetic material, such as CoNi, CoSm, CoCrTa, CoNiCr, or CoCrPt. Further, an element such as Ni, Cr, Pt, Ta, W, or B, or a compound such as $SiO_2$, may be added to the above-mentioned Co alloy. For example, CoCrPtTa, CoCrPtB, CoNiPt, CoNiCrPtB, or the like may be used. The thickness of the magnetic layer of Co alloy is preferably 5 nm or more and more preferably 10 nm or more, although these thicknesses are optional. Further, two or more recording layers may be formed by interposing an appropriate non-magnetic interlayer or without any interposing layer. In this case, the composition of the formed magnetic material may be the same or different.

As a magnetic material used to form a rare earth magnetic layer, several common examples may be employed. TbFeCo, GdFeCo, DyFeCO, or TbFe are common examples. Tb, Dy, or Ho may be added to such rare earth alloys. Ti, Al, or Pt may be added in order to prevent oxidation. Although the thickness of a rare earth magnetic layer is highly variable and can readily be changed as needed, a thickness of about 5–100 nm is commonly used. Further, two or more recording layers may be formed directly atop one another or by interposing an appropriate non-magnetic interlayer. The composition of the formed magnetic material may be the same or different. In particular, rare earth magnetic layers have an amorphous structure and are capable of magnetizing vertically with respect to the media surface. Accordingly, the methods for high density recording and for forming a high density and high accuracy magnetic pattern of the present invention are applicable.

A multi-layer of a transition metal and a noble metal, which is also capable of perpendicular magnetic recording, may be made from a common magnetic material such as Co/Pd, Co/Pt, Fe/Pt, Fe/Au, or Fe/Ag. The transition metal and the noble metal for the multi-layer are not always necessarily pure, but may also be an alloy containing these materials as the main component. The thickness of the laminate layer is usually about 5–1,000 nm, although this is optional. Further, the multi-layer may be formed from three or more kinds of material as needed. In the present invention, the recording layer is preferably thinner because a thick recording layer may only poorly conduct heat in the layer thickness direction when the recording layer is heated, and thus the desired magnetization may not be obtained. Accordingly, the thickness of the recording layer is preferably 200 nm or less. However, the thickness is preferably 5 nm or more in order to maintain good magnetization.

The magnetic layer of the present invention retains its magnetization at room temperature and is demagnetized by the application of heat and is magnetized by the application of an external magnetic field together with heating.

It is necessary that the coercive force of the magnetic layer retain magnetization at room temperature and, also at room temperature, be uniformly magnetizable with a realistic external magnetic field. When the coercive force of the magnetic layer at room temperature is 2,000 Oe or more, a medium that has small magnetic domains and is suitable for high density recording is obtainable. More preferably, the coercive force is 3,000 Oe or more.

In conventional magnetic transfer methods, pattern transfer was difficult for a medium that has a relatively high coercive force. However, the present invention is suitably applied to such media that have a relatively high coercive force because a magnetic pattern is formed by heating the magnetic layer to sufficiently decrease the coercive force.

However, the coercive force is preferably 20 kOe or less. When it exceeds 20 kOe, a large external magnetic field is required to magnetize the magnetic layer. Further, common magnetic recording may be difficult.

It is necessary for the magnetic layer to retain it magnetization at room temperature and to be magnetized using a weaker external magnetic field when it is at an appropriate heating temperature. Further, the magnetic domains of a magnetic pattern can be made clearer by increasing the difference between the room temperature and the magnetization erasure temperature. For this reason, it is preferable that the magnetization erasure temperature be relatively high, specifically, it is preferred that the magnetization erasure temperature be 100° C. or higher, and more preferably 150° C. or higher. For example, the magnetization erasure temperature is in the vicinity of the Curie temperature (actually, slightly lower than the Curie temperature) or in the vicinity of the compensation temperature.

The Curie temperature is thus preferably 100° C. or higher. When it is lower than 100° C., the magnetic domains at room temperature tend to be unstable. More preferably, the Curie temperature is 150° C. or higher. On the other hand, the Curie temperature is preferably 700° C. or lower because, when the magnetic layer is excessively heated, it may be deformed.

When the magnetic recording medium is a longitudinal magnetic recording medium, it is difficult to record when substantially all of the magnetic poles of the magnetic recording medium for high density recording are aligned (i.e., the medium is in saturation). The formation of a magnetic pattern that has a high magnetic field intensity is difficult in conventional magnetic printing methods. Further, the full width half maximum value of reproduction signals is increased. According to the present invention, a desired magnetic pattern can be formed even in a longitudinal recording medium suitable for high density recording. In particular, when the saturation magnetization of the magnetic layer is 50 emu/cc or more, the influence of a diamagnetic field is large. Accordingly, the use of the present invention is significantly advantageous.

A higher effect is obtainable when the saturation magnetization of the magnetic layer is 100 emu/cc or more. However, when the saturation magnetization is excessively large, the formation of the magnetic pattern is difficult. Accordingly, the saturation magnetization of the magnetic layer is preferably 500 emu/cc or less.

When the magnetic recording medium is a perpendicular magnetic recording medium where a magnetic pattern is relatively large and a unit volume of a magnetic domain is large, the saturation magnetization tends to be large and reversed magnetization is apt to occur due to a demagnetization effect. This creates noise and the full width half maximum deteriorates. However, the present invention makes it possible to record in such media by employing a combination of a soft magnetic layer and an underlayer.

Two or more recording layers may be formed in order to increase the recording capacity. In this case, it is preferred to form another layer between the recording layers.

In the present invention, a protective layer is formed on the magnetic layer. Specifically, the outermost surface of the medium is covered with a hard protective layer that helps avoid damage to the magnetic layer due to collisions with the magnetic head or the deposition of dust on the layer opposite to the mask. The protective layer prevents the medium from contacting the mask when the magnetic pattern forming approaches described herein are used with a mask.

Further, the protective layer is prevents the oxidization of the heated magnetic layer in the present invention. The magnetic layer is generally easy to oxidize, and oxidization is accelerated by heating. In the present invention, since the magnetic layer is locally heated using energy beams, it is necessary to previously form the protective layer on the magnetic layer in order to limit oxidization.

When a plurality of magnetic layers are to be formed, the protective layer should be formed on the magnetic layer closest to the front surface. The protective layer may be formed directly on the magnetic layer, or a layer having another function may be interposed therebetween as needed.

A portion of the energy beams is absorbed by the protective layer when the magnetic layer is locally heated due to thermal conduction. When the protective layer is too thick, a magnetic pattern may be made unclear due to lateral thermal conduction. Accordingly, the protective layer is preferably thin. Further, by making the protective layer thin, the distance between the magnetic layer and the head during data reproduction and/or recording is reduced. Accordingly, the thickness of the protective layer is preferably 50 nm or less, more preferably 30 nm or less, and even more preferably 20 nm or less. However, the thickness is preferably 0.1 nm or more and more preferably 1 nm or more in order to obtain a sufficient durability.

It is sufficient that the protective layer material be hard and resistant to oxidization. For the protective layer, a layer of carbon material such as carbon, hydrogenated carbon, nitrided carbon, amorphous carbon, SiC, or the like, or a hard material such as $SiO_2$, $Zr_2O_3$, SiN, TiN, or the like, may be used. Further, the protective layer material may have magnetic properties.

It is necessary to form a thin, hard protective layer on a magnetic disk so that the distance between the head and the magnetic layer may be reduced. Accordingly, a protective layer of carbonic material, in particular, diamond-like carbon, is preferable from the viewpoint of impact resistance and lubrication. Such a protective layer prevents damage to the magnetic layer by energy beams and is very resistant to damage of the magnetic layer by the magnetic head. The magnetic pattern forming method of the present invention is applicable to an opaque protective layer such as a carbonaceous protective layer.

Further, the protective layer may be two or more layers. When a layer that contains Cr as the main component is formed as the protective layer directly on the magnetic layer, it remarkably reduces oxygen transport to the magnetic layer.

On the protective layer, a lubricant layer can be formed in order to prevent damage to the medium caused by contact with the mask or the magnetic head. As a lubricant for the lubricant layer, a fluorinated lubricant, a hydrocarbon lubricant, and/or a mixture of these lubricants are, e.g., possible. The lubricant can be deposited by common methods such as dip coating, spin coating, or the like. Alternatively, the lubricant layer can be deposited by vapor deposition. It is preferred that the thickness of the lubricant layer be thin so as not to hinder the formation of a magnetic pattern. The thickness of the lubricant layer is preferably 10 nm or less and more preferably 4 nm or less. Further, the thickness is preferably 0.5 nm or more and more preferably 1 nm or more in order to ensure sufficient lubrication.

If the irradiating energy beams come from a position above the lubricant layer, the lubricant may again be applied in consideration of any damage (e.g., decomposition and/or polymerization) to the lubricant.

The surface roughness Ra of the medium after the formation of a magnetic pattern is preferably 3 nm or less so as not to lower the moving stability of the flying and/or contact head. The surface roughness Ra of the medium is the roughness of the medium surface without a lubricant layer. The surface roughness is measured over a measurement length of 400 μm using the contact finger surface roughness meter (Tencor P-12 Disk Profiler (KLA Tencor)) and calculated using the obtained value according to JIS B0601. The surface roughness is preferably 1.5 nm or less.

It is desired that the surface undulation Wa of the medium after formation of a magnetic pattern be 5 nm or less. Wa is the amount of undulation of the medium surface without a lubricant layer and it is measured over a measurement length of 2 mm using a contact finger surface roughness meter (Tencor P-12 Disk Profiler (KLA Tencor)) and calculated using the obtained value as described in regard to the calculation of Ra. The surface undulation is preferably 3 nm or less.

Various methods are available for forming each layer of the magnetic recording medium. For example, physical vapor-deposition approaches such as DC (magnetron) sputtering, high-frequency (magnetron) sputtering, ECR sputtering, vacuum deposition methods and so on are all available.

The conditions for layer formation, including chamber pressure, the method used to heat the substrate, the substrate temperature, the sputtering gas pressure, bias voltage, and so on are can be determined based on the characteristics of the desired medium. For example, when forming a layer by sputtering, a chamber pressure of $5 \times 10^{-6}$ Torr or less, a substrate temperature between room temperature and 400° C., a sputtering gas pressure of $1 \times 10^{-3}$ to $20 \times 10^{-3}$ Torr, and a bias voltage of 0 to −500V are generally preferable.

When the substrate is heated, it may be heated before the formation of the underlayer. When a transparent substrate having a low thermal absorption coefficient is used, an underlayer that has a seed layer containing Cr as the main component or a B2 crystal structure, which increases the thermal absorption coefficient, may first be formed followed by heating of the substrate. Then, a recording layer and so on may be formed thereon.

When the recording layer is a rare-earth magnetic layer, it is preferred to limit corrosion and oxidization of the layer using the following methods. Namely, a covered mask can be applied to the innermost peripheral portion and the outermost peripheral portion of the disk, layer formation can be conducted up to the formation of the recording layer, the covered mask can then be removed before the formation of the protective layer, and the protective layer can be formed to entirely cover the recording layer. When the protective layer has double layers, the steps prior to the formation of the recording layer and the first protective layer are performed using a covered mask, and then the covered mask is removed before formation of the second protective layer to thereby entirely cover the recording layer with the second protective layer.

Next, the magnetic pattern forming device according to the present invention will be described.

The magnetic pattern forming device of the present invention is a device for forming a magnetic pattern in a magnetic recording medium that has a magnetic layer formed on a substrate. This is done by irradiating energy beams to the magnetic recording medium to locally heat the magnetic layer, and applying an external magnetic field to the magnetic layer, where the device includes a medium support for holding the magnetic recording medium, an external magnetic field source for applying the external magnetic field to the magnetic recording medium, an energy beam source for emitting energy beams, a projector for projecting and irradiating the energy beams from the energy beam source onto the magnetic recording medium, and a mask which is located between the energy beam source and the magnetic recording medium and changes the intensity distribution of the energy beams in accordance with a desired magnetic pattern.

In the above device, a magnetic pattern is formed by locally heating the magnetic layer and the external magnetic field source that, in combination, applies an external magnetic field. Accordingly, the magnetic pattern can be formed without using a strong external magnetic field source as in conventional techniques. Further, since areas other than the heated area of the magnetic layer are not magnetized even though the magnetic field is applied to these areas, magnetic domains are only formed in the heated area. Accordingly, it is possible to form a pattern in which the transitions between domains are clear, the magnetic transition width is small, the magnetic transitions between magnetic domains are very steep, and the quality of output signals is high. By selecting conditions, the magnetic transition width can be 1 μm or less.

According to this technique, it is unnecessary to bring a medium into intimate contact with a master disk using vacuum suction as in conventional magnetic printing techniques. Therefore, a simpler medium support can be used. Further, in conventional techniques, it is necessary to repeat attachment/removal treatments of the mask at every exchange of the medium. According to the present invention, however, the mask need not be removed after it has been disposed once. Further, the mask is separated from the disk, and accordingly, the disposal or removal of the disk or the mask is relatively easy.

Further, since energy beams are used to locally heat the medium, control of the position and power of heating is easy. It is sufficient that the energy beams source locally heat the recording layer surface. However, a laser light source is preferable because irradiation of energy beams onto unnecessary portions can be prevented.

In order to obtain a steep magnetic transition width, a pulsed laser is preferred because there is a large temperature difference between times when energy beams illuminate the medium and times when no energy beam illumination occurs. Thus, the storage of heat rarely occurs. Although a continuous laser can be pulsed using an optical device, pulsed laser light sources are preferred. Pulsed laser light sources intermittently emit laser light in a pulse form. Since they can irradiate laser light that has a high peak power in a very short time, the storage of heat rarely occurs.

When a mask that has a transmitting portion which selectively transmits energy beams, e.g. a photomask, is used, preparation is easy and highly accurate finishing can easily be obtained. Therefore, a highly accurate mask along with an accurate magnetic pattern can be formed.

In a preferred embodiment, an intensity distribution equalizer that equalizes the intensity distribution of energy beams emitted from the energy beam source is disposed between the energy beam source and the projector, and the mask is disposed between the intensity distribution equalizer and the magnetic recording medium.

According to such embodiment, since the intensity distribution equalizer equalizes the intensity distribution of energy beams, the distribution of heat in the irradiated area can be made uniform, and the variation of magnetic intensity of a magnetic pattern can be minimized. Accordingly, when reading the signal intensity using a magnetic head, a magnetic pattern that has a highly uniform signal intensity can be formed.

As the intensity distribution equalizer, a homogenizer lens using a prism array or a fly-eye lens, a shading plate, a slit, or the like are, for example, available.

Preferably, the intensity distribution equalizer divides the energy beams into a plurality of portions and the divided portions are later overlapped, ensuring efficient use of the energy beams. In the present invention, the magnetic layer is preferably heated by irradiating high intensity energy beams in a short time period. Because of this, the energy of the energy beams should be used efficiently.

The medium support for the magnetic recording medium includes a mechanism for holding the medium such as, specifically, a spindle, a guide, a pressing plate, a spacer, and a turntable. Materials used to form the medium support are suitable for supporting the weight of the magnetic recording medium. However, materials that do not change in dimension in response to temperature changes are desirable because the medium support receives some of the irradiated energy beams. Metals, alloys, resins, ceramics, and/or glass may be used. Among these, metals or alloys are preferred because they rapidly diffuse heat from the energy beams. In particular, metals or alloys that have large thermal conductivities are preferred.

A detailed description with reference to drawings will now be provided. A magnetic pattern is formed by uniformly magnetizing a magnetic layer through the application of a relatively large external magnetic field followed by the application of a relatively smaller external magnetic field in the opposite direction while the magnetic layer is locally heated.

Figure 3A:
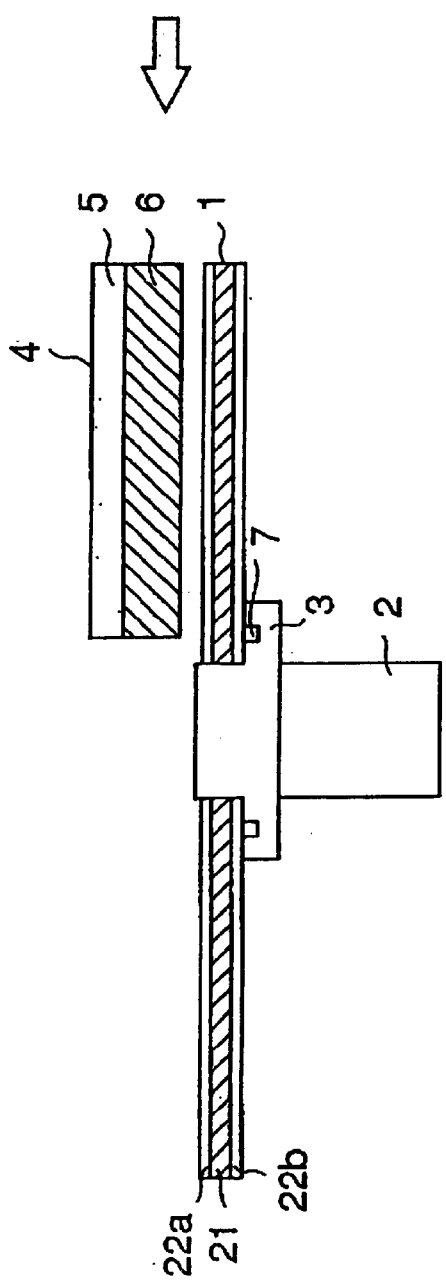
FIG. 3(a) is a vertically sectioned diagram of an exemplary support device and a recording medium during application of a magnetic field in the magnetic pattern forming device of the present invention.
Figure 3B:
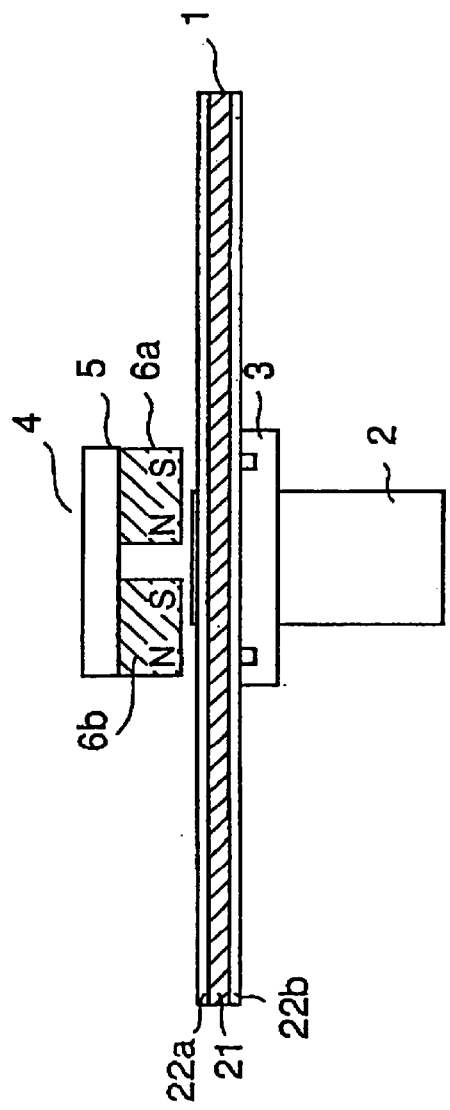
FIG. 3(b) is a diagram illustrating the disk holding portion and a recording medium during application of a magnetic field in the magnetic pattern forming device shown in FIG. 3(a)
Figure 4:
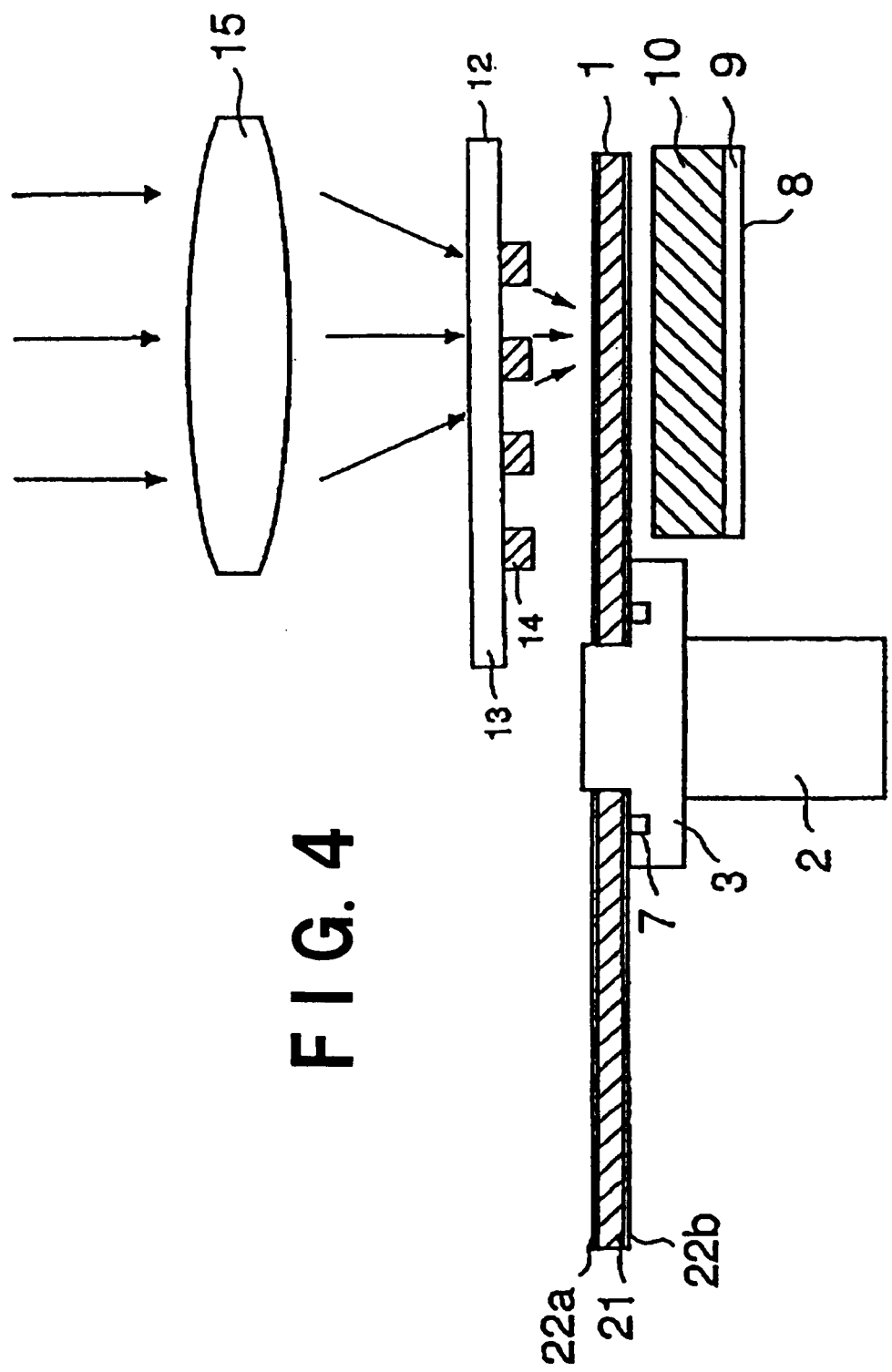
FIG. 4 is a vertically sectioned diagram of an exemplary disk holding portion and a recording medium during application of a magnetic field in the magnetic pattern forming device of the present invention.

FIGS. 3 and 4 show an exemplary disk support of the magnetic pattern forming device and the application of a magnetic field according to the present invention.

As shown in FIG. 3(a) in a cross-sectional view, a magnetic disk 1 in which a magnetic pattern is to be formed is placed on a turntable 3 fixed coaxially with a rotatable spindle 2, and the magnetic disk is fixed to the turntable 3 by way of a vacuum groove 7. The magnetic disk 1 includes a hard substrate 21 and magnetic layers 22a and 22b that sandwich the substrate 21.

Above the disk 1, first magnetic field source 4 that includes a yoke 5 and a permanent magnet 6 are disposed. FIG. 3(b) is a diagram viewed from the direction marked by an arrow in FIG. 3(a). The first magnetic field source 4 has an elongated shape in the radial direction of the disk 1 and a pair of permanent magnets 6a and 6b such as NdFe magnets which are fixed onto a yoke 5 with their magnetic poles opposite to each other. This produces a magnetic field between the N pole of the magnet 6a and the S pole of the magnet 6b. By making the magnetic field larger than the coercive force of the disk 1, the magnetic layer 22a on the upper face of the magnetic disk 1 is magnetized along the circumferential direction in the longitudinal direction of the disk.

When the spindle 2 is rotated and the first magnetic field source 4 is fixed, the magnetic disk is rotated in the direction marked by an arrow, and the magnetic field is applied over the magnetic layer 22a in order to magnetize it along one direction. Then, the first magnetic field source 4 is moved away.

Next, an external magnetic field having the opposite magnetic direction is applied to the magnetic disk 1 while the disk 1 is locally heated. As shown in the cross-sectional view of FIG. 4, a second magnetic field source 8 that includes a yoke 9 and a permanent magnet 10 are disposed at the other side of the disk 1. The direction of a magnetic field generated by the second magnetic field source 8 is opposite to that of the first magnetic field source 1, and the intensity of the magnetic field from the second magnetic field source 8 is smaller than the coercive force of the disk 1 at room temperature. The structure and shape of the second magnetic field source 8 other than that described above may be the same as the structure and shape of the first magnetic field source 4.

Laser light 11 emitted from a light source (not shown) reaches the projector 15, in which the laser beam spot is reduced to a predetermined size, to be introduced into a photomask 12. The photomask 12 includes a substrate 13 which is transparent to the wavelength of the laser and a layer 14 which is opaque to a magnetic pattern to be formed. By transmitting the laser light 11 through only the transparent portion, the intensity distribution (density) is changed in accordance with the desired magnetic pattern to thereby spatially pattern the laser intensity, which is then projected onto the magnetic disk 1.

The photomask 12 can be produced by sputtering on a substrate made from a material such as quartz glass, soda lime glass, or the like or a material opaque to energy beams, such as a metal like Cr or the like. A photoresist is then coated thereon and the photoresist and the material opaque to energy beams is selectively etched to thereby form a transmitting portion and a non-transmitting portion as desired.

The magnetic layer 22a in an irradiation area is then heated to a level close to the magnetization erasure temperature. At the same time, a second external magnetic field is applied by the second external magnetic field source 8. This second external magnetic field is smaller in coercive force than the magnetic layer 22a of the magnetic disk 1. Accordingly, only the heated portion is magnetized in the direction of the second external magnetic field. Then, the laser irradiation is stopped and the heated portion is cooled to room temperature, so that a stable magnetization is obtained. Since the second external magnetic field is opposite in direction to the first external magnetic field used for uniform magnetization, a magnetic pattern can be formed in the magnetic layer 22a as described above.

When the magnetic pattern is to be formed in another area of the magnetic layer 22a, the spindle 2 is rotated to rotate the magnetic disk 1 by a predetermined angle while the second magnetic field source 8 is not moved, and the photomask 12 is moved to a predetermined position. Then, the heating and the application of a magnetic field are conducted simultaneously.

FIG. 5 shows an example of the structure of the optical system for laser irradiation used in the present invention. Pulsed laser light 11 emitted from a pulse laser light source 41 is passed through a programmable shutter 42 which passes only a desired number of pulses. The pulse laser light source 41 may be an excimer laser or a 4th harmonic Q-switch laser of YAG, for example.

The laser light 11 selected by the programmable shutter 42 is introduced to an attenuator 43 and then exists at a predetermined power. The laser light 11 is then incident upon a beam expander 45 which increases the beam diameter before image formation when it is desired that the reduction ratio of projection in the mask be increased.

Then, the laser light 11 is passed through a prism array 46 which divides the portion in a short axis direction into 3 portions and a prism array 47 which divides the portion in a long axis direction into 7 portions, before reaching a projection lens 15. The prism arrays 46 and 47 divide the laser into predetermined portions and then overlap the divided portions to equalize the spatial intensity distribution of the energy beams. These members are called sometimes homogenizers.

Further, the laser light 11 is manipulated to have a predetermined beam shape by passing it through a shading plate 49, if necessary. The intensity distribution of the laser is changed in accordance with the desired magnetic pattern by way of a photomask 12 and the laser is then projected onto the surface of the disk 1. This heats the magnetic layer 22a. The shading plate may be one that does not transmit the particular wavelength(s) of the used energy beams, and it can either reflect or absorb the energy beams. However, if it absorbs the energy beams, heat is released and the magnetic pattern can easily be affected. Accordingly, it is preferable to use a material that has a high thermal conductivity and a high reflectivity. For example, a metallic plate such as Cr, Al, or Fe is preferred.

A cylindrical lens or a condenser lens may be used instead of the homogenizer in order to make the intensity distribution of the energy beams uniform. Further, these may be used together. Alternatively, another lens may be interposed if necessary. Alternatively, a slit may be used to remove a low density portion and to pass only a uniformly distributed portion.

As described above, the structure of the optical systems and the order of the systems used in the present invention can be changed as needed.

The application of an external magnetic field by the second external magnetic field source may be conducted from either side of the disk. However, in the embodiment shown in FIG. 4, the second external magnetic field source is disposed at a position which is opposite to the disk surface onto which laser light is irradiated. Accordingly, it does not block the laser. However, the second external magnetic field source may be disposed at the surface side onto which laser light is irradiated by designing the second external magnetic field source not to block the laser light. If a strong magnetic field is desired, the second external magnetic field source is preferably disposed on both sides of the disk surface.

Further, the projector is preferably an image forming device that forms a reduced image on the medium surface by irradiating energy beams that have an appropriate intensity distribution. Such an image forming device is located between the mask and the magnetic recording medium.

Figure 7:
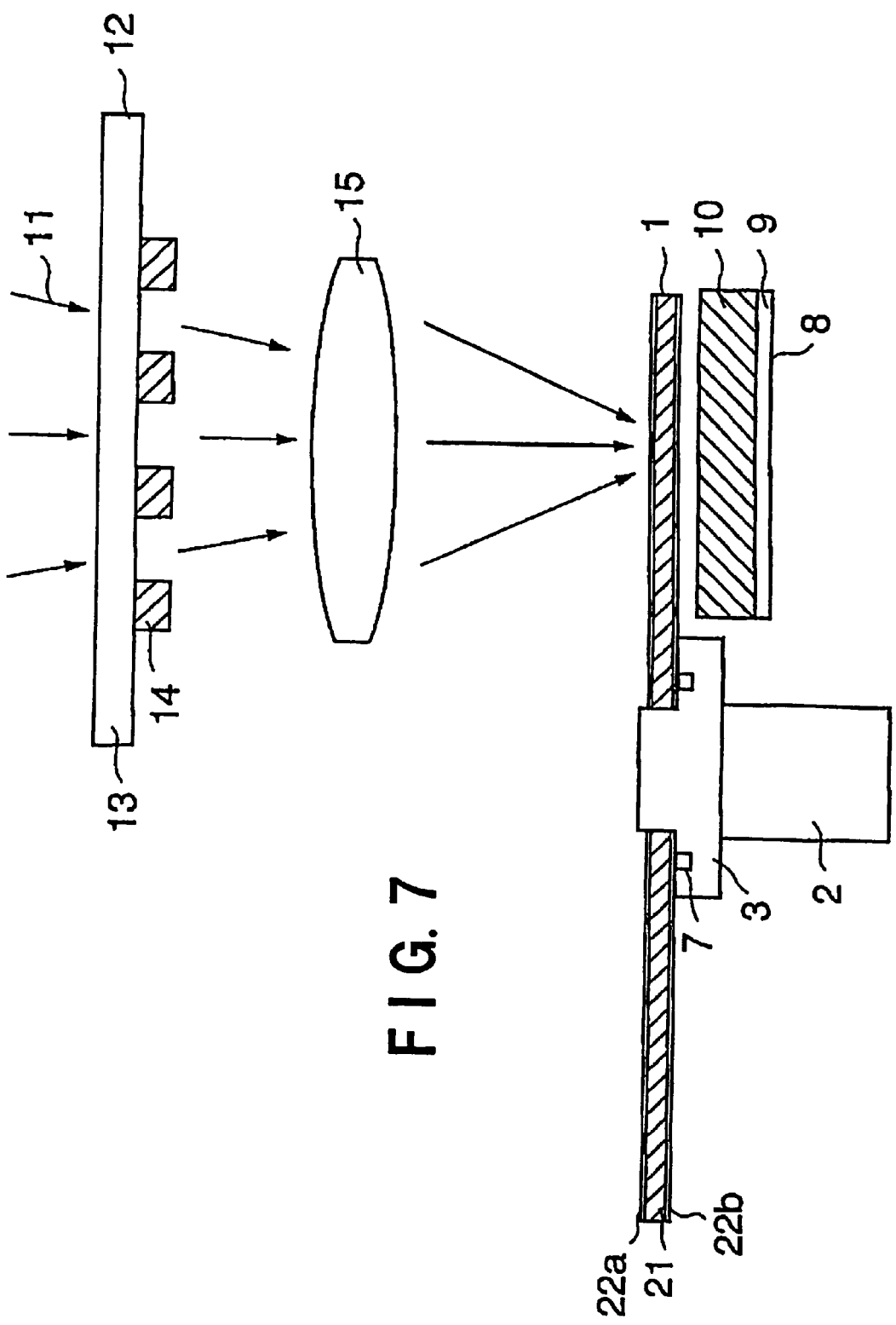
FIG. 7 is a vertically sectioned diagram of an exemplary disk holding portion and a recording medium during application of a magnetic field in the magnetic pattern forming device of the present invention.

An embodiment shown in FIG. 7 will be described in detail wherein the same reference numerals designate the same or corresponding parts.

The magnetic disk 1 has previously been uniformly magnetized by the device shown in FIG. 3. An external, opposite direction, magnetic field is applied while the disk 1 is locally heated. As shown in a cross-sectional view in FIG. 7, the second magnetic field source 8 includes a yoke 9 and a permanent magnet 10 and is disposed at a location opposing the other surface of the disk 1. The direction of the magnetic field generated by the second magnetic field source 8 is opposite to that of the first magnetic field source 1, and the intensity of this magnetic field (i.e., the second magnetic field) is smaller than the coercive force of the disk 1. The structure and shape of the second magnetic field source 8 other than the above-described structure and shape may be the same as those of the first magnetic field source 4.

A pulsed laser light 11 emitted from a light source (not shown) is introduced into the photomask 12 through a condenser lens. The photomask 12 is made from a substrate 13 that is transparent to the laser wavelength and an opaque layer 14 that is formed on the substrate 13 which is opaque and follows a magnetic pattern that is to be formed. Since the laser light 11 only passes through the transparent portion, the intensity distribution of the laser light 11 is changed in accordance with the magnetic pattern to spatially pattern the laser. The photomask 12 may be a conventional photomask.

The laser light 11 reaches an imaging lens 15 in which the laser beam spot is reduced to a predetermined size, and the intensity distribution of the laser light forms a reduced image on the magnetic disk 1 that is analogous to the pattern in the photomask 12. The portions of the magnetic disk 1 where the a high light intensity in the reduced image is found is heated, and the magnetic layer 22a is heated to a temperature close to the magnetization erasure temperature. At the same time, an external magnetic field is applied by the second external magnetic field source 8, the intensity of which is smaller than the coercive force of the magnetic layer 22a of the magnetic disk 1 at room temperature. Accordingly, only the heated portion is magnetized in the direction of the (second) external magnetic field. Then, the irradiation of laser light is stopped, and the heated portions cool to room temperature whereby their magnetization again becomes stable. Since the direction of the second external magnetic field is opposite to the direction of the first external magnetic field (used previously for uniform magnetization), a magnetic pattern in the magnetic layer 22a results.

If a magnetic pattern is to be formed in another area of the magnetic layer 22a, the spindle 2 is rotated to rotate the magnetic disk 1 through a predetermined angle while the second magnetic field source 8 is not moved. Then, the heating and the application of a magnetic field are again conducted.

The minimum beam diameter $\phi$ after reduction by the image lens is determined by the numerical aperture NA of the image forming lens and the wavelength $\lambda$ of the used energy beams. This relationship is given by $\phi=1.22\times(\lambda/NA)$. Namely, when a finer pattern is to be formed in the magnetic recording medium, it is necessary to reduce $\lambda$ or increase the NA.

When the condenser lens is located in front of the mask, the intensity distribution of the energy beam can be uniform, and the energy beams can efficiently be collected by the imaging lens. When the laser beams are reduced by the condenser lens, the NA of the imaging lens is determined while considering the NA of the condenser lens.

Figure 8:
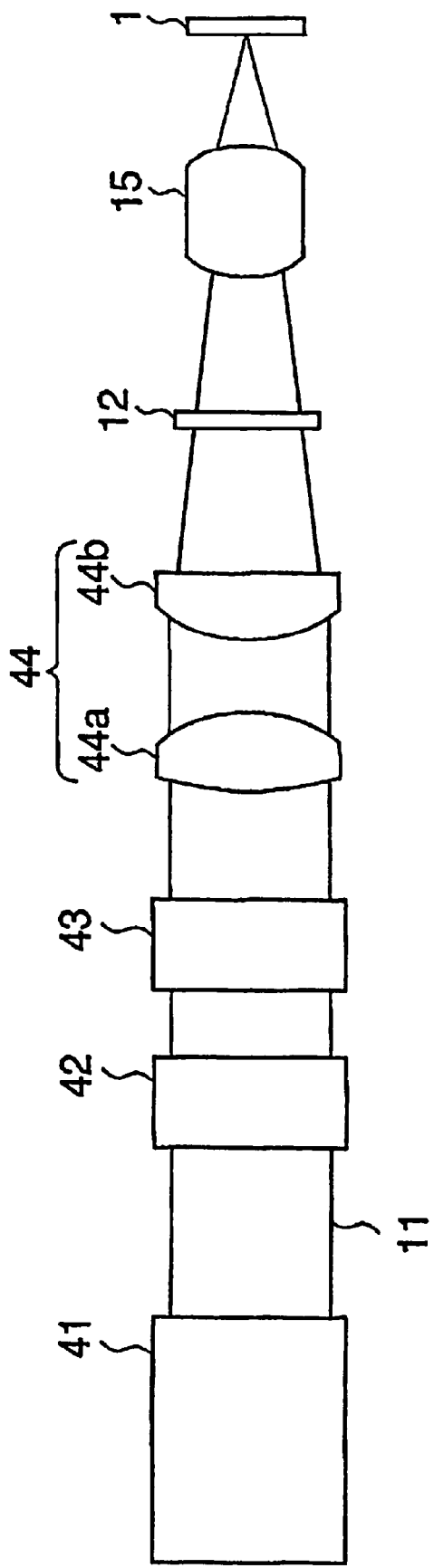
FIG. 8 is a diagram of an exemplary optical system for irradiating energy beams according to the present invention.

FIG. 8 shows an example of the construction of the optical system for irradiating laser light used in the present invention wherein the same reference numerals designate the same or corresponding parts.

Pulsed laser light 11 emitted from the pulse laser light source 41 is passed through the programmable shutter 42 which passes only a predetermined number of laser light pulses from the light source. As the pulse laser light source 41, a excimer laser or a 4th harmonic wave Q-switch YAG laser may be used, for example.

The laser light 11 selected by the programmable shutter 42 is introduced into an attenuator 43 in which the power of the laser is manipulated to have a predetermined power. Then, the laser light reaches the photomask 12 by way of a condenser lens 44. The condenser lens 44 generally includes an aspheric lens 44a and a plano-convex lens 44b, and equalizes the intensity distribution of light at the mask surface. Furthermore, it can effectively direct the energy beam flux into the imaging lens 15.

Then, the intensity distribution of the laser light 11 is changed in accordance with the desired magnetic pattern by the photomask 12 and the laser light 11 is passed through the imaging lens 15. This forms a reduced image on the surface of the disk 1.

Figure 9:
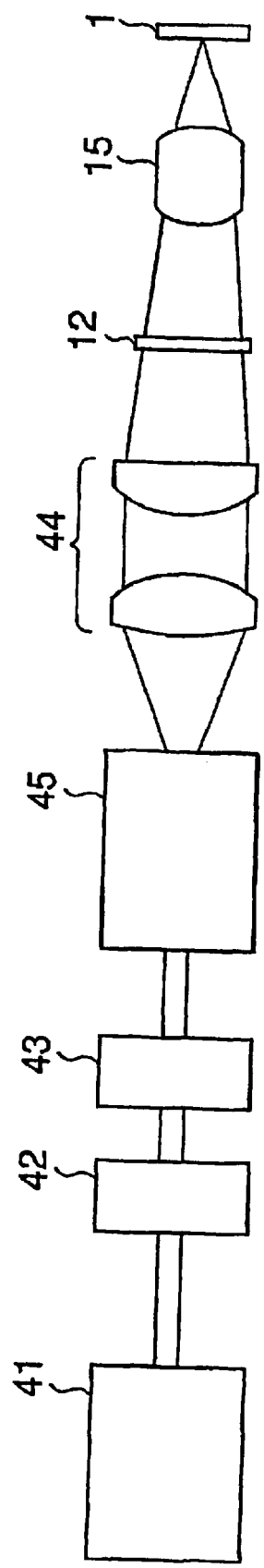
FIG. 9 is a diagram of another exemplary optical system for irradiating energy beams according to the present invention.

FIG. 9 shows another exemplary construction of the optical system for irradiating laser light used in the present invention wherein the same reference numerals designate the same or corresponding parts.

Pulsed laser light 11 emitted from the pulse laser light source 41 reaches the beam expander 45 through the programmable shutter 42 and the attenuator 43. The beam expander 45 is used to increase the beam diameter before image formation in cases where the reduction ratio of the mask projection is increased.

The laser light 11 is then passed through the condenser lens 44 to reach the photomask 12 in which the intensity distribution of the laser is changed in accordance with the desired magnetic pattern. The changed laser light 11 is then passed through the imaging lens 15 and a reduced image is formed on the surface of the disk 1.

In order to equalize the light intensity distribution, a homogenizer may be used instead of the condenser lens. Alternatively, a condenser lens and a homogenizer may be used together.

Alternatively, when such approaches to equalizing are not used, a slit or the like may be used to block a low intensity portion and to transmit only a portion that has a relatively uniform intensity distribution.

Figure 10:
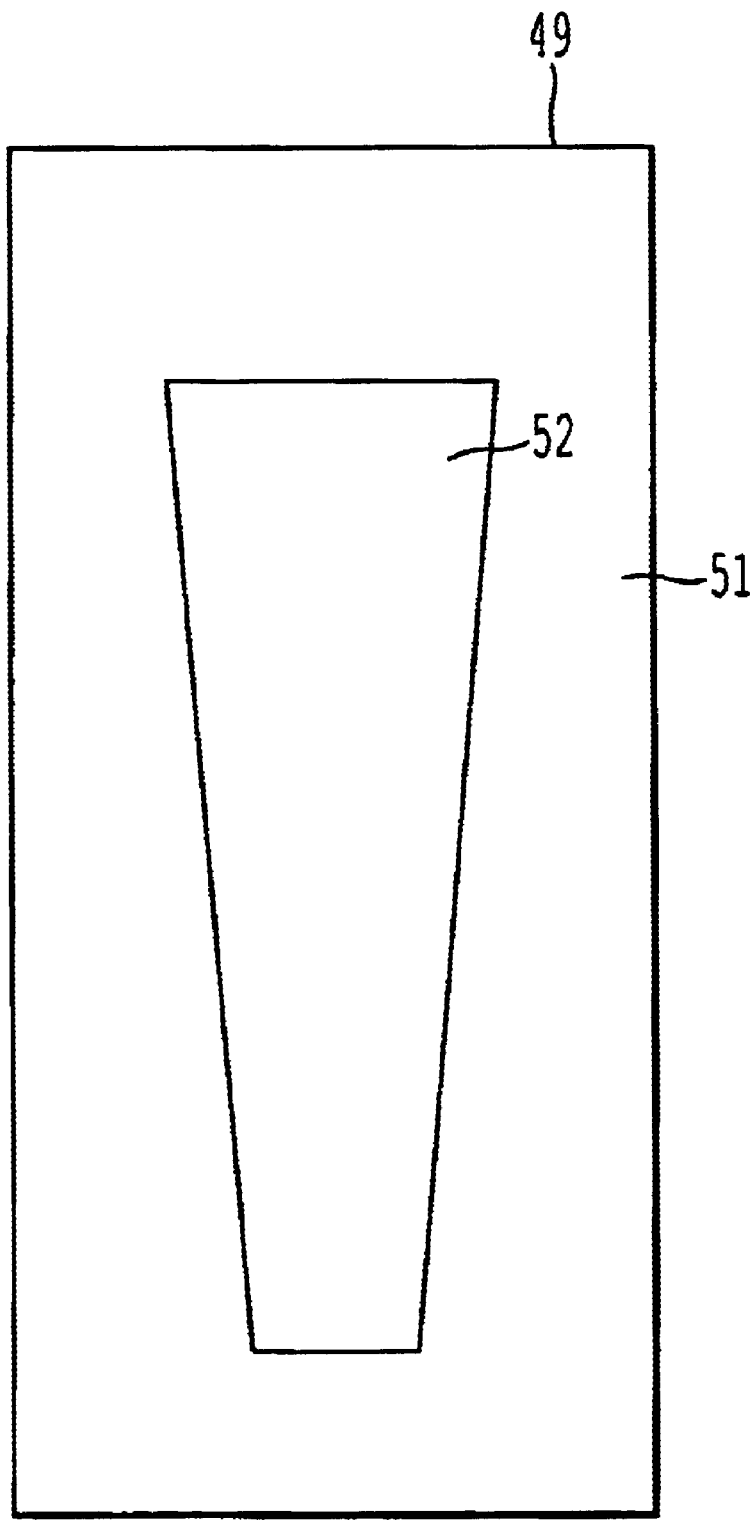
FIG. 10 is a diagram illustrating an exemplary shading plate used in the present invention.

Further, the energy beams may be shaped into a desired beam shape using a shading plate. FIG. 10 is a diagram showing an example of the shading plate 49. The shading plate 49 includes a substrate 51 that prevents laser light 11 from passing therethrough and a laser transmitting portion 52 that has a shape that corresponds to the desired beam shape. In FIG. 10, a substantially sector shape is shown as an example. However, other shapes such as a substantially rectangular shape may be used.

The shading plate prevents the laser irradiation from reaching an undesired area and prevents re-irradiation of laser light onto an area where the magnetic pattern has already been formed. However, the shading plate is provided as needed. Although the position of the shading plate is not limited to a particular location, it is desirable to locate it just before or just after the mask.

The structure and the order of the components of the optical system described above may be changed as needed in accordance with the present invention.

The second external magnetic field source may be positioned at either side of the disk. In the above-described embodiment, however, the second external magnetic field source is positioned at the disk surface side onto which the laser is irradiated. This precludes blocking the laser by the second external magnetic field source. However, the second external magnetic field source may also be disposed at the side which is laser irradiated when the second external magnetic field source has been designed not to block the laser light. If a strong magnetic field is desired, the magnetic field source is preferably disposed at both sides of the disk.

Next, a description of the method for producing a magnetic recording medium according to the present invention will be given.

The method for producing a magnetic recording medium according to the present invention includes the formation of a magnetic layer and a protective layer on a substrate, the formation of a lubricant layer and the above-described magnetic patterning. Accordingly, a fine pattern can be precisely and easily formed in a short time. When the surface roughness Ra after the formation of a magnetic pattern is 3 nm or less, there are almost no projections and recesses, and therefore, the movement of flying type/contact type head is precluded from becoming unstable. The formation of the magnetic layer, the protective layer, and the lubricant layer can be conducted according to conventional methods. For example, the magnetic layer and the protective layer can be formed by sputtering or CVD, and the lubricant layer can be formed by a dip coating.

The magnetic pattern formation may be used for recording data. However, it is preferably used for forming a control pattern used to control a recording/reproduction magnetic head because a magnetic recording medium that permits highly accurate control such as position control or synchronization control for the head can be kept stable.

In the production method of the present invention, the lubricant layer may be formed after the formation of a magnetic pattern or, more preferably, both before and after the formation of the pattern.

When a magnetic pattern is formed using the combination of heating of a local area and the application of an external magnetic field, a partial decrease in the amount of the lubricant on the magnetic recording medium may occur due to the heating. Further, the contact of the lubricant layer to the mask may also decrease the amount of lubricant.

The decrease in the amount of lubricant decreases the impact resistance and the durability to the magnetic head. Accordingly, it is preferred that an additional lubricant layer be formed after the formation of the magnetic pattern by the combination of local heating and the application of an external magnetic field. This is done to provide a sufficient layer thickness and hence achieve a high impact resistance and a durable magnetic head.

In this case, two exemplary embodiments are provided.

Embodiment A: no lubricant layer is formed before the formation of a magnetic pattern, and a lubricant layer is formed after the formation of the magnetic pattern.

Embodiment B: A first lubricant layer is formed before the formation of a magnetic pattern, and a second lubricant layer is formed after the formation of the magnetic pattern.

Each of the embodiments will be described in detail.

Embodiment A

A magnetic disk is produced by forming a NiAl underlayer, a CrMo underlayer, a Co type alloy magnetic layer, a diamond-like carbon protective layer, and so on by sputtering onto a glass substrate or an aluminum alloy substrate, for example.

Then, an inspection of defects (certification) is carried out with, for example, a non-contact optical surface testing device. The lubricant layer is unnecessary because high speed testing can be conducted and the magnetic head is not used.

A magnetic pattern is formed according to the above-described method. For example, a strong external magnetic field is applied to the magnetic disk to uniformly magnetize the magnetic layer along a desired direction before heating and then a desired portion is heated to a level close to the Curie temperature. At the same time, the heated portion is magnetized by applying an (second) external magnetic field in the opposite direction to produce the magnetic pattern. Then, the lubricant layer is formed by depositing lubricant.

In Embodiment A, since no lubricant layer is formed before the formation of the magnetic pattern, there is no danger of scattering, diffraction, and/or interference of the energy beams due to the presence of the lubricant layer. Further, the magnetic recording medium can be brought into intimate contact with the mask, and therefore the deposition of lubricant onto the mask is avoidable. Accordingly, diffraction of the energy beams can be minimized, and a magnetic pattern of clear shape and high signal output can accurately be formed.

Further, since a lubricant layer that has a sufficient thickness can be provided after the formation of the pattern, the impact resistance and the durability to the magnetic head are high.

As the final production step, the magnetic disk is usually burnished using a burnishing head in order to remove projections that are a predetermined height or larger. Then, the presence or absence of projections is determined and the inspection of defects (certification) is performed in order to determine the position and the number of defects. They can be detected by the recording/reproduction of a specified pattern using a magnetic head.

This embodiment is preferably applied to cases where the recording/reproduction of data are carried out by the magnetic head before the formation of a magnetic pattern and tests and evaluation are not conducted. For example, it is possible to conduct tests without using a magnetic head such as a non-contact optical surface testing device before the pattern formation. Tests may be conducted by the magnetic head after the deposition of the lubricant layer and the formation of the pattern. Alternatively, it is possible that tests by the magnetic head not be conducted at all.

Generally, the lubricant layer deposition is performed by coating lubricant using, for example, spin coating, dip coating, spray coating, or other coating methods. Dip coating is appropriate when forming uniform lubricant layers on a large number of media in a short time.

The lubricant preferably includes perfluoropolyether, dialkylamidecarboxylate, perchloropolyether, stearic acid, sodium stearate, phosphoric acid ester, or the like having an ester linkage. The ester linkage may be in any site in the molecule. However, when the ester linkage is at a terminal position, a movable part of the molecules is elongated and lubricating properties are easily obtained.

In particular, perfluoropolyether having $-C_aF_{2a}O-$ unit (where a is an integer between 1–4) in the main chain and an ester linkage at a terminal position is preferable. More preferably, there is a perfluoroether represented by the following general formula (I):

$$R-O-(A^1-O-A^2-O)_x-R \qquad (I)$$

where each end $A^1$ and $A^2$ is $CF_2$ and/or $C_2F_4$. The proportion of $CF_2$ to $C_2F_4$ as $A^1$ and $A^2$ ($CF_2/C_2F_4$) is 5/1 to 1/5. X is between 10–500 and R represents an alkyl group with 1–20 carbons that contain a hetero atom or a fluorinated alkyl group.

For example, Fomblin-Z-DOL manufactured by Ausimont Company is a copolymer of $CF_2CF_2O$ and $CF_2O$ that has a linear chain structure and an ester group-COOR (R represents an alkyl group which may be fluorine-substituted) at both terminals. Further, Demnum (SP or SY) manufactured by Daikin Company is a homopolymer of hexafluoropropylene oxide that has an ester group-COOR at one terminal (where R represents an alkyl group which may be fluorine-substituted).

The number average molecular weight of the lubricant is preferably 100–10,000 and more preferably 2,000–6,000. When the molecular weight is too low, vapor pressure will be high, and evaporation progressively occurs after coating. As a result, the layer thickness as originally deposited decreases with time. On the other hand, when the molecular weight is too high, viscosity will increase and the desired lubricating properties cannot be obtained.

Preferably, Fomblin-Z-DOL (tradename) or Fomblin-Z-Tetraol (tradename) manufactured by Ausimont Company may be used.

A solvent that is suitable for dissolving these materials may include a flon (fluoro-chlorocarbon), an alcohol, a hydrocarbon, a ketone, an ether, an aromatic molecule, or the like.

It is preferred to conduct the heat treatment after the formation of the lubricant layer in order to enhance chemical bonding of the lubricant and the medium.

The heating temperature is generally 50° C. or higher. However, the temperature is properly selected to be lower than the decomposition temperature of the lubricant. The heating temperature is commonly 100° C. or lower.

The thickness of the layer formed by coating the lubricant is preferably 10 nm or less. When the thickness is excessively large, the expected lubrication properties cannot be obtained and an excessive amount of lubricant shifts to an outer portion of the disk during rotation. It is thus likely that a layer thickness variation between inner and outer portions will occur. However, when the thickness is too small, the expected lubrication properties cannot be obtained. Therefore, the thickness is preferably 0.5 nm or more, more preferably 1 nm or more, and particularly preferably 1.5 μm or more.

Embodiment B

An exemplary magnetic disk can be produced by providing a NiAl underlayer, a CrMo underlayer, a Co alloy magnetic layer, a diamond-like carbon protective layer, and so on by sputtering on a glass substrate or a substrate of aluminum alloy or the like, and then, forming a first lubricant layer thereon.

Then, the magnetic disk is burnished with a burnishing head to remove projections larger than a predetermined height. The presence or absence of the projections is determined. Further, an inspection of defects (certification), where the position and the number of defects are determined by recording or reproducing a specified pattern with a magnetic head, is conducted.

Then, a magnetic pattern is formed in the same manner as described in regard to Embodiment A.

According to Embodiment B, since the first lubricant layer is already formed, the recording or reproduction of data using a magnetic head can be conducted before the formation of the magnetic pattern, as can various tests and evaluation procedures. For example, the position and the number of defects can be determined by recording or reproducing a specified pattern using the magnetic head. The test conducted before the formation of the magnetic pattern dispenses with the need to erase the specified pattern used for the test because the specified pattern is overwritten with a desired magnetic pattern. The presence of projections and/or dust causes irregular reflection of energy beams making the magnetic pattern disordered. Accordingly, it is desirable to perform the inspection prior to magnetic pattern formation so that media free from projections or dust can be selected. Further, since the magnetic pattern is formed in media which pass the test, unnecessary processing can be reduced and the costs thereof spared.

Further, the lubricant layer should be formed as early as possible after the formation of the protective layer because stable bonding of the lubricant layer with the protective layer is easily obtainable.

Usually, the lubricant layer has a fixed portion and a free portion. The lubricant on the magnetic recording medium (i.e., on the protective layer because it is generally the outermost plane of the medium) is physically and/or hydrogen bonded to the medium surface and is fixed. Namely, it is physically and/or hydrogen bonded firmly to the protective layer or the magnetic layer. Additionally, unfixed, free lubricant exists. It is necessary that both the fixed portion and the free portion exist in order to assure that the magnetic recording medium is sufficiently durable.

Based on studies by the inventors, it is believed that the portion of the lubricant layer which causes the loss of weight when heated is mainly the free portion, and little of the fixed portion is removed.

Accordingly, it is ideal that the first lubricant layer primarily forms the fixed portion which is difficult to volatilize even by heating. For this, the first lubricant layer should be as thin as possible, preferably 2.0 nm or less. The provision of a thin layer minimizes the scattering, diffraction, and interference of energy beams by the layer. Further, since the free portion of lubricant is small and the amount of vaporization is small even when the local area of the medium is heated, contact between the first lubricant layer and the mask can be prevented. With such measures, a magnetic pattern having a clear shape and a high signal output ability can be formed with good accuracy. The thickness is more preferably 1.0 nm or less.

On the other hand, it is necessary that the lubricant layer be thick in order to maintain the durability and impact resistance for long terms. For example, the thickness is preferably 1.5 $\mu$m or more. However, for testing purposes, the lubricant layer is sufficiently durable even though the thickness is small. Accordingly, the thickness of the first lubricant layer is preferably 0.1 nm or more, and more preferably 0.5 nm or more in order to withstand the short recording or reproduction using the magnetic head.

Alternatively, the first lubricant layer may be removed prior to the formation of the magnetic pattern after the magnetic recording medium has been tested using the magnetic head. In this case, problems such as the blockage of energy beams used for heating by the lubricant layer during magnetic pattern formation and decreases in the accuracy of the magnetic pattern due to deflection of the energy beams that have been irradiated through a mask due to an increased separation distance (due to the thickness of the lubricant layer between the mask and the magnetic recording medium) can be reduced. Further, the vaporization of the lubricant due to heating can be minimized, and accordingly there is no fear of lubricant contamination of the mask. For example, the first lubricant layer can be removed by washing using a solvating cleaning agent.

Then, a second lubricant layer that has a sufficient thickness can be formed after the pattern formation in order to compensate for a decrease of the lubricant layer thickness during heating or in order to re-constitute the removed lubricant layer. This can provide high impact resistance and durability to the magnetic head. Since the second lubricant layer forms the free portion of the lubricant layer, the thickness can be small in comparison to the case where the lubricant layer is only formed once. When the lubricant layer is too thick, the head is apt to stick to the medium and it is difficult to make the head fly.

The lubricant layer is generally deposited by, for example, spin coating, dip coating, spray coating, or another appropriate coating method. Among these, dip coating is suitable for forming a uniform lubricant layer on a large number of media in a short time. However, for the purpose of forming a thin film, spin coating where the lubricant is spread upon the medium surface using centrifugal force is also suitable.

Further, it is preferred that the concentration of the lubricant, when forming the second lubricant layer, be lower than the concentration of the lubricant when forming the first lubricant layer. Preferably, concentration is about 50% or less of the concentration of the lubricant first applied, and more preferably about 10–20% of the concentration of the lubricant first applied.

The lubricant that forms the second lubricant layer may be different from the lubricant that forms the first lubricant layer. However, the same lubricant is preferably used in order to simplify the process. When the same lubricant is used for the first and second lubricant layers, the lubricant layers form a single unitary layer.

Suitable lubricants and solvents can be the same as those described in regard to Embodiment A.

The thickness of the fixed portion of the lubricant layer which is physically and/or hydrogen bonded to the medium varies depending on the kind of lubricant used. The thickness is commonly in a range of about 0.5–1.0 $\mu$m. Lubricant that have a terminal polar group are generally thick. For example, the lubricant Fomblin-Z-DOL (tradename) manufactured by the Ausimont Company has no terminal polar group. Accordingly, the fixed portion is relatively thin. Since such a lubricant that has a high molecular weight exhibits a high viscosity and poor flow properties(i.e., it is difficult to flow), it tends to be thick. The above-mentioned DOL series tends to increase in thickness as molecular weight increases.

Alternatively, in order to control the layer thickness of the lubricant accurately, the lubricant may be washed using an appropriate solvent before the formation of a magnetic pattern. The lubricant may be coated again after the formation of the magnetic pattern.

The solvent used for cleaning may easily solvate the lubricant and be non-corrosive towards the medium, such as a flon (fluoro-chlorocarbon), an alcohol, a hydrocarbon, a ketone, an ether, a fluorinated molecule, an aromatic molecule, or the like.

It is preferred that a heat treatment be performed after the formation of the lubricant layer in order to enhance the chemical bonding of the lubricant to the medium. The temperature during heating is commonly 50° C. or higher. However, the temperature should be selected to be lower than the decomposition temperature of the lubricant. Generally, the temperature is 100° C. or lower.

The total layer thickness of the lubricant is preferably 10 nm or less. If the thickness is too large, the desired lubrication properties cannot be obtained and an excessive amount of the lubricant moves to the outer portion of the medium during rotation. Thus, it is likely that a variation in film thickness between the inner and outer portions of the medium may occur. However, if the thickness is too small, the desired lubrication properties cannot be obtained. Therefore, the thickness is preferably 0.5 $\mu$m or more, more preferably 1 nm or more, and particularly preferably 1.5 nm or more.

Next, an exemplary magnetic recording device according to the present invention will be described.

The magnetic recording device of the present invention includes a magnetic recording medium in which a magnetic pattern is formed according to the above-described magnetic pattern forming method, a driver that drives the magnetic recording medium in a recording direction, a magnetic head that has a recording portion and a reproducing portion, a motion device that moves the magnetic head relative to the magnetic recording medium, and recording/reproduction signal processor which supplies a recording signal to the magnetic head and receives a reproducing signal from the magnetic head. As the magnetic head, a flying /contact magnetic head is generally used to perform high density recording.

Such a magnetic recording device is capable of high density recording because the magnetic recording medium in which a magnetic pattern (such as a fine, highly precise servo pattern and so on) is formed is used. Further, the use of flaw-free and lower defect media lessens the occurrence of errors during recording.

Precise servo signals can easily be obtained using the magnetic recording device in which, after the magnetic recording medium has been inserted into the device, the above-described magnetic pattern is reproduced by the magnetic head to obtain signals and the servo burst signals produced based on such signals are recorded by the magnetic head.

Further, it is preferable that signals recorded as the magnetic pattern formed by the present invention remain in an area which is not used for a user's data after the servo burst signals have been recorded by the magnetic head. In this case, the magnetic head can easily be moved to a desired position even when a positional deviation of the magnetic head occurs due to a disturbance. Accordingly, such a magnetic recording device that has signals produced by both recording methods is highly reliable.

A magnetic recording device according to the present invention need not necessarily include an energy beam source. Indeed, in some embodiments, it is preferable that no energy beam source be included since the recording medium can include a lubricant layer. A relatively low molecular weight portion of the lubricant layer is apt to be vaporized during heating by an energy beam, and the thickness of the lubricant layer is reduced at the heated area. The vaporized lubricant could furthermore contaminate a head of the magnetic recording device.

A typical example of a magnetic disk device that forms a magnetic recording device will be described.

The magnetic disk device generally includes a shaft that holds one or more magnetic disks by penetration, a motor that rotates the shaft and magnetic disk or disks connected to the shaft through a bearing or bearings, a magnetic head for recording and/or reproducing information, an arm attached to the head and an actuator for moving the head via the arm to a desired position relative to the magnetic recording medium. The head for recording/reproduction is moved above the magnetic recording medium at a constant flying height. Data or information is recorded by the magnetic head after it has been converted into recording signals via the signal processor. Further, reproducing signals received by the magnetic head are inverted by the signal processor and a reproducing information is obtainable.

Information signals are recorded for each sector of the disk along tracks formed concentrically in the disk. A servo pattern is generally recorded between sectors. The magnetic head takes the servo signals from the servo pattern whereby the head correctly tracks along the center of a track to read the information signals in the sectors. When recording, tracking is performed as well.

As described above, since the servo pattern used to generate servo signals is used for tracking the recording information, high accuracy is particularly required. Further, since a common, widely used servo pattern is contains two sets of patterns per track with the patterns mutually shifted by ½ pitch, it is necessary to form the servo pattern for each ½ pitch of information signals and accuracy is required twice.

However, in conventional servo pattern forming methods, vibrations in the magnetic recording device result because the center of gravity of the outer pin is different from that of the actuator. Accordingly, the minimum width of the track is commonly considered to be about 0.2–0.3 $\mu$m. Therefore, the accuracy of the servo pattern cannot follow an increase of track density, and it is difficult to improve recording density and to reduce the cost of the magnetic recording device.

According to the present invention, since a highly accurate magnetic pattern can effectively be formed using the reduced image forming technique described above, the servo pattern can be accurately formed at a very low cost in a short time, relative to conventional servo pattern forming methods. For example, the track density of the medium can be increased to 40 kTPI or more. Accordingly, the magnetic recording device using a medium according to the present invention permits high density recording.

Further, use of a phase servo system provides continuously changing servo signals where the track density can be increased. Since tracking when the width of the pattern is 0.1 $\mu$m or less is possible, higher density recording can be performed.

As described above, a magnetic pattern that extends linearly in an oblique direction with respect to the radius of the disk from its inner circumferential portion to an outer circumferential portion is used in the phase servo system. A continuous pattern continuous in the radial direction or a pattern oblique to the radius was difficult to form by conventional servo pattern forming methods where the servo signal was recorded for each track while the disk was rotated and complicated calculations or a complicated system structure were needed.

According to the present invention, however, since it is enough to prepare a mask a single time and to irradiate energy beams through the mask, the desired pattern can easily be formed, making the medium for the phase servo system easy and economical to form in a short time. Further, a magnetic recording device that is capable of high density recording using the phase servo system can be provided.

In conventional, widely used servo pattern forming methods, a medium is inserted into a magnetic recording device (drive), and then a servo pattern is formed with a dedicated servo writer in a clean room.

Each drive is mounted on the servo writer. The pin of the writer is inserted into the opening formed in either the front surface or the rear surface of the drive, and each pattern is recorded along a track while the magnetic head is mechanically moved. This takes as much time as about 15–20 min per drive. Since the dedicated servo writer must have access to the medium and an opening is formed in the drive, these operations have to be conducted in a clean room and the processes are complicated. The, the cost of manufacturing increases.

In the present invention, by irradiating energy beams through a mask in which the pattern has previously been recorded, the servo pattern or the standard pattern for recording the servo pattern can be recorded at a single time. Thus, the servo pattern can be formed in the medium in a short time in a very simple manner. The magnetic recording device according to the present invention thus does not require the above-described servo pattern writing step using a dedicated servo writer.

The magnetic recording device with a medium in which the standard pattern for recording the servo pattern is formed permits the writing of a desired servo pattern on the basis of the standard pattern. Therefore, the above-described dedicated servo writer is unnecessary, and the operations in the clean room are also unnecessary.

Further, since it is unnecessary to form an opening on any side of the magnetic recording device, the device is more durable, reliable, and safe.

Further, since the mask does not contact the medium, damage of the magnetic recording medium due to contact with another structural member or due to the interposition of fine dust or foreign matter can be prevented. This prevents the occurrence of defects.

As described above, according to the present invention, a magnetic recording device that is capable of high density recording is obtainable by simple steps at a low cost.

Various kinds of magnetic heads such as a thin film head, a MR head, a GMR head, a TMR head, and so on may be used. By using a MR head as the reproducing portion of the magnetic head, a sufficient signal intensity can be obtained even in high density recording and a magnetic recording device of higher recording density can be realized.

When the magnetic head is moved at a flying height of not less than 0.001 μm but not more than 0.05 μm, signal output is improved to provide a high S/N and a large capacity and highly reliable magnetic recording device can be provided.

Further, when these techniques are combined with a signal processing circuit that uses a special decoding method, the recording density can further be improved. For example, a sufficient S/N can be obtained when recording or reproducing is performed with a track density of 13 kTPI or more, a linear recording density of 250 kFCI or more, and a recording density of 3 G bits or more per square inch.

Further, the signal intensity can further be increased by forming the reproducing portion of the magnetic head from a plurality of electrically conductive magnetic layers which provide a large change in resistance due to a relative change of mutual magnetization direction due to the application of an external magnetic field. Alternatively, a GMR head that includes an electrically conductive non-magnetic layer located between the plurality of electrically conductive magnetic layers, or a GMR head utilizing a spin-valve effect can be used. With such magnetic heads, a highly reliable magnetic recording device that has a recording density of 10 G bits or more per square inch and a linear recording density of 350 kFCI or more can be realized.

A problem may arise when a magnetic disk in which a servo pattern is written (preservo disk) is attached to the rotating shoat (spindle) of a magnetic recording device. Namely, when the disk is assembled in the magnetic recording device, the servo pattern is apt to be eccentric to the rotating shaft because the center of the disk is not precisely aligned with the axial center. In this case, accordingly, the following example approaches for correcting this problem are available. Namely, after the preservo disk has been inserted into the magnetic recording medium, the eccentricity of the servo track of the disk is measured by firmware at a side of the magnetic recording device. Then, an eccentricity-free tracking pattern is written anew on the basis of the measurement result.

However, the use of such correction approaches increases cost. Although the position of the head can be controlled without re-writing the servo pattern, an additional tracing of the head for the amount of eccentricity of the disk has to be done. This makes it difficult to reduce the power consumption. With an increase in track density, this problem is more significant.

In view of the above, it is preferable that a hub structure capable of being firmly attached to the rotating shaft of the magnetic recording device be provided at a central portion of the substrate of the magnetic disk. The servo pattern is then recorded according to the above-described magnetic pattern forming method by taking the center of rotation of the hub structure as standard.

Since the hub structure can be firmly attached to the rotating shaft of the magnetic recording device (for reading the servo pattern), the center of rotation of the hub structure, i.e., the center of rotation of the substrate can be in agreement with the axial center of the rotating shaft when the hub structure is attached to the rotating shaft. Further, since the servo pattern is recorded by taking the center of rotation of the hub structure as standard, it is co-axial to the axial center of the rotating shaft when the hub structure is attached to the rotating shaft.

It is preferred that the hub structure have a thickness that is larger than the thickness of the substrate in order to increase the accuracy of attachment to the rotating shaft of the magnetic recording device. The servo pattern is in fact recorded by taking several positions as the standard. Namely, the servo pattern is recorded by taking an inner circumferential surface of a cylindrical central opening as the standard. This is formed in the hub structure to which the rotating shaft is fitted. Alternatively, the servo pattern is recorded by taking an outer circumferential surface as standard. This is formed in the hub structure, the outer circumferential surface being co-axial with the center of revolution.

An explanation will now be presented in more detail with reference to drawings.

FIGS. 11–16 are respectively longitudinal cross-sectional views of an important portion of the disk according to the present invention.

The disk includes a substrate 401 in which a servo pattern is recorded and a hub structure 402. The substrate 401 is a thin, plate-like information recording member for recording information. On a recording surface of the disk (a recording surface of the substrate 401), tracks for recording information are formed in a specified format. Further, servo signal recording areas (servo tracks) for generating servo signals are formed in spaces between adjacent tracks extending continuously in a direction perpendicular to the direction of motion of the head. A servo pattern for generating control signals for tracking servo in determining the position of the head (a train of codes for generating servo signals) is recorded in the servo signal recording areas. The servo pattern is not limited to a tracking pattern to produce servo signals, but may be a reference pattern for recording the tracking pattern (a train of codes for generating reference signals).

The hub structure 402 whose wall thickness is larger than that of the substrate 401 is provided in the central portion of the disk in order to read the servo pattern without using the above-described correction mechanism. The hub structure 402 is adapted to be tightly attached to a rotating shaft (spindle) 403 of a rotating mechanism in a device for reading the servo pattern such as a hard disk device (herein referred to as a "magnetic recording device"). The servo pattern is recorded by taking the center of revolution of the hub structure 402 as the standard.

Figure 11:
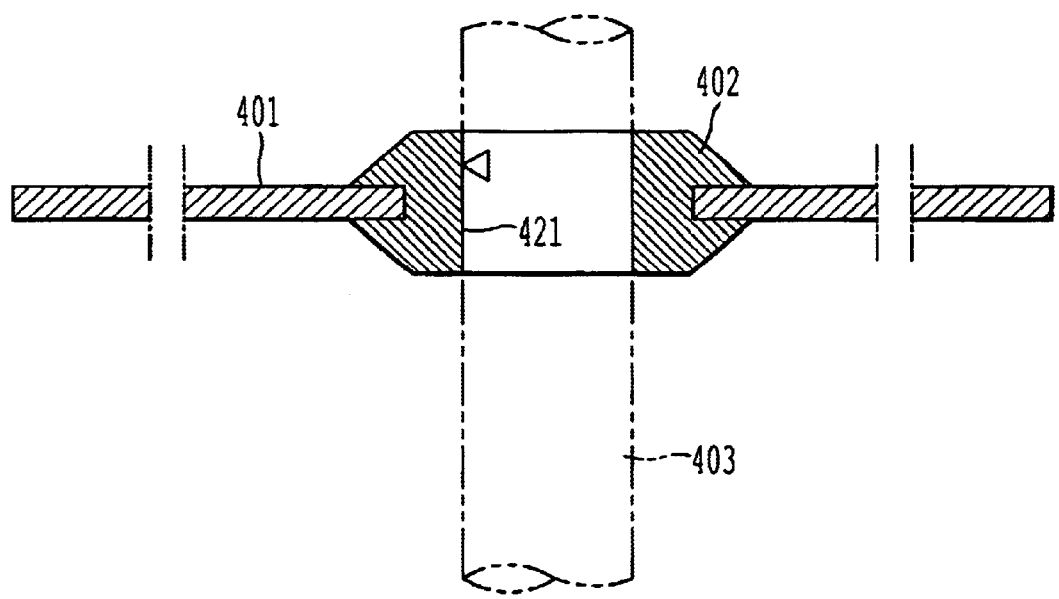
FIG. 11 is a longitudinally cross-sectioned view showing the structure of the main portion of the disk according to the present invention.

As shown in FIG. 11, the substrate 401 is a doughnut-like thin plate and the hub structure 402 is provided at the central opening of the substrate 401. The hub structure 402 is generally made of a metal such as aluminum, brass, iron, stainless steel, or the like. For the hub structure 402 attached to the substrate 401 before the formation of layers by sputtering, thermal resistance is required as well as formability. Accordingly, an aluminum alloy is preferably used as the material that forms the hub structure 402. Further, the hub structure 402 may be formed of a synthetic resin such as polycarbonate, nylon, ABS resin, or the like if it is attached just before the servo pattern is written.

The disk can be produced by making the substrate 401 in the same manner as a conventional disk is made, attaching the separately prepared hub structure 402 to the substrate 401, and recording a predetermined servo pattern in the substrate 401. For a synthetic resin disk formed by one-piece molding, the disk is prepared mainly by integrally producing the substrate 401 and the hub structure 402 and recording a predetermined servo pattern in the substrate 401.

The hub structure 402 made of, for example, metal is generally subjected to machining such as grinding. The hub structure 402 is generally formed to have a wall thickness which is about 3–10 times as large as that of the substrate 401. Through this relatively large thickness, the fitting accuracy of the hub structure 402 is on the rotating shaft 403 of the magnetic recording device can further be increased. The hub structure 402 is should be tightly fitted to the rotating shaft 403 (without looseness) as described above. Specifically, the diameter of a central opening 421, which is used as the standard when recording the servo pattern, should have a tolerance in the range of about 0 to −40 $\mu$m, preferably in a range of about −20 to −40 $\mu$m relative to the diameter of the rotating shaft 403, so that the hub structure 402 can be press-fitted to the rotating shaft 403. Regarding the tolerance, the minus ("−") sign indicates that the diameter of the central opening 421 is smaller than the outer diameter of the rotating shaft 403.

If the hub structure 402 is made of an aluminum alloy, the hub structure 402 is formed to have a cylindrical deformable portion (not shown) on at least one end side. By inserting the cylindrical deformable portion into the central opening of the substrate 401 and deforming the inserted portion as if caulking is conducted, the hub structure 402 can be attached to the substrate 401 as shown in FIG. 11. The hub structure 402 can be attached at any time between the preparation of the original plate for the substrate 401 and just before the recording of the servo pattern in the substrate 401.

The servo pattern is recorded by taking the center of rotation of the hub structure 402 as the standard. Specifically, the hub structure 402 is provided with a cylindrical central opening 421 to which the rotating shaft of the magnetic recording device is tightly fitted, as shown in FIG. 11, and the servo pattern is recorded by taking the inner circumferential surface of the central opening 421 of the hub structure 402 as the standard (the triangle mark indicates the reference point), as shown in FIG. 11. Thus, the servo pattern can be concentrically recorded around the rotation center of the hub structure 402, and eccentricity in the servo pattern, which may arise when the magnetic disk is assembled in the magnetic recording device, can be prevented.

The recordation of the servo pattern is conducted according to the above-described magnetic pattern forming method.

Figure 12:
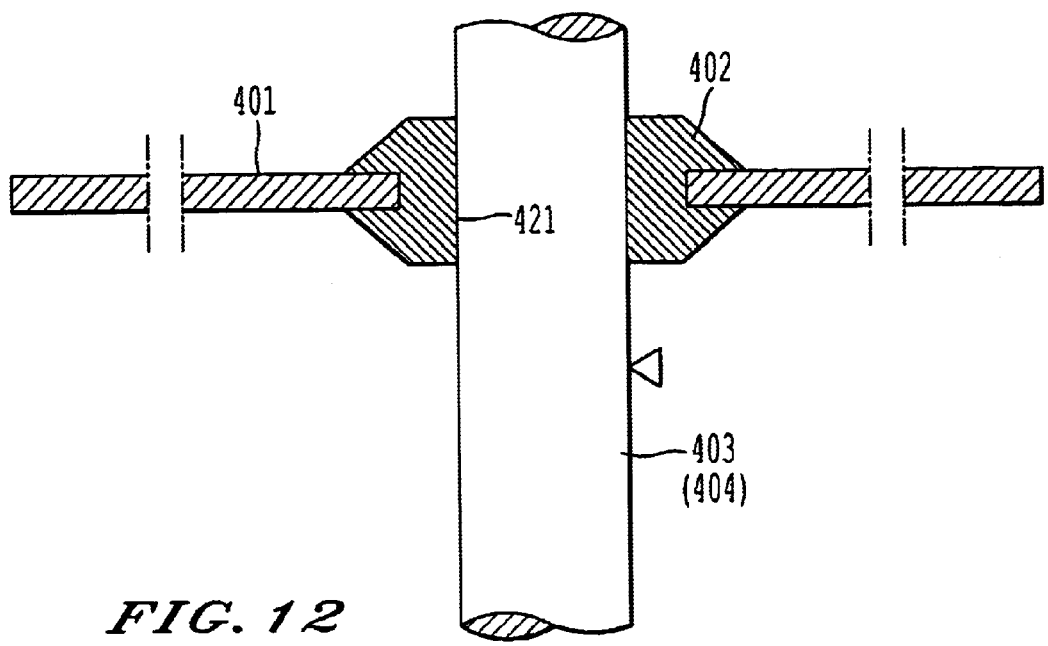
FIG. 12 is a longitudinally cross-sectioned view showing the structure of the main portion of the disk according to the present invention.

As shown in FIG. 12, the tolerance of the diameter of central opening 421 of the hub structure 402 relative to the diameter of the rotating shaft or shaft 404 (herein referred to as the "shaft") of the magnetic pattern forming device (herein referred to as "a pattern forming device") is denoted using a negative sign. The standard for recording the servo pattern can be assigned to an outer circumferential surface of the shaft 404 at the side of the pattern forming device instead of the inner circumferential surface of the central opening 421 (a triangle mark indicates a reference point in FIG. 12).

Before the servo pattern is recorded, the shaft 404 is inserted into the central opening 421 of the hub structure 402 by pushing the hub structure 402 onto the shaft 404. This should be done in consideration of the removal of the shaft 404 after the recording. Accordingly, the tolerance in the diameter of the central opening relative to the diameter of the shaft 404 is in the range of about 0 to −10 $\mu$m.

Namely, the mask in which the servo pattern is formed and a disk to which image printing is conducted are arranged coaxially with respect to the axial enter of the pattern forming device. Then, the formation of the servo pattern is conducted on the disk by taking the center of rotation of the disk as standard, and the servo pattern can be formed with substantially no eccentricity. Namely, according to the method for producing a disk according to the present invention, the mask and the disk printed are coaxially arranged whereby precise alignment of the mask to the disk is obtainable. Accordingly, the servo pattern in the mask can be printed to the disk without eccentricity.

The hub structure 402 can be tightly fitted to the shaft 404 of the pattern forming device by determining the above-described tolerance for fitting. Further, by utilizing the structure of thickened wall, i.e. the length of the central opening 421, the hub structure can be fitted to the shaft 404 with high dimensional accuracy without inclination, thereby placing the center of rotation of the hub structure 402, i.e., the center of rotation of the substrate 401, in alignment with the axial center of the shaft 404 of the pattern forming device. Accordingly, the servo pattern can be concentrically recorded by taking the center of rotation of the substrate 401 as the standard.

Also, the hub structure 402 is tightly fitted to the rotating shaft 403 of the magnetic recording device (without looseness) by determining the tolerance to be between 20 and −40 $\mu$m. Further, by utilizing the structure of the thickened wall, the hub structure can be fitted to the rotating shaft 403 with a dimensional higher accuracy and without inclination. Accordingly, the center of rotation of the hub structure 402, i.e., the center of rotation of the substrate 401, can be in agreement with the axial center of the rotating shaft 403 at the side of the magnetic recording device.

Since the servo pattern is previously recorded in the substrate 401 by taking the center of rotation of the hub structure 402 as the standard, the position of the servo pattern in the disk is coaxial with the axial center of the rotating shaft 403 without eccentricity such that the hub structure 402 is attached to the rotating shaft 403 of the magnetic recording device.

Namely, with a hub structure 402 that has a specified structure, the disk can be precisely aligned with the shaft, and the standard for recording the servo pattern can be the same as the standard for reading it. Accordingly, the head can correctly read the servo pattern in an eccentricity-free state without using a special correction mechanism.

If the previously recorded servo pattern is only a standard pattern, a tracking pattern free from eccentricity can be correctly written on the basis of such a standard pattern. As a result, the cost for treating the servo signals can be reduced. In particular, such measures are effective for high density recording. Further, since the amount of tracking by the head is further reduced, the power consumption required to read and/or write information can further be reduced.

Figure 13:
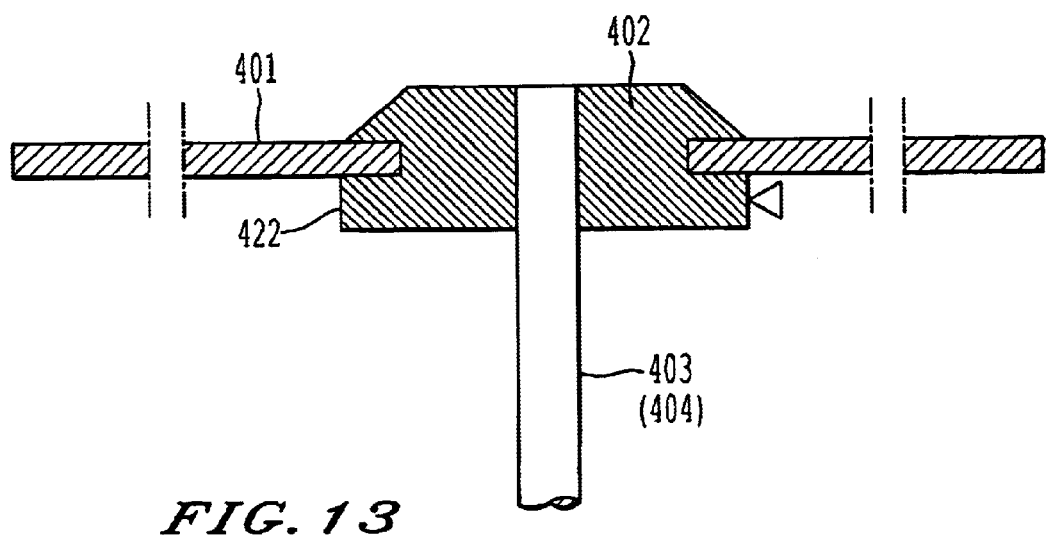
FIG. 13 is a longitudinally cross-sectioned view showing the structure of the main portion of the disk according to the present invention.
Figure 14:
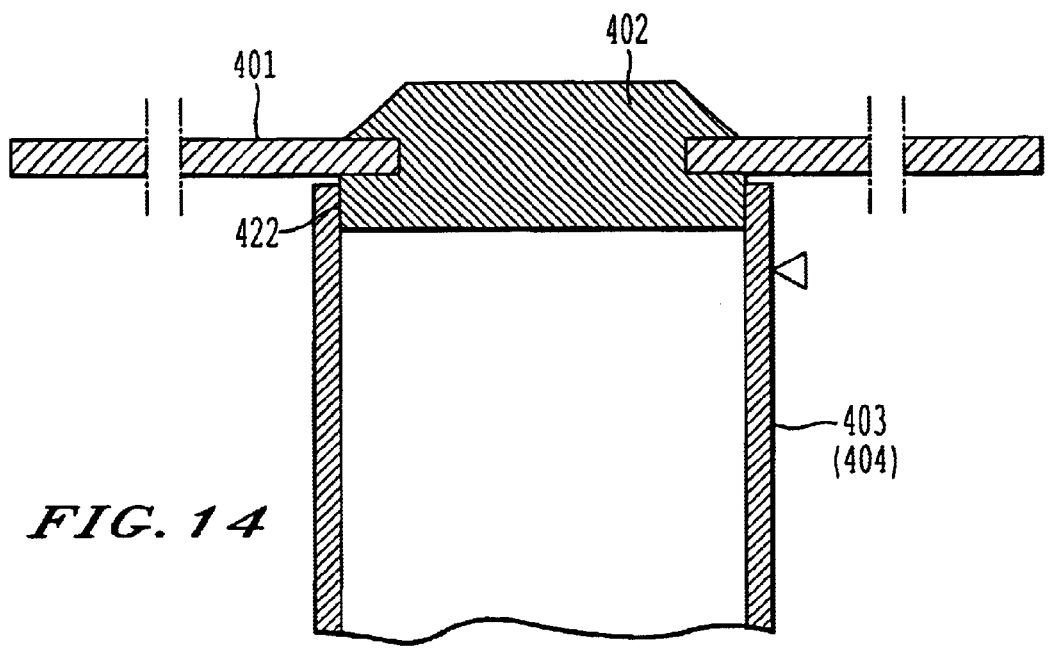
FIG. 14 is a longitudinally cross-sectioned view showing the structure of the main portion of the disk according to the present invention.

Further, the reference point of the hub structure relative to the disk may be determined at such positions as shown in FIGS. 13 and 14. Namely, the hub structure 402 has an outer circumferential surface 422 which is coaxial with its center of rotation, and the servo pattern is recorded by taking the outer circumferential surface 422 of the hub structure 402 as the standard.

Specifically, the hub structure 402 has a generally round, columnar shape with an upper end side that is in the shape of a frustum of cone. The hub structure 402 can be tightly fitted to the rotating shaft 403 of the magnetic recording device or the shaft 404 of the pattern forming device. Further, the cross-sectional shape of the round, columnar portion of the hub structure 402, which is taken perpendicular to the axial centerline of this portion, is a substantially true circle. Accordingly, the servo pattern can be recorded by taking the outer circumferential surface 422 of the round columnar portion of the hub structure 402 as the standard (the triangle mark indicates the reference point).

As described above, since the outer circumferential surface 422 of the hub structure 402 is formed in a substantially true circle, the center of which is coaxial with the center of rotation of the hub structure, the servo pattern can be coaxially recorded in the substrate 401 by taking the center of rotation of the hub structure 402 as the standard even if the outer circumferential surface 422 is determined to be the standard. The embodiment shown in FIG. 13 is effective when the rotating shaft 403 of the magnetic recording device or the shaft 404 of the pattern forming device is not exposed outside or has a small diameter that makes it is difficult to use as standard.

The sub structure 402 shown in FIG. 14 has substantially the same structure as shown in FIG. 13. The hub structure 402 is adapted to be tightly attached (without looseness) to the rotating shaft 403 of the magnetic recording device or the shaft 404 of the pattern forming device wherein the rotating shaft 403 or the shaft 404 is formed to have a larger diameter cylindrical shape. Namely, the round column portion of the hub structure 402 can be attached to the rotating shaft 403 or the shaft 404 by fitting it to an end opening of the rotating shaft 403 or the shaft 404. The cylindrical rotating shaft 403 or the shaft 404 having a larger diameter corresponds to a case-like rotating body attached to the actual rotating shaft that extends from a motor.

In this case also, if the cross-sectional shape of the outer circumferential surface 422 of the hub structure 402 and the rotating shaft 403 or the shaft 404 is a substantially true circle, and the axial center of these members is coaxial with each other in the same manner as the case of FIG. 13, the servo pattern can be concentrically recorded with respect to the substrate 401 by taking the center of rotation of the hub structure 402 as the standard, on the basis of the outer circumferential surface of the rotating shaft 403 or the shaft 404 being taken as standard.

Further, in a disk according to the present invention as shown in FIGS. 13 and 14, precise alignment of the disk to the shaft owing to the thickened wall structure and the tight fitting structure of the hub structure 402 can be obtained, and the standard used for recording the servo pattern can be the same as the standard for reading the servo pattern, in the same manner as the disk shown in FIGS. 11 and 12. Accordingly, the servo pattern can be correctly read by the head without using a special correction mechanism. Further, when the previously recorded servo pattern is only the standard pattern, a tracking pattern can be correctly written on the basis of the standard pattern. The rotating shaft 403 or the shaft 404 may be a shaft formed as an inner race of a bearing. Such a shaft is preferable because its outer circumferential surface assures a highly concentric arrangement with the center of rotation.

Also, the hub structure may be changed in that the servo pattern can previously be recorded by taking the center of rotation of the structure as standard. For example, the hub structure 402 shown in FIG. 15 includes a round columnar hub main body 423 that has a step portion: an outer circumferential portion that has a larger diameter and an outer circumferential portion that has a smaller diameter, and a fixing ring 424 attached to the outer circumferential portion of smaller diameter.

At the center of the hub main body 423, a cylindrical central opening 421 is formed into which the rotating shaft 403 of the magnetic recording device or the shaft 404 of the pattern forming device can be tightly fitted (without looseness). The inner diameter of the smaller diameter portion of the hub main body 423 is formed to tightly fit the central opening of the substrate 401 with the above-described tolerance (without looseness). The hub structure 402 is attached to the substrate 401 by press-fitting the fixing ring 424 to the outer circumferential portion of smaller diameter of the hub main body 423 which has been inserted into the central opening of the substrate 401.

In the disk provided with such a hub structure 402, the servo pattern is recorded by taking an inner circumferential surface of the central opening 421 of the hub main body 423 as the standard in the same manner as in FIG. 11. Alternatively, the servo pattern is recorded by taking an outer circumferential surface of the shaft 404 of the pattern forming device fitted to the central opening 421 as the standard substantially in the same manner as in FIG. 12. Further, the servo pattern can be recorded by taking the outer circumferential surface 422 of the hub main body 423 as the standard substantially in the same manner as in FIG. 13 as long as the outer circumferential surface 422 of the hub main body 423 is formed to have a substantially true circle with its center coaxial with the center of rotation of the hub structure 402 (triangle marks indicate each reference point in FIG. 15).

Figure 15:
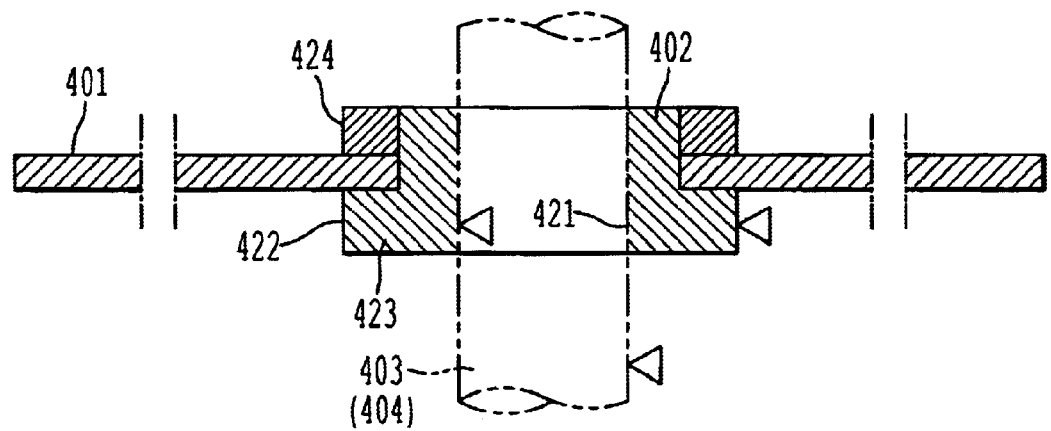
FIG. 15 is a longitudinally cross-sectioned view showing the structure of the main portion of the disk according to the present invention.

Furthermore, in the disk shown in FIG. 15, a servo pattern that is free from eccentricity can be recorded in the substrate 401 by taking the center of rotation of the hub structure 402 as the standard in the same manner as in the above-described embodiments. Further, when it is assembled in the magnetic recording device, precise alignment can be achieved owing to the unique features of the hub structure 402. Further, since the standard used for recording the servo pattern can be the same as the standard for reading, the servo pattern can be correctly read without using a special correction mechanism and a tracking pattern can be correctly written based on the standard pattern.

Figure 16:
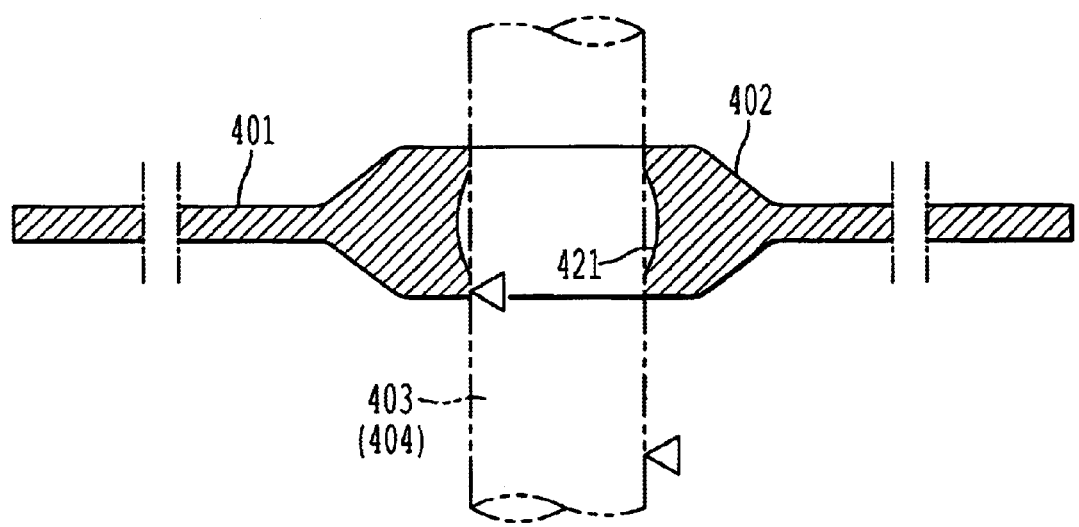
FIG. 16 is a longitudinally cross-sectioned view showing the structure of the main portion of the disk according to the present invention.

Further, in the disk as shown in FIG. 16, the hub structure 402 can be formed integrally with the substrate 401. Namely, the hub structure 402 has substantially the same structure as in FIG. 11 in that it is provided with a cylindrically shaped central opening 421 to which the rotating shaft 403 of the magnetic recording device or the shaft 404 of the pattern forming device is tightly fitted (without looseness). Then, the servo pattern is recorded by taking the inner circumferential surface of the central opening 421 as the actual standard, on the basis that the center of rotation of the hub structure 402 with respect to the substrate 401 is taken as the standard. Alternatively, the servo pattern is recorded by taking the outer circumferential surface of the shaft 404 of the pattern forming device in the same manner as in the embodiment in FIG. 12 (the triangle mark indicates the reference point in FIG. 12).

In the disk shown in FIG. 16, a servo pattern free from eccentricity can be recorded in the substrate 401 by taking the center of rotation of the hub structure 402 as the standard in the same manner as in the above-described embodiments. Further, when the disk is assembled in the magnetic recording device, precise alignment to the shaft can be achieved owing to the unique features of the hub structure 402. Further, the standard used for recording the servo pattern can be the same as the standard for reading. Accordingly, a servo pattern that is free from eccentricity can be correctly read without using a special correction mechanism. Further, a tracking pattern that is free from eccentricity can be correctly written on the basis of the is standard pattern. In the disk shown in FIG. 16, since the hub structure 402 can be formed integrally with the substrate 401 when they are produced by the above-described synthetic resin, manufacturing costs can further be reduced.

Further, as shown in FIG. 16, when the inner circumferential surface of the central opening 421 or the outer circumferential surface of the rotating shaft 404 fitted to the central opening is taken as the standard during recording of the servo pattern, the central opening 421 of the hub structure 402 may have a diameter in the central portion along the longitudinal axis that is slightly larger. Namely, the central opening 421 of the hub structure 402 may be adapted so that when the rotating shaft 403 of the magnetic recording device or the shaft 404 of the pattern forming device is inserted in the central opening 421, both edge portions of the central opening contact the rotating shaft 403 or the shaft 404. In this way, the center of rotation of the hub structure 402 can be aligned with the axial center of the rotating shaft 403 or the shaft 404.

The shape of the above-described central opening 421 can be formed by utilizing a "shrinkage cavity" that results when injection molding resin to form the hub structure 402. Namely, in the hub structure 402, a large shrinkage cavity arises in its central portion that has a large wall thickness after injection molding so that the diameter of the central portion is larger than that of both edge portions.

If the hub structure 402 is made of resin, the central opening 421 is generally formed, from the viewpoint of molding accuracy, so that the rotating shaft 403 or the shaft 404 is forcibly inserted in the opening. However, when the rotating shaft 403 or the shaft 404 is fitted to a central opening 421 that has a straight tube-like form, the substrate 402 may incline due to small molding defect(s) in the inner circumferential surface of the central opening 421. In the above-described hub structure 402 that has small diameter portions at both edge portions of the central opening 421, however, since the rotating shaft 403 or the shaft 404 that is forcibly inserted into the central opening 421 is supported by two supporting points at both edge portions of the central opening 421, an inclination of the substrate 402 relative to the shaft can be prevented.

A magnetic recording device into which the disk of the present invention has been inserted will now be described.

The magnetic head is attached to the top end of a load beam (a suspension arm) that serves as a head supporting arm with a rigid structure, and the load beam is attached to the top end of a swivel head arm of an actuator such that the load beam is urged to a side of the disk. The head comprises a block-like shaped slider which provides an air bearing to the disk and a magnetic head is located at the bottom surface of the slider. The magnetic head is provided with at least two head gaps for tracking, which serve as servo signal detection devices, located along a direction that is perpendicular to the motion direction of the head.

A control mechanism for controlling the tracking function by analyzing the servo pattern read by the head gaps controls the motion position of the head. Specifically, the head gaps are arranged at positions shifted by, for example, 0.5 times, 1.5 times, . . . the pitch of information recording tracks if the magnetic head is correctly on a track. The control mechanism performs tracking control for the magnetic head based on a change in the intensity of reproduced servo signals. When the magnetic head deviates from the center of the track, the signal output from the head gaps is increased or decreased. Accordingly, the control mechanism measures signal output in order to obtain an error signal that relates to the position of the center of the magnetic head with respect to the center of the track such that the magnetic head can be controlled to be correctly positioned on the track.

The mechanism for rotating the disk primarily includes a spindle motor that has the above-described rotating shaft 403 on which a single or a plurality of the above-described disks are fixed as shown in the drawings. Further, since such a disk or disks that have the hub structure 402 are tightly fitted to the rotating shaft 403 of the disk rotating mechanism (without looseness), the servo pattern in the substrate 401 is concentrically positioned without eccentricity with respect to the axial center of the rotating shaft 403.

Accordingly, in the magnetic recording device, when the servo pattern is read by the head by taking the center of rotation of the hub structure 402 as the standard wherein the outer circumferential surface of the rotating shaft 403 is utilized as the standard, for example, the standard for reading the servo pattern can be the same as the standard for writing the servo pattern. Accordingly, a servo pattern that is free from eccentricity can correctly be read. Further, when the previously written servo pattern is only a standard pattern, a tracking pattern can correctly be written based on the standard pattern without using a special correction mechanism. As a result, the cost of treating servo signals can be reduced. This technique is particularly effective when the information density to be recorded is increased. Further, the power consumption rate for reading and/or writing information can also be further reduced because the amount of tracing by the head is smaller.

Now, the present invention will be described in further detail with reference to particular examples. However, it should be understood that the present invention is by no means restricted to such specific examples, and these examples are provided for illustrative purposes.

EXAMPLE 1-1

An aluminosilicate glass substrate that has a 2.5 inch diameter was washed and dried, and 60 nm of NiAl, 10 nm of $Cr_{94}Mo_6$, a recording layer of 22 nm of $Co_{72}Cr_{18}Pt_{10}$, and a protective layer of 5 nm of carbon (diamond-like carbon) were formed thereon at a chamber pressure prior to deposition of $1\times10^{-7}$ Torr, a substrate temperature of 350° C., a bias voltage of −200 V, using an Ar sputtering gas at a gas pressure of $3\times10^{-3}$ Torr.

The surface roughness Ra was 0.5 nm and the surface undulation Wa was 0.8 nm. A fluorinated-lubricant was coated thereon as a lubricant layer at a thickness of 1.5 nm and baked for 100° C. for 40 minutes to obtain a longitudinally recording magnetic disk that has a saturated magnetization of 310 emu/cc and a coercive force of 3,000 Oe at room temperature. The Curie temperature of the recording layer was 250° C.

The disk surface was uniformly magnetized by applying a magnetic field with an intensity of about 10 k Gauss (10 kOe) to this disk so that the magnetic field direction of the electromagnet would be the same as the rotational direction of the disk.

As used herein, the magnetic intensity B (Guass) and the magnetic field H (Oe) are related through the expression: $B=\mu H$, where $\mu$ indicates the magnetic permeability and is equal to 1 for air. Accordingly, when the value of the magnetic intensity is measured to be 10 k Gauss (10 kOe), it is equivalent to the application of a 10 kOe magnetic field.

Then, while rotating the disk at a rotational speed of 1,000 rpm, an argon laser with a wavelength of 514.5 nm was pulsed and irradiated with a duty of 20%, a power (energy density) of 110 mW, and a beam diameter of 15 $\mu$m (the diameter corresponding to $1/e^2$ of the peak energy was taken as the beam diameter), whereby the irradiated portion was heated to a level close to the Curie temperature in order to erase the magnetization.

The presence or absence of the magnetic pattern in this disk was ascertained by developing the magnetic pattern with a magnetic developer and observing it under an optical microscope. A magnetic pattern which agrees with the pattern of the pulsed laser was confirmed to be located on the disk surface.

Further, an evaluation of the clarity of the magnetic pattern was carried out by developing the magnetic pattern using a magnetic developer and observing it using an optical microscope. The results are shown in Table 1. The symbol Δ indicates that the pattern was formed, the symbol ○ indicates that the pattern was formed satisfactory, and the symbol ● indicates that the pattern was clearly formed.

Further, the clarity of the magnetic pattern was also confirmed by reproducing the magnetically patterned signal by way of a MR head that has a reproducing element width of 0.9 $\mu$m. The 50% magnetization pulse width (i.e. the half value width) of the maximum magnetization in the reproduced signal waveform, was 1.3 $\mu$m (which corresponds to the magnetic transition width).

TABLE 1

|  | 1-1 | 1-2 | 1-3 | 1-4 | 1-5 | 1-6 | 1-7 | 1-8 | 1-9 |
|---|---|---|---|---|---|---|---|---|---|
| Pattern confirmed by magnetic development | Δ | Δ | Δ | Δ | ○ | ● | ● | ● | ● |
| Magnetic transition width ($\mu$m) | 1.3 | 1.2 | 1.1 | 1.3 | 1.1 | 0.25 | 0.28 | 0.26 | 0.32 |

EXAMPLE 1-2

A magnetic disk prepared in the same manner as in Example 1-1 was uniformly magnetized in the same manner as in Example 1-1.

Figure 17:
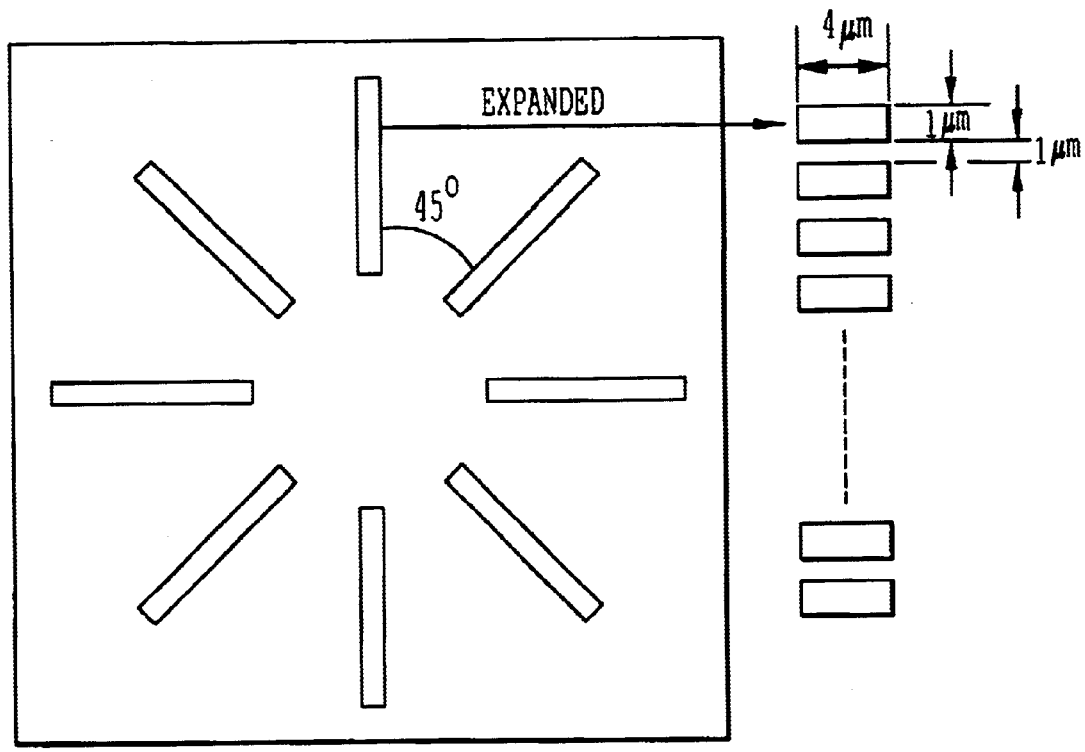
FIG. 17 is a diagram of an exemplary mask used in an embodiment of the present invention.

Then, a Cr mask was prepared which had transmitting portions and non-transmitting portions formed by recesses and projections (height: about 20 $\mu$m) of Cr on glass. As shown in FIG. 17, a transmission pattern that repeats every 1 $\mu$m in the radial direction between a position at a radius of 15 mm to a position at a radius of 30 mm is repeated every 45° in the circumferential direction. The projections are non-transmitting portions and the recesses are transmitting portions. The projections are closer to the disk.

Figure 20:
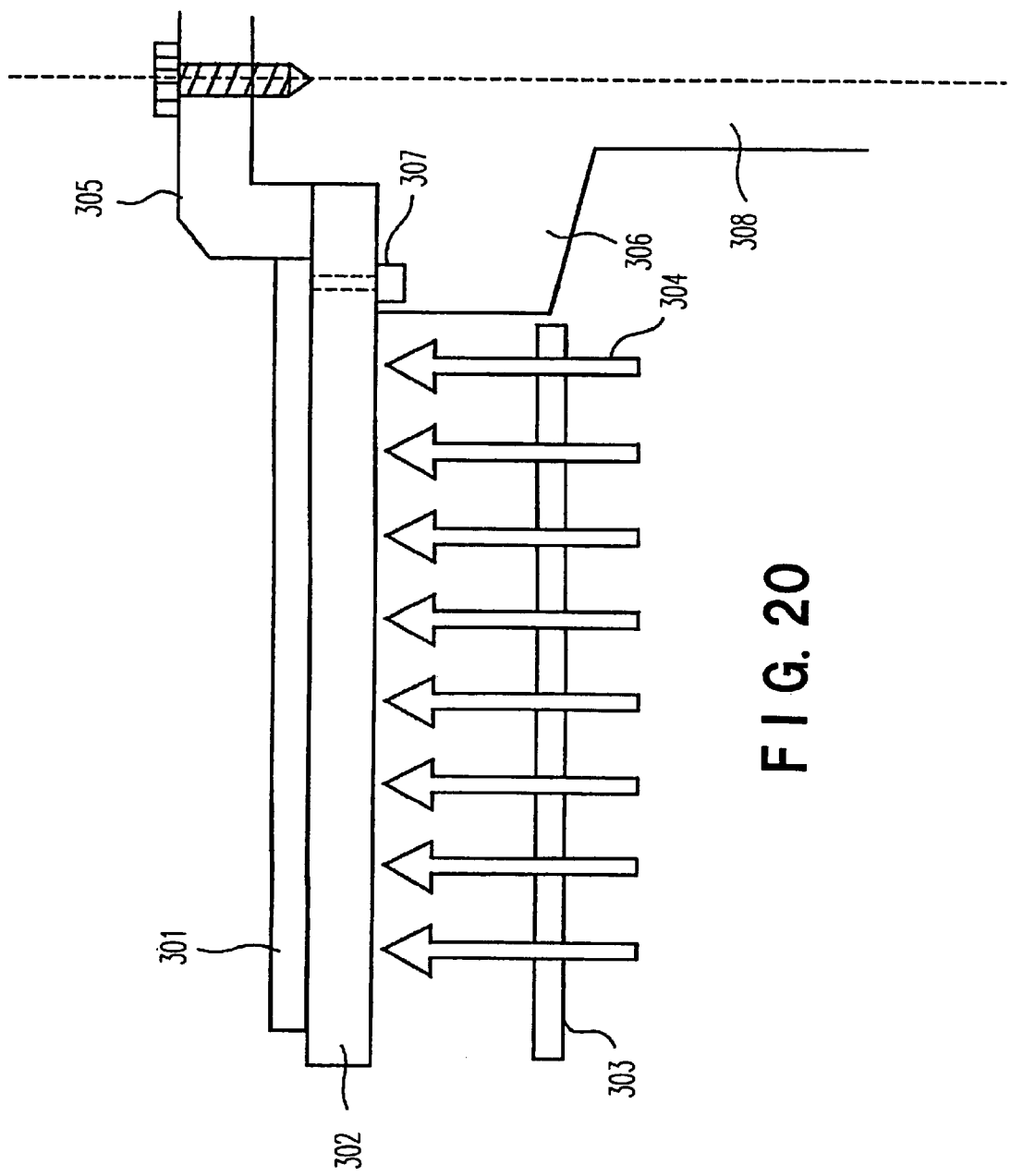
FIG. 20 is a diagram showing an exemplary magnetic pattern forming device of the present invention.

FIG. 20 is a diagram illustrating an exemplary embodiment of a magnetic pattern forming device used in this example. On a turntable 306 fixed to a rotatable spindle 308, a mask 302 that is in accordance with a desired pattern and a magnetic disk 301 are mounted and then fixed at a fixing portion 305 of the mask and the disk by, e.g., a fixing screw. They are thereafter vacuum-drawn by a groove 307. Laser light 304 is emitted from a laser source (not shown) and passed through an objective lens via various optical systems, and directed through a shading plate 303 and projected onto the magnetic disk 301. The beam shape of the laser 304 becomes sector shaped after passing through the shading plate, and it enters into the mask 302 and will be irradiated to the disk 301 in correspondence with the pattern shape. Although not shown, fine recesses and projections that correspond to the pattern to be formed are formed on the mask 302.

Figure 23:
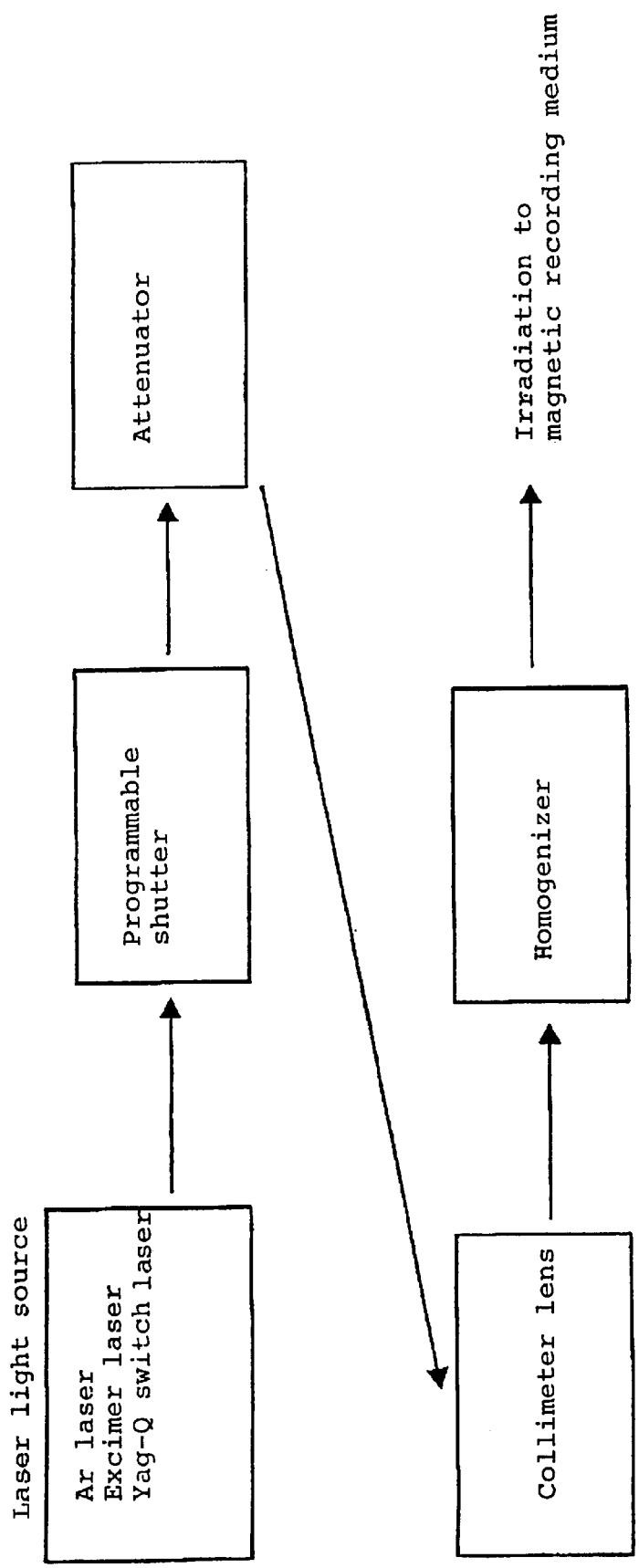
FIG. 23 is a diagram of an exemplary optical system for irradiating laser beams according to the present invention.

FIG. 23 is a diagram illustrating an exemplary embodiment of the optical system for laser irradiation. The laser light emitted from the laser source is passed through a programmable shutter and then through an attenuator. A collimator lens is used to enlarge the beam diameter and to collimate the light. A homogenizer is used to make the beam intensity uniform when irradiated onto the magnetic recording medium (the magnetic disk).

The mask and the magnetic disk were mounted on the device shown in FIG. 20, and the mask was brought into close contact with the magnetic disk. While rotating the magnetic disk at a rotational speed of 1,000 rpm, an argon laser that emits light at a wavelength of 514.5 nm was continuously irradiated at a power of 110 mW and a beam diameter of 15 $\mu$m to heat the irradiated portion to a level close to the Curie temperature. This was done to erase the magnetization of the appropriate portions of the magnetic disk. The laser irradiation optical system shown in FIG. 23 was employed. The energy density in this case was about 104 mJ/cm$^2$, which corresponds to a pulsed laser having a pulse width of 4.8 $\mu$sec at the outermost portion, when irradiation to the transmitting portion of the mask is pulsed. As described above, the laser was irradiated to form a magnetic pattern on the disk.

Evaluation of the prepared disk was carried out in the same manner as in Example 1-1. The results are shown in Table 1. The full width half maximum of the reproduced signal waveform was 1.2 $\mu$m.

Further, the laser was irradiated through the mask over the full surface (e.g., after rotation through an almost full circle) of the disk, whereby the repetitive patterns of the transmitting portions and non-transmitting portions of the mask were obtained over the entire area irradiated by the laser.

Then, using Raman spectroscopy, the existence of graphite and diamond were confirmed to identify damage to the protective layer due to laser irradiation. If the protective layer is damaged, the amount of diamond after laser irradiation should decrease and the amount of graphite should increase. However, in this example, the ratio of the amounts did not change from before to after the irradiation. Further, the number average molecular weight and the weight average molecular weight of the lubricant were measured to confirm the presence or absence of damage such as decomposition or polymerization. However, again, no difference was observed from before to after the laser irradiation.

If the method of this example is applied to the formation of a servo pattern of a magnetic disk, it is possible to obtain a magnetic disk that has a high precision servo pattern simply and quickly. Further, with a magnetic disk device employing such a magnetic disk, it is possible to track with a high precision without the need to record anew a servo pattern and to carry out high density recording.

EXAMPLE 1-3

An aluminosilicate glass substrate that has a 2.5 inch diameter was washed and dried, and 300 nm of $Ni_{50}Fe_{50}$, a recording layer of 30 nm of $Tb_{20}Fe_{68}Co_{12}$, a first protective layer of 2 nm of Cr, and a second protective layer of 5 nm of carbon (diamond-like carbon) were formed thereon under a chamber pressure prior to deposition of $1.2 \times 10^{-6}$ Torr, a substrate temperature of room temperature, a sputtering gas of Ar at a gas pressure of $3 \times 10^{-3}$ Torr, and a bias voltage of 0V.

The surface roughness Ra was 0.8 nm and the surface undulation Wa was 1.0 nm. A fluorinated lubricant was coated thereon as a lubricant layer with a thickness of 1.5 nm. This was baked at 100° C. for 40 minutes to obtain a perpendicularly recording magnetic disk having a saturated magnetization of 70 emu/cc and a perpendicular coercive force of 3,500 Oe. The Curie temperature of the recording layer was 230° C.

The disk surface was uniformly magnetized by applying a magnetic field with an intensity of about 10 k Gauss (10 kOe) to the disk with the magnetic field direction of the electromagnet perpendicular to the disk surface. Then, laser irradiation was used to heat portions of the disk to a level close to the Curie temperature to erase the magnetization of these portions in the same manner as in Example 1-1, except that the power was changed to 130 mW.

The prepared disk was evaluated in the same manner as in Example 1-1. The results are shown in Table 1.

EXAMPLE 1-4

A magnetic disk was prepared in the same manner as in Example 1-1. While rotating this disk at a rotational speed of 1,000 rpm, an argon laser that emits at a wavelength of 514.5 nm was pulsed and irradiated at a duty of 20% with a power of 70 mW and with a beam diameter of 15 $\mu$m. At the same time, a magnetic field was applied to the recording layer to magnetize it in a rotational direction of the disk by a magnetic head using a recording current of 15 mA. The prepared disk evaluated in the same manner as in Example 1-1. The results are shown in Table 1.

EXAMPLE 1-5

A magnetic disk prepared in the same manner as in Example 1-1 was uniformly magnetized in the same manner as in Example 1-1. Then, while rotating the disk at a rotational speed of 1,000 rpm, an argon laser that emits at a wavelength of 514.5 nm was pulsed and irradiated at a duty of 20% with a power of 100 mW and with a beam diameter of 15 $\mu$m. At the same time a magnetic field was applied to the recording layer to magnetize the disk in a direction opposite to the rotational direction of the disk by a magnetic head using a recording current of 15 mA. The prepared disk was evaluated in the same manner as in Example 1-1. The results are shown in Table 1.

EXAMPLE 1-6

Figure 18:
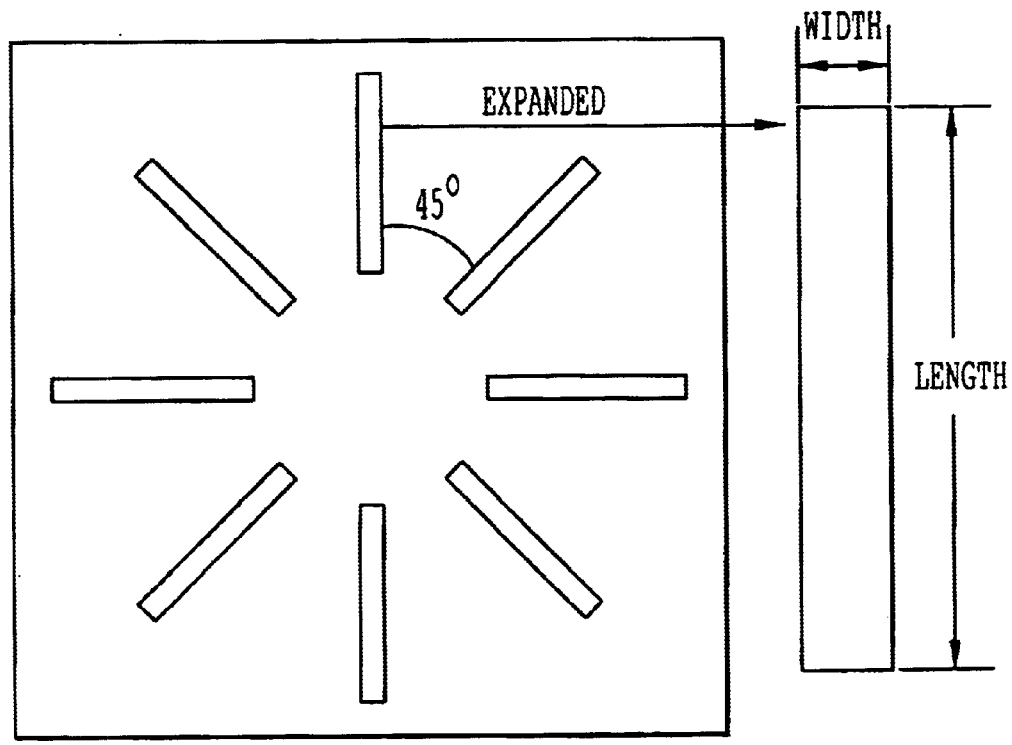
FIG. 18 is a diagram of another exemplary mask used in an embodiment of the present invention.

A magnetic disk prepared in the same manner as in Example 1-1 was uniformly magnetized in the same manner as in Example 1-1. Then, a Cr mask was prepared which had transmitting portions and non-transmitting portions formed by recesses and projections (height: about 20 nm) of Cr on glass. As shown in FIG. 18, a transmission pattern of 15 mm in length in the radial direction (radius: 15 mm to 30 mm) and a width of 2 $\mu$m in a circumferential direction is repeated every 45° in the circumferential direction. The magnetic disk was placed thereon.

Figure 21:
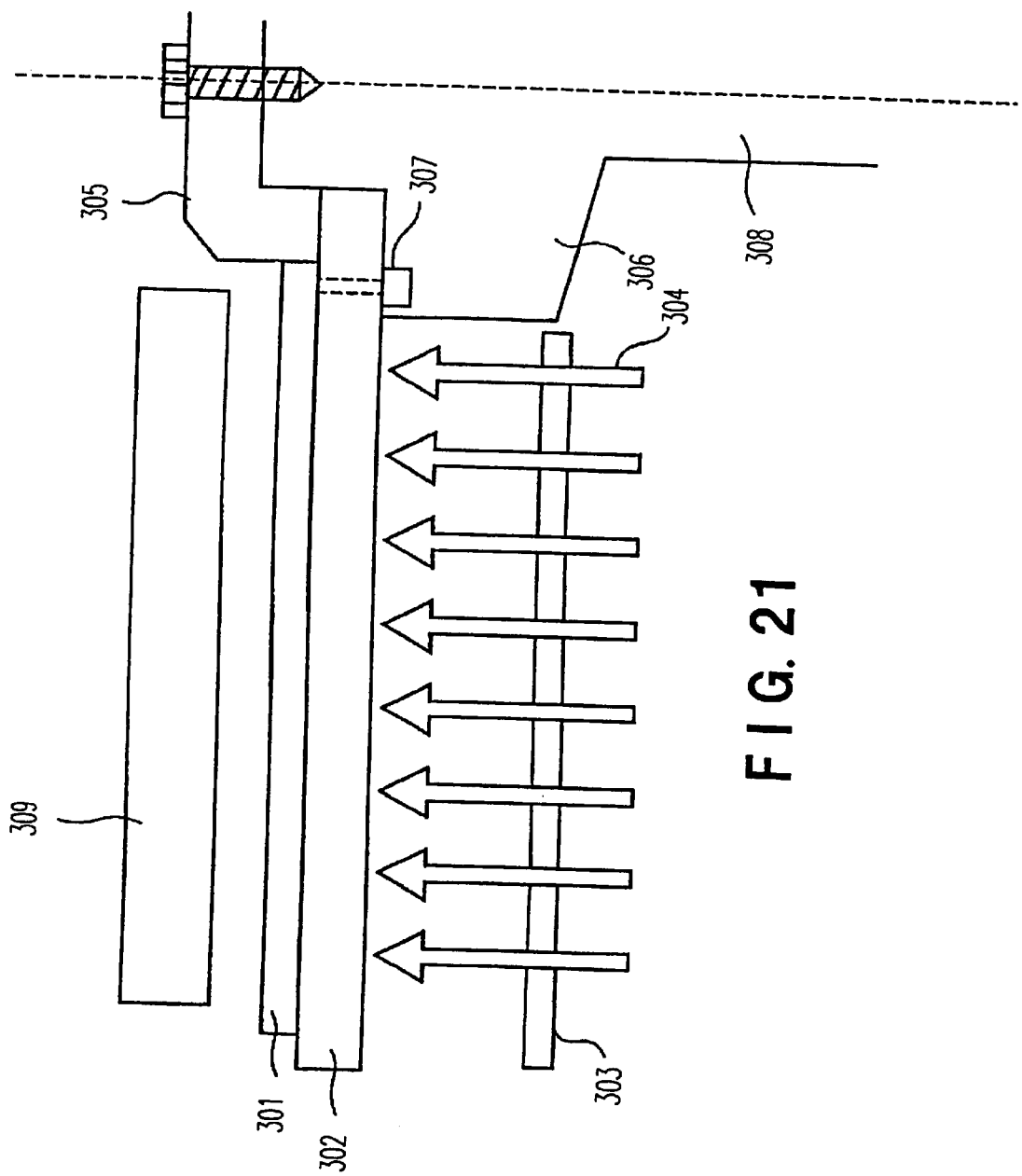
FIG. 21 is a diagram showing another exemplary magnetic pattern forming device.

FIG. 21 is a diagram illustrating another embodiment of a magnetic pattern forming device. In addition to the device shown in FIG. 20, a magnet 309 is disposed as an external magnetic field source, so that the external magnetic field can be applied at the same time as laser irradiation heats portions of the disk.

The mask and the magnetic disk were mounted on the device of FIG. 21, and an excimer laser was irradiated from the mask side. While the angle is adjusted so that the transmission pattern would be at the center of the laser spot, an excimer laser that emits at a wavelength of 248 nm with a pulse width of 25 nsec was irradiated at a frequency of 10 Hz, with a power of 80 mJ/cm$^2$ and with a beam shape of 10 mm×30 mm to heat the irradiated portion to a level close to the Curie temperature. The laser irradiation optical system shown in FIG. 23 was employed. At the same time, using a permanent magnet, a magnetic field of about 1.5 k Gauss was applied to the energy beam-irradiated portions in a direction opposite to the initial uniform magnetization. A magnetic pattern was thus formed.

Evaluation of the prepared disk was carried out in the same manner as in Example 1-1. The results are shown in Table 1. Further, the obtained reproduced signal waveform is shown in FIG. 24(*a*). The full width half maximum of the reproduced signal waveform was 0.25 $\mu$m.

Damage to the protective layer and the lubricant layer was evaluated in the same manner as in Example 1-2, and no deterioration of the protective layer or the lubricant layer was observed.

EXAMPLE 1-7

A NiP-plated Al substrate that has a diameter of 3.5 inch was washed and dried, 60 nm of NiAl, 10 nm of $Cr_{94}Mo_6$, a recording layer of 25 nm of $Co_{70}Cr_{13}Ta_5Pt_{12}$, and a protective layer of 2 nm of carbon (diamond-like carbon) were formed thereon at a chamber pressure prior to deposition of $1 \times 10^{-7}$ Torr, a substrate temperature of 350° C., a bias voltage of −200 V, and an Ar sputtering gas at a gas pressure of $3 \times 10^{-3}$ Torr.

The surface roughness Ra was 0.6 nm, and the surface undulation Wa was 0.9 nm. A fluorinated lubricant was coated thereon as a lubricant layer with a thickness of 1.5 nm and baked at 100° C. for 40 minutes to obtain a magnetic disk that has a saturated magnetization of 320 emu/cc and a coercive force of 3,400 Oe at room temperature. The Curie temperature of the recording layer was 350° C.

The disk was uniformly magnetized in the same manner as in Example 1-1, and then the magnetic disk was covered by the same mask as in Example 1-6 except that the length in the radial direction was 20 mm (radius: from 20 mm to 40 mm).

From the mask side, a Q-switch YAG laser was irradiated. While adjusting the angle so that the transmission pattern would be at the center of the laser spot, the Q-switch YAG laser that emits at a wavelength of 266 nm with a pulse width of 5 nsec was irradiated over the entire surface of the disk at a frequency of 10 Hz with a power of 50 mJ/cm$^2$ and a beam diameter of 20 mm. This heated the irradiated portion to a level close to the Curie temperature. During heating, a magnetic field was applied in the same manner as in Example 1-6. Further, the construction of the optical system and the mechanical system of the device for forming the magnetic pattern was the same as in Example 1-6.

Evaluation of the prepared disk was carried out in the same manner as in Example 1-1. The results are shown in Table 1.

EXAMPLE 1-8

A magnetic disk was prepared in the same manner as in Example 1-7.

A plurality of permanent magnets attached to a yoke were arranged so that magnets of the same polarity faced each other (with a spacing of 3 mm) with respect to a disk interposed between them. On the same side, the different poles faced each other (with a spacing of 15 mm). As a result, a magnetic field source with a magnetic field of about 7 k Gauss at the disk surface in a direction tangent to the circumference was obtained. While rotating the disk, the disk was uniformly magnetized in the circumferential direction.

Thereafter, the same mask as in Example 1-7 (except that the width in the circumferential direction was 0.5 $\mu$m) was prepared, and the magnetic disk was covered by the mask in the same manner as in Example 1-7. The disk was heated by laser irradiation and an external magnetic field was applied in a direction opposite to the initial uniform magnetization direction during heating.

Evaluation of the prepared disk was carried out in the same manner as in Example 1-1. The results are shown in Table 1.

EXAMPLE 1-9

A magnetic disk was prepared in the same manner as in Example 1-8, and the disk was uniformly magnetized in the circumferential direction.

Figure 19:
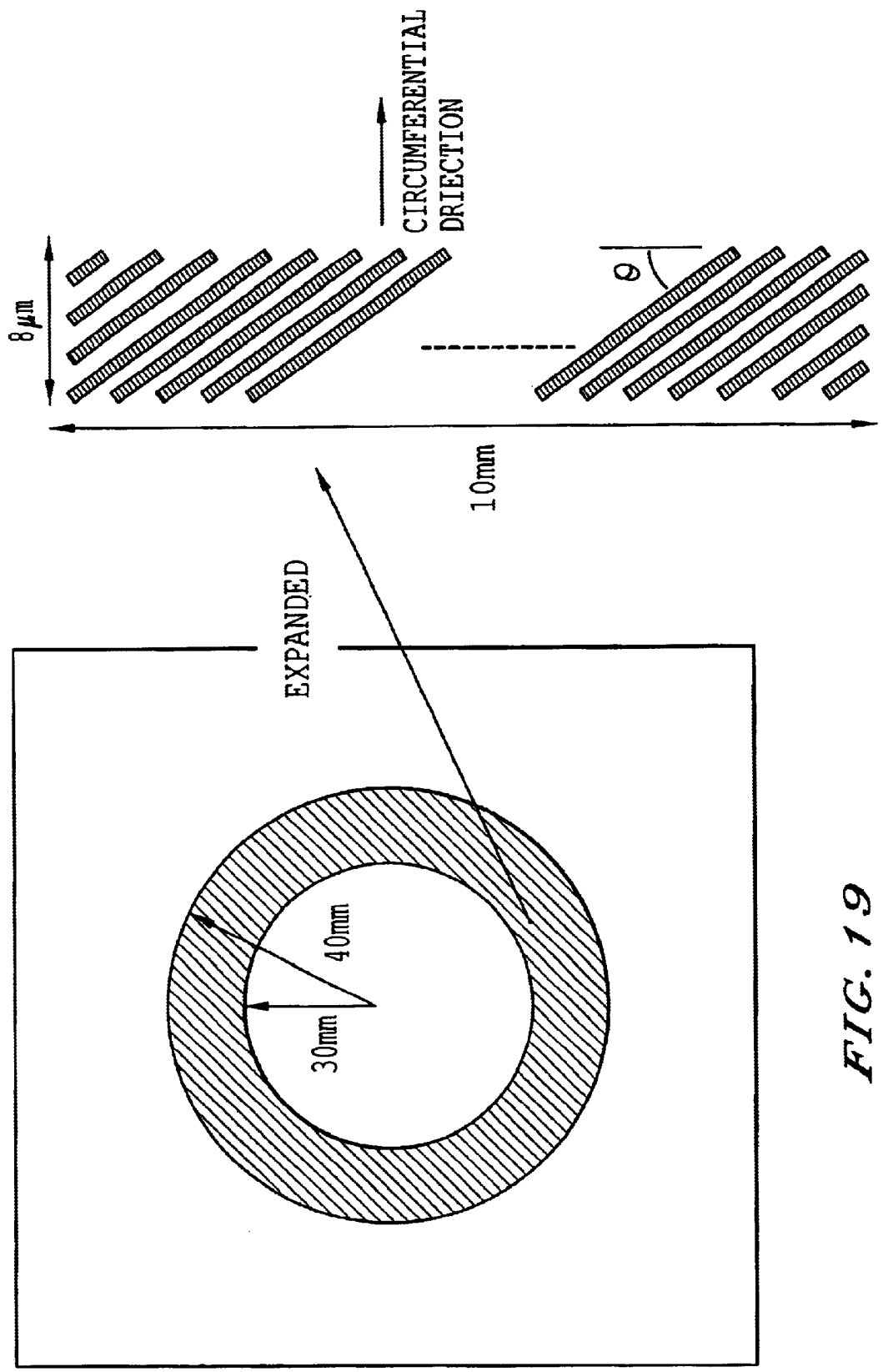
FIG. 19 is a diagram of another exemplary mask used in an embodiment of the present invention.

A Cr mask with transmitting portions and non-transmitting portions formed by recesses and projections (height: about 20 nm) of Cr on glass was then prepared. As shown in FIG. 19, the mask has transmission patterns with a width of 8 $\mu$m repeated in the radial direction for 10 mm (radius: 30 mm to 40 mm). Each pattern includes pluralities of transmitting portions and non-transmitting portions extending obliquely at an angle θ=35° relative to the radial direction, and each width is 2 $\mu$m.

The magnetic disk was placed thereon in the same manner as in Example 1-7. The laser was irradiated to heat the disk and the external magnetic field was applied under the same conditions as in Example 1-7.

Evaluation of the prepared disk was carried out in the same manner as in Example 1-1. The results are shown in Table 1. Further, the obtained reproduced signal waveform is shown in FIG. 24(b). The full width half maximum of the reproduced signal waveform was 0.32 $\mu$m. A photograph of the obtained oblique magnetic patterns is shown in FIG. 24(c).

Damage to the protective layer and the lubricant layer was evaluated in the same manner as in Example 1-2, but no deterioration of the protective layer or the lubricant layer was observed.

With respect to each of the disks of Examples 1-6 to 1-9, a laser was irradiated through a mask over the full surface of the disk to obtain a pattern by repetition of the transmitting portions and the non-transmitting portions of the mask over the entire region irradiated with the laser.

Further, in each of Examples 1-6 to 1-9, the magnetic disk and the Cr mask were in contact with each other due to undulations of the mask or the magnetic disk and contact pressure was created by the weight of the disk itself which was about 0.2 g/cm$^2$. Namely, the mask and the disk were not brought into close contact with each other, but rather the disk was simply placed on the mask. Even using this approach, sufficiently fine magnetic patterns could be formed. Using this simple approach, it is possible to minimize the possibility of damage during production and, at the same time, to form fine patterns.

By applying the method of these Examples to the formation of a servo pattern of a magnetic disk, it is possible to obtain a magnetic disk that has a highly accurate servo pattern simply and quickly. Further, with a magnetic disk device that employs such a magnetic disk, it is possible to track with high accuracy without the need to record a servo pattern anew. It is also possible to record at a high density.

EXAMPLE 2-1

A magnetic disk was prepared in the same manner as in Example 1-1. The surface roughness Ra was 0.6 nm and the surface undulation Wa was 0.9 nm.

Figure 22:
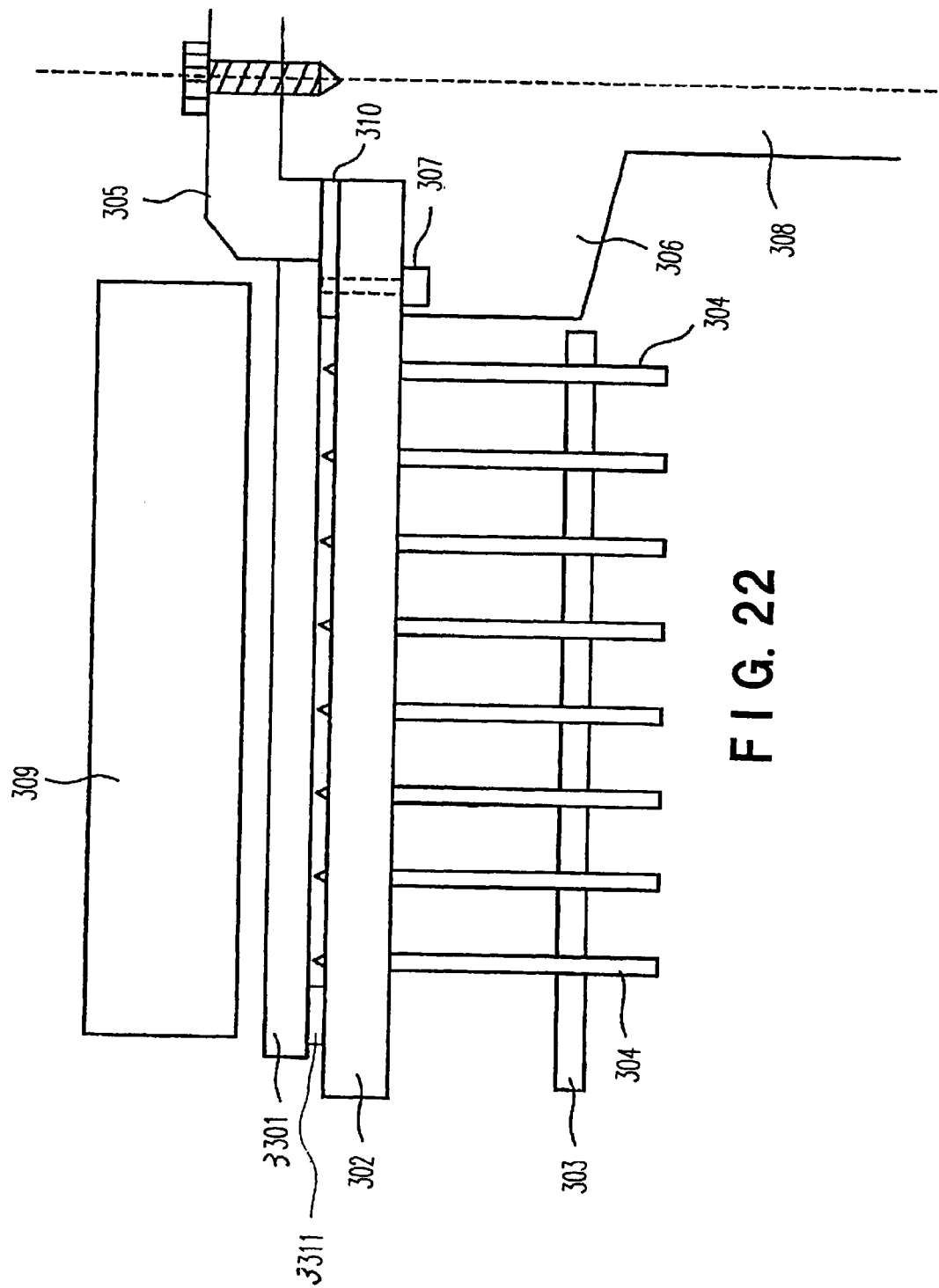
FIG. 22 is a diagram showing another exemplary magnetic pattern forming device.

FIG. 22 is a diagram illustrating another embodiment of the device for forming a magnetic pattern. The difference between this device and the device shown in FIG. 20 is that the mask 302 and the magnetic disk 301 are separated by an inner peripheral spacer 310 and an outer peripheral spacer 311, fixed at the fixing portion 305 of the mask and the disk by, e.g., a fixing screw, and vacuum-fixed by a groove 307.

The mask and the magnetic disk were mounted on the device of FIG. 22 with a separation distance of about 10 $\mu$m therebetween. An excimer pulse laser was irradiated from the mask side. The mask was a Cr mask with quartz glass as the substrate and the minimum width of the transmitting portions was 1 $\mu$m.

An excimer pulse laser with a wavelength of 248 nm and a pulse width of 25 nsec was irradiated with a power of 80 mJ/cm$^2$ in a beam shape of 10 mm×30 mm to heat the irradiated portion to a level close to the Curie temperature. A laser irradiation optical system as shown in FIG. 23 was employed. At the same time, a permanent magnet applied a magnetic field of about 2.3 k Gauss in the circumferential direction to the portion irradiated with the energy beam. A magnetic pattern was thereby formed.

Evaluation of the prepared disk was carried out in the same manner as in Example 1-1. The results are shown in Table 2. Further, damage to the protective layer and the lubricant layer was evaluated in the same manner as in Example 1-2, but no deterioration of the protective layer or the lubricant layer was observed.

If the method of this Example is applied to the formation of a servo pattern of a magnetic disk, it is possible to obtain a magnetic disk that has a servo pattern with high accuracy simply and quickly. Further, with a magnetic disk device that employs such a magnetic disk, it is possible to record at a high density and to track with high accuracy without the need to record a servo pattern anew.

TABLE 2

|  | 2-1 | 2-2 | 2-3 | 2-4 | 2-5 | 2-6 | 2-7 | 2-8 | 2-10 | 2-11 |
|---|---|---|---|---|---|---|---|---|---|---|
| Pattern confirmed by magnetic development | Δ | Δ | ○ | ○ | ● | ● | ● | ○ | ● | ○ |
| Pattern confirmed by oscilloscope | Yes | Yes | Yes | Yes | Yes | Yes | Yes | Yes | Yes | Yes |
| Magnetic transition width (μm) | 0.43 | 0.42 | 0.27 | 0.39 | 0.25 | 0.22 | 0.22 | 0.31 | 0.34 | 0.26 |

EXAMPLE 2-2

A magnetic disk was prepared in the same manner as in Example 2-1 except that a NiP-plated Al substrate with a 3.5 inch diameter was used. The surface roughness Ra was 0.6 nm and the surface undulation Wa was 0.9 nm.

The disk was uniformly magnetized in the circumferential direction by a 10 k Gauss (10 kOe) external magnetic field, and then, in the same manner as in Example 2-1, an excimer pulse laser was irradiated via a mask. During laser irradiation, a 4 k Gauss magnetic field was applied in a direction perpendicular to the main surface of the magnetic recording medium. A magnetic pattern was thus formed. Evaluation was carried out in the same manner as in Example 2-1, and the results are shown in Table 2.

EXAMPLE 2-3

A magnetic disk was prepared in the same manner as in Example 2-1 except that a NiP-plated Al substrate with a 3.5 inch diameter was used. This disk was uniformly magnetized in the circumferential direction using a 10 k Gauss (10 kOe) external magnetic field. Then, in the same manner as in Example 2-1, an excimer pulse laser was irradiated through a mask and an external magnetic field was simultaneously applied in a direction opposite to the initial uniform magnetization. The disk was evaluated in the same manner as in Example 2-1, and the results are shown in Table 2.

Further, a magnetic pattern was formed on the magnetic recording medium under the same conditions, and the magnetic pattern was reproduced using a MR head with a reproduction element width of 0.9 μm. In this way, the peak output (peak-to-peak) of solitary waves was measured. The results are shown in Table 3.

Figure 25B:
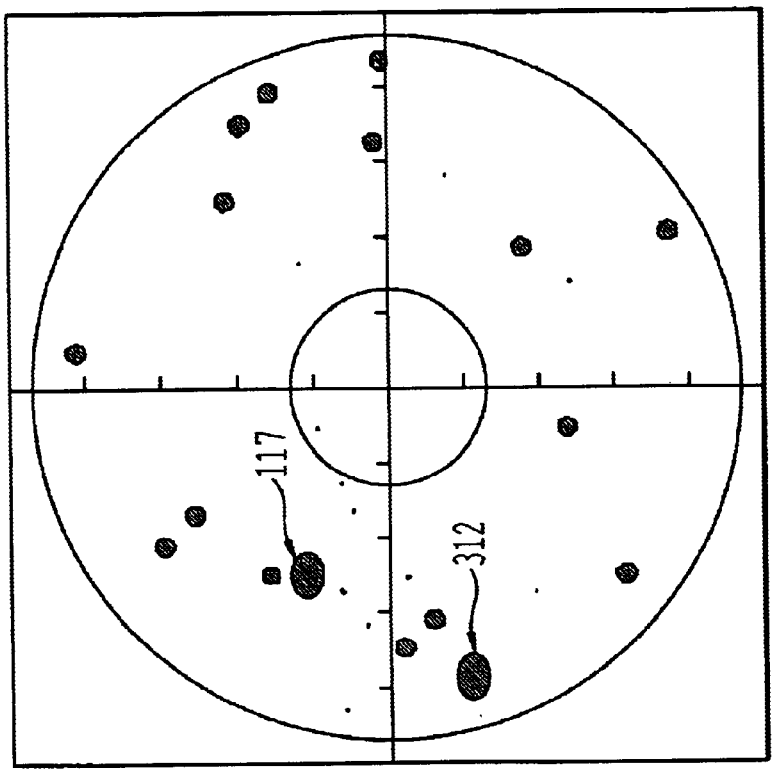
FIGS. 25(a) and 25(b) are diagrams showing exemplary consequences of missing pulses in the present invention.
Figure 25A:
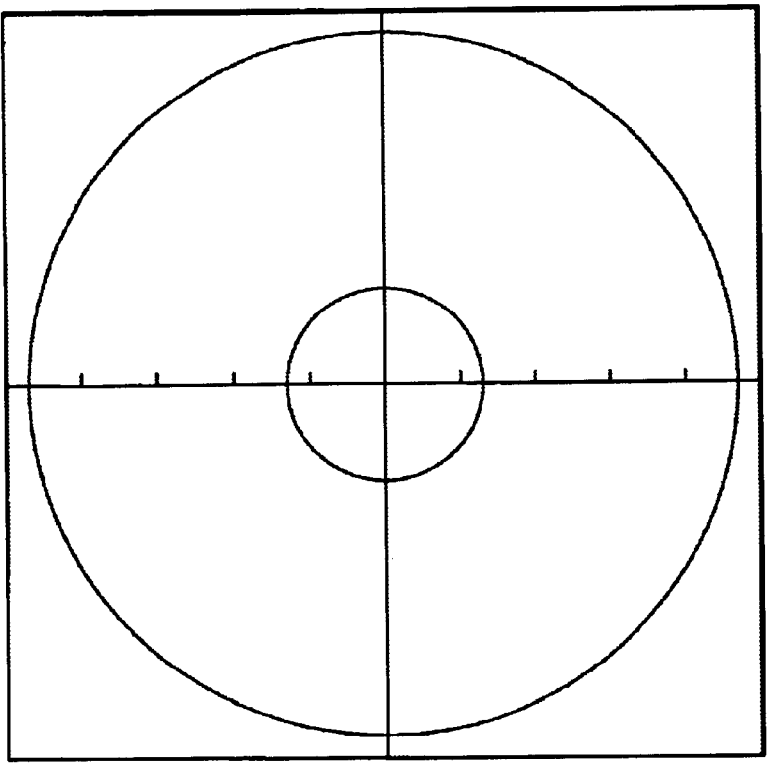

Further, the number of missing pulses on the magnetic pattern-formed surface was evaluated at a recording element width of 1.1 μm, a reproducing element width of 0.7 μm, a flying height of 1.3 μm, a recording frequency of 160 kFCI, a checking pitch of 1 μm, and a slice level of 65%. FIG. 25(a) shows the results of mapping the number of missing pulses on the medium. No large defects were observed.

When the magnetic pattern forming method of the present invention is applied to writing a servo pattern on a magnetic disk, a clear servo pattern can be formed. It is also possible to suppress formation of defects. Accordingly, with a magnetic disk device employing such a magnetic disk, it is possible to record at a high density with high reliability.

TABLE 3

|  | Example 2-7 | Example 2-3 | Example 2-8 |
|---|---|---|---|
| Pulse width | 15 nsec | 25 nsec | 50 nsec |
| Reproduction output (R-P) | 1,360 mV | 1,160 mV | 400 mV |

EXAMPLE 2-4

A magnetic disk was prepared in the same manner as in Example 2-1. Ra was 0.5 nm and Wa was 0.8 nm.

The disk was uniformly magnetized in the circumferential direction using a 10 k Gauss (10 kOe) external magnetic field, and then, in the same manner as in Example 2-1, an excimer pulse laser was irradiated through a mask. At the same time as the irradiation of laser, a magnetic field of about 4 k Gauss was applied in a direction perpendicular to the main surface of the magnetic recording medium. A magnetic pattern was thus formed. Evaluation was carried out in the same manner as in Example 2-1, and the results are shown in Table 2.

EXAMPLE 2-5

A magnetic disk was prepared in the same manner as in Example 2-1. Ra was 0.5 nm and Wa was 0.8 nm.

The disk was uniformly magnetized in the circumferential direction by a 10 k Gauss (10 kOe) external magnetic field. Then, in the same manner as in Example 2-1, an excimer pulse laser was irradiated through a mask and the external magnetic field was simultaneously applied in a direction opposite to the initial uniform magnetization. Evaluation was carried out in the same manner as in Example 2-1, and the results are shown in Table 2.

EXAMPLE 2-6

An aluminosilicate glass substrate that has a 2.5 inch diameter was washed and dried, and 500 nm of $Ni_{50}Fe_{50}$, a recording layer of 30 nm of TbFeCo, and a protective layer of 5 nm of carbon (diamond-like carbon) were formed thereon under a chamber pressure prior to deposition of $1\times10^{-7}$ Torr, a substrate temperature of 350° C., a bias voltage of −200V, and an Ar sputtering gas at a gas pressure of $3\times10^{-3}$ Torr. Ra was 0.8 nm and Wa was 1.0 nm. As a lubricant layer, a fluorinated lubricant was deposited with a thickness of 1.5 nm and baked at 100° C. for 40 minutes. The resulting perpendicularly recording magnetic disk had a saturated magnetization of 70 emu/cc, a coercive force of 4,000 Oe at room temperature, and a Curie temperature of 230° C.

The obtained disk was uniformly magnetized in a direction perpendicular to the main surface of the magnetic recording medium by a 10 k Gauss (10 kOe) external magnetic field.

Then, in the same manner as in Example 2-1, an excimer pulse laser was irradiated through a mask. Simultaneously, an external magnetic field of about 4 k Gauss was applied in a direction perpendicular to the main surface and opposite to the direction of the initial uniform magnetization of the magnetic recording medium. A magnetic pattern was thus formed. Evaluation was carried out in the same manner as in Example 2-1, and the results are shown in Table 2.

EXAMPLE 2-7

A magnetic disk was prepared in the same manner as in Example 2-1 except that a NiP-plated Al substrate with a 3.5 inch diameter was used. The surface roughness Ra was 0.6 nm and the surface undulation Wa was 0.9 nm.

The mask was uniformly magnetized in the circumferential direction by an external 10 k Gauss (10 kOe) magnetic field. An excimer pulse laser was then irradiated through a mask in the same manner as in Example 2-1 except that the pulse width was changed to 5 nsec and the external magnetic field was simultaneously applied in a direction opposite to the initial uniform magnetization. A magnetic pattern was thus formed. Evaluation was carried out in the same manner as in Example 2-3, and the results are shown in Tables 2 and 3.

EXAMPLE 2-8

A magnetic disk was prepared in the same manner as in Example 2-1 except that a NiP-plated Al substrate with a 3.5 inch diameter was used. The surface roughness Ra was 0.6 μnm and the surface undulation Wa was 0.9 nm.

The disk was uniformly magnetized in the circumferential direction using a 10 k Gauss (10 kOe) external magnetic field. An excimer pulse laser was then irradiated through a mask in the same manner as in Example 2-1 except that the pulse width was changed to 50 nsec and the external magnetic field was simultaneously applied in a direction opposite to the initial uniform magnetization. A magnetic pattern was thus formed. Evaluation was carried out in the same manner as in Example 2-3 and the results are shown in Tables 2 and 3.

EXAMPLE 2-9

A magnetic disk was prepared in the same manner as in Example 2-3 and uniformly magnetized in the circumferential direction using an external magnetic field. A Cr mask with a quartz glass substrate and a minimum transmitting portion width of 1 μm was then placed on the disk at a separation distance of about 10 μm, and a Q-switch YAG laser that emits at a wavelength of 266 nm was irradiated with a pulse width of 5 nsec and a beam diameter and power as shown in Table 4. At the same time, a magnetic field of about 2.3 k Gauss was applied using a permanent magnet in a direction opposite to the direction of the initial uniform magnetization in an attempt to form a magnetic pattern.

Figure 26:
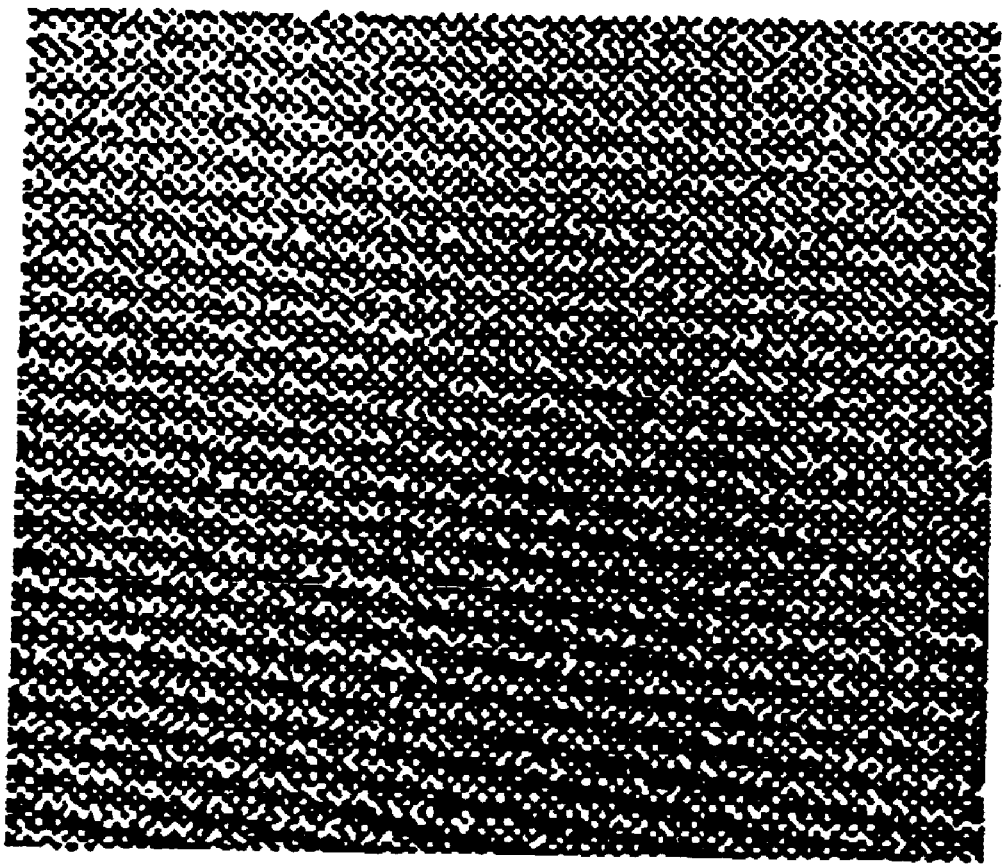
FIG. 26 shows a microphotograph of an exemplary magnetic pattern obtained in the present invention.

Evaluation was carried out in the same manner as in Example 2-3, and the results are shown in Table 4. A clear magnetic pattern was formed when the power was within a range of from about 30 to 65 mJ/cm². However, this was clearer than the magnetic pattern formed in Example 2-3. This is considered to be attributable to the fact that the pulse width was shortened to 5 nsec. FIG. 26 shows a microscopic photograph (magnification: 329 times) of an example where the power was 49.8 mJ/cm². Further, the output waveform is shown in FIG. 27(a).

TABLE 4

| Energy density (mJ/cm²) | Spot diameter (mm φ) | Evaluation of magnetic pattern |
| --- | --- | --- |
| 20.4 | 25 | ◯ |
| 21.2 | 23 | ◯ |
| 31.8 | 20 | ● |
| 39.3 | 18 | ● |
| 49.8 | 16 | ● |
| 64.0 | 14 | ● |
| 75.4 | 13 | ● |

EXAMPLE 2-10

In the same manner as in Example 2-3, a magnetic disk was prepared and uniformly magnetized in the circumferential direction with an external magnetic field.

Then, a Cr mask having transmitting portions and non-transmitting portions formed by recesses and projections (height: about 20 nm) of Cr on glass was prepared. As shown in FIG. 19, the mask had transmitting patterns with a width of 8 μm repeated in a radial direction for 10 mm (radius: 30 mm to 40 mm). Each pattern includes pluralities of transmitting portions and non-transmitting portions extending obliquely at an angle θ=35° relative to the radial direction. The width of each line is 2 μm.

Using this mask, an excimer pulse laser was irradiated onto the magnetic disk in the same manner as in Example 2-1 and the external magnetic field was simultaneously applied in a direction opposite to the initial uniform magnetization. Evaluation was carried out in the same manner as in Example 2-1 and the results are shown in Table 2.

Further, FIG. 27(c) shows an envelope of the reproduction output waveform of the obtained magnetic pattern. For the purpose of comparison, FIG. 27(b) shows the reproduced signal waveform when a magnetic pattern was formed in the same manner as the case where, using the mask of FIG. 19, the transmitting portions were formed at an angle θ=0° instead of θ=35° relative to the radial direction (i.e., with no inclination). As described above, the output tended to decrease with an inclined pattern when using conventional pattern-forming approaches. On the other hand, as illustrated in this Example, even with an inclined pattern, no substantial change in the output was observed.

EXAMPLE 2-11

A magnetic disk was prepared in the same manner as in Example 2-1 except that a NiP-plated Al substrate with a 3.5 inch diameter was used. The surface is roughness Ra was 0.6 nm and the surface undulation Wa was 0.9 nm.

The mask was uniformly magnetized in the circumferential direction using a 10 k Gauss (10 kOe) external magnetic field.

The mask was then placed on the disk and the pressure between the disk and the mask was reduced to draw them into close contact with one another. An excimer pulse laser was irradiated through the mask in the same manner as in Example 2-1 except that the pulse width was changed to 50 nsec and the external magnetic field was simultaneously applied in a direction opposite to the initial uniform magnetization. A magnetic pattern was thus formed. Evaluation was carried out in the same manner as in Example 2-3, and the results are shown in Tables 2 and 3.

Further, the number of missing pulses on the magnetic pattern-formed surface was evaluated in the same manner as in Example 2-3. The results are shown in FIG. 25(*b*). Large defects corresponding to 312 missing pulses and 117 missing pulses were observed at two locations.

EXAMPLE 3-1

A magnetic disk was prepared in the same manner as in Example 1-1. The surface roughness Ra was 0.5 nm and the surface undulation Wa was 0.8 nm.

An inspection of defects using a magnetic head was performed over the entire surface of this magnetic disk, and then a magnetic pattern was formed as follows.

The magnetic disk was mounted on the magnetic pattern forming device as shown in FIG. 3 and uniformly magnetized in the circumferential direction of the disk by applying a 10 k Gauss (10 kOe) external magnetic. Then, the external magnetic field-source was changed to the device shown in FIG. 4 and, using substantially the same optical system as in FIG. 5, an excimer pulse laser was irradiated to form a magnetic pattern.

After fixing the magnetic disk on a spindle, a mask that has transmitting portions with a width of 1 $\mu$m and a length of 15 mm (radius: 15 mm to 30 mm) formed radially every 45°, as shown in FIG. 18, was placed on the magnetic disk at a separation distance of about 10 $\mu$m, and the two were rotated at 2 rpm. The mask was made using quartz glass as the base material and non-transmitting portions formed by a 20 nm thick Cr layer.

An excimer pulse laser that has a wavelength of 248 nm was generated with a pulse width of 25 nsec and a power of 44 mJ/cm$^2$ in a beam shape of 10 mm×30 mm. The energy density (power) distribution of the beam was measured by a beam profiler manufactured by COHERENT Co. The energy density distribution was about 30% in the short axis direction and 10% in the long axis direction. A tripartition prism array that has a focal distance of 100 mm was placed at a the opening of the laser. The laser light was divided into three portions in the short axis direction and then put together to obtain a beam with a power density of 80 mJ/cm$^2$ and a beam shape of 5 mm×30 mm. The energy density variation was reduced to about 10% in each of the short axis direction and the long axis direction.

Thereafter, laser light was irradiated repeatedly at a frequency of 1 Hz for 60 pulses through a shading plate that has sector shaped transmitting portions with an angle of 6° and, at the same time, a magnetic field of about 2.3 k Gauss was applied in a direction opposite to the initial uniform magnetization in an attempt to print the magnetic pattern.

The presence or absence of a resultant magnetic pattern was confirmed by developing the magnetic pattern using a magnetic developer and observing it under an optical microscope. It was found that patterns corresponding to the transmitting portions and the non-transmitting portions of the mask were printed on the magnetic disk.

Further, the magnetic pattern was reproduced by a MR head for hard disks that has a reproducing element width of 0.9 $\mu$m. The waveform was confirmed by an oscilloscope. The output of the observed waveform was equal to the output of the magnetic pattern written using a conventional magnetic head.

Then, the change in output was measured over a full circle at a position 31.5 mm in the radial direction from the center of the disk and was found to be within a range of ±5% of the average value of the output. This was equal to a case where writing was carried out using a magnetic head.

EXAMPLE 3-2

A magnetic disk was prepared in the same manner as in Example 3-1. Then, inspection of defects was carried out using a magnetic head over the entire surface of this magnetic disk, and then printing of the magnetic pattern was attempted in the same manner as in Example 3-1 except for the optical system.

A Q-switch 4th harmonic wave pulse YAG laser that emits at a wavelength of 266 nm with a pulse width of 5 nsec, a power of 318 mJ/cm$^2$, and a beam shape of 8 mm in diameter was used. The energy density distribution was doughnut-shaped. A high energy density portion was found in a ring along the outer side, and the variation was 30%.

The laser was enlarged using a beam expander and then passed through a 21 partition prism array to divide the beam, and the divided beams were then rejoined. Further, using an image lens, the length in a monoaxial direction was expanded three times to obtain a beam with a power of 73 mJ/cm$^2$ and a beam shape of 12 mm×36 mm. The energy density variation was suppressed to about 10% in each of the short axis direction and the long axis direction. Thereafter, the laser was repeatedly irradiated at a frequency of 1 Hz for 30 pulses by placing a shading plate with sector shaped transmitting portions with an angle of 12° and, at the same time, a magnetic field of about 2.3 k Gauss was applied in a direction opposite to the initial uniform magnetization in an attempt to print the magnetic pattern.

The presence or absence of the magnetic pattern was confirmed. It was found that patterns corresponding to the transmitting portions and non-transmitting portions of the mask were printed on the magnetic disk.

Further, the magnetic pattern was reproduced using a MR head for hard disks with a reproducing element width of 0.9 $\mu$m, and the waveform was confirmed using an oscilloscope. The output of the observed waveform was equal to the output of the magnetic pattern written using a conventional magnetic head.

Then, the change in the output was measured over a full circle at a position 31.5 mm in the radial direction from the center of the disk. The change was found to be within a range of ±5% of the average value of the output, which was equal to a case where writing was carried out using a magnetic head.

EXAMPLE 3-3

A magnetic disk was prepared in the same manner as in Example 3-1. Inspection of defects using a magnetic head was performed over the entire surface of this magnetic disk, and then printing of the magnetic pattern was attempted. The same conditions as in Example 3-1 were employed except that a tripartition prism array was not used in the optical system and the laser was repeatedly irradiated at a frequency of 1 Hz for 30 pulses through a shading plate that has sector shaped transmitting portions with an angle of 12°. Namely, the pulse width was 25 nsec, the power was 44 mJ/cm$^2$, the beam shape was 10 mm×30 mm, and the energy density distribution was about 30% in the short axis direction and 10% in the long axis direction.

The presence or absence of the magnetic pattern was confirmed. It was found that patterns corresponding to the transmitting portions and the non-transmitting portions of the mask were printed on the magnetic disk.

Further, the magnetic pattern was reproduced using a MR head for hard disks that has a reproducing element width of 0.9 $\mu$m. The waveform was confirmed using an oscilloscope. The output of the observed waveform was equal to the output of the magnetic pattern written using a conventional magnetic head.

Then, the change in the output was measured over a full circle at a position 31.5 mm in the radial direction from the center of the disk. The change was within ±15% of the average value of the output, which was inferior to the case where writing was carried out using a magnetic head.

EXAMPLE 4-1

A magnetic disk was prepared in the same manner as in Example 1-1. The surface roughness Ra was 0.5 nm and the surface undulation Wa was 0.8 nm.

On this disk, a magnetic pattern was formed as follows.

The magnetic disk was mounted on the magnetic pattern forming device as shown in FIG. 3 and uniformly magnetized in the circumferential direction of the disk by applying an external 10 k Gauss (10 kOe) magnetic field. Then, the external magnetic field source was changed to the device shown in FIG. 7 and, using the optical system shown in FIG. 8, an excimer pulse laser was irradiated to form a magnetic pattern.

In the optical system for pulse laser irradiation, an excimer pulse laser source that emits at a wavelength of 248 nm was employed as the energy beam source and pulsed laser light with a pulse width of 25 nsec and a beam diameter of 10 mm×30 mm was emitted. One pulse was removed therefrom using a programmable shutter, and the intensity was adjusted by an attenuator so that the power on the magnetic disk would be about 80 mJ/cm$^2$.

Then, the beam was condensed so that the intensity distribution within the beam was made uniform at the mask surface. This was done using a condensing lens composed of a combination of a plano convex lens and an aspheric lens having a diameter of 50 mm to obtain a patterning energy beam after transmission through the mask.

Figure 28:
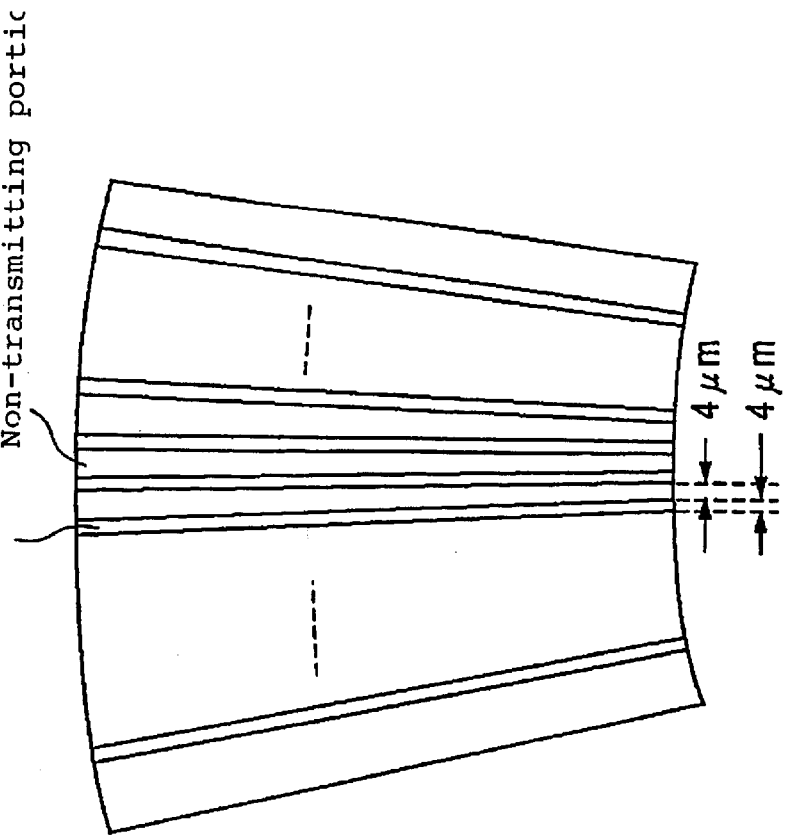
FIGS. 28(a) and 28(b) are diagrams of a mask used in an embodiment of the present invention.
Figure 28:
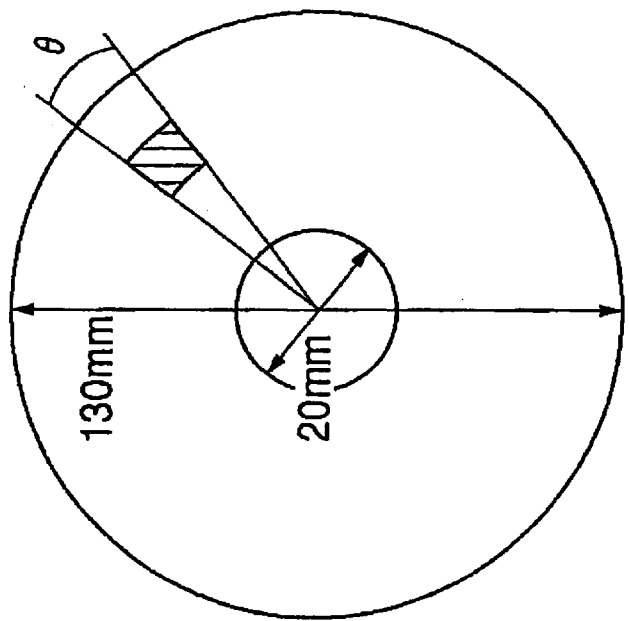

FIG. 28 shows a schematic view of the employed mask. FIG. 28(*a*) shows the entire mask, and FIG. 28(*b*) is an enlarged view of a mask region. The mask is made of quartz glass as the base material and recesses and projections formed by the presence or absence of a Cr layer with a thickness of about 20 nm (the projections correspond to the non-transmitting portions, and the recesses correspond to transmitting portions). The mask has an inner diameter of 20 mm (radius: 10 mm) and an outer diameter of 130 mm (radius: 65 mm) and transmitting portions are patterned within a range of from 40 mm to 50 mm in the radial direction with an angle θ within a range of 5°.

FIG. 28(*b*) shows an enlarged view of the mask that includes 300 (ten mm long) linear transmitting portions that extend in the radial direction. The minimum width in the peripheral direction of the transmitting portions and the non-transmitting portions is 4 μm.

The patterning energy beam was reduced and projected to form a reduced image on the medium surface using a 20 mm diameter imaging lens placed so that the focal point of the above-described condensing lens would be located at the center. The reduction ratio was ¼. Namely, a pattern on the mask was reduced to ¼ of its length and width and projected to form this reduced image on the disk. At the same time, a magnetic field of about 1.5 k Gauss was applied using a permanent magnet in a direction opposite to the initial magnetization in the circumferential direction.

Evaluation of the resultant magnetic pattern was carried out by developing the magnetic pattern using a magnetic developer and observing it under an optical microscope. As a result, it was found that 300 magnetic features with a width of 1 μm were formed.

EXAMPLE 4-2

A magnetic disk was prepared in the same manner as in Example 4-1 and a magnetic pattern was then formed as follows.

The magnetic disk was mounted on the magnetic pattern forming device as shown in FIG. 3 and uniformly magnetized in the circumferential direction of the disk by applying an external 10 k Gauss (10 kOe) magnetic field. Then, the external magnetic field source was changed to the device shown in FIG. 7, and an excimer pulse laser was irradiated using the optical system shown in FIG. 9 to form a magnetic pattern.

In the optical system for pulse laser irradiation, a 4th harmonic wave Q-switch YAG laser source that emits at a wavelength of 266 nm was used as the energy beam source. The beam was emitted with a pulse width of 5 nsec and a beam diameter of 8 mm. One pulse was separated using a programmable shutter, and the intensity was adjusted using an attenuator so that the power at the magnetic disk would be about 50 mJ/cm$^2$. Then, the beam was enlarged to have a beam diameter of 24 mm using a three-fold beam expander.

Then, the beam was condensed so that the intensity distribution of the beam would be uniform at the mask surface using a condensing lens composed of a combination of a planoconvex lens and an aspheric lens having a diameter of 50 mm, to obtain a patterning energy beam via the mask.

The mask employed was substantially the same as shown in FIG. 28, but transmitting portions were patterned within a range covering a radius of from 40 mm to 48 mm and an angle θ=15°. Namely, 800 (eight mm long) linear transmitting portions were formed in the radial direction. The minimum width in the circumferential direction of the transmitting portions and the non-transmitting portions was 4 μm.

The patterning energy beam was reduced and projected to form a reduced image on the medium surface using a 20 mm diameter imaging lens that was placed so that the focal point of the above-described condensing lens would be located at the center. The reduction ratio was ¼. Namely, a pattern on the mask was reduced to ¼ in both length and width and projected to form a reduced image on the disk. At the same time, a magnetic field of about 1.5 k Gauss was applied using a permanent magnet in a direction opposite to the initial magnetization in the circumferential direction.

Evaluation of the formed magnetic pattern was carried out by developing the magnetic pattern using a magnetic developer and observing it under an optical microscope. As a result, it was found that 800 magnetic features with a width of 1 μm were formed.

Further, with respect to the disks of Example 4-1 and 4-2, the presence or absence of damage to the protective layer due to laser irradiation was confirmed by measuring the amount of graphite and diamond using a Raman spectroscopy. If the protective layer is damaged by the laser, the amount of diamond decreases and the amount of graphite increases after the laser irradiation. However, in this Example, the ratio of the amounts did not change from before and to after the irradiation.

Also, with respect to damage (decomposition, polymerization) to the lubricant, the presence or absence of damage was confirmed by measuring the number average molecular weight and the weight average molecular weight before and after laser irradiation. Once again, no difference was observed from before to after the irradiation.

If the method of Examples 4-1 and 4-2 is applied to the formation of a servo pattern of a magnetic disk, it is possible to obtain a magnetic disk that has a highly accurate servo pattern simply and quickly. Further, with a magnetic disk device that employs such a magnetic disk, it is possible to record at a high density and to track with high precision without the need to record a servo pattern anew.

EXAMPLE 5-1

A magnetic disk was prepared in the same manner as in Example 1 except in regard to the preparation of the lubricant layer. The surface roughness Ra was 0.5 nm and the surface undulation Wa was 0.5 nm.

A fluorinated lubricant layer was formed thereon by dip coating. A solution prepared by diluting Fomblin-Z-DOL4000 manufactured by Ausimont Co. with a flon solvent PF5060 was poured into a tank and a disk was dipped therein. Then, the solution was withdrawn at a rate of 10 liter/min to form a lubricant layer. This was baked at 100° C. for 40 minutes and the thickness of the lubricant layer was measured by means of FT-IR and found to be 1.5 nm.

Thus, a longitudinally recording magnetic disk that has a saturation magnetization of 310 emu/cc and a coercive force of 3,000 Oe at room temperature was obtained. The Curie temperature of the recording layer was 250° C.

Then, inspection of defects was carried out using a magnetic head over the entire surface of this magnetic disk.

To form a magnetic pattern, the magnetic disk was then fixed on a spindle and a mask that has transmitting portions with a width of 1 $\mu$m and a length of 15 mm (a radius of from 15 mm to 30 mm) formed radially every 45°, as shown in FIG. 18, was placed on the magnetic disk at a separation distance of about 10 $\mu$m, and the two were rotated at 2 rpm. The mask was made of quartz glass as the base material and had non-transmitting portions formed using a Cr layer with a thickness of 20 nm.

Onto this disk, an excimer pulse laser that has a wavelength of 248 nm was irradiated through the mask. An excimer pulse laser with a pulse width of 25 nsec, a power of 80 mJ/cm$^2$, and a beam diameter of 10 mm$\times$30 mm was repeatedly irradiated at a frequency of 1 Hz for 30 pulses by installing, at the laser irradiation port, a sector shaped shading plate with an angle of 12°. At the same time, a magnetic field of about 2.3 k Gauss was applied using a permanent magnet in a circumferential direction of the magnetic disk in an attempt to print the magnetic pattern.

The presence or absence of the magnetic pattern was confirmed by developing the magnetic pattern using a magnetic developer and observing it under an optical microscope. As a result, it was found that patterns corresponding to the transmitting portions and the non-transmitting portions of the mask were printed on the magnetic disk.

Using FT-IR, the layer thickness of the lubricant was examined and found to have decreased to 1.0 nm. The same fluorinated lubricant as before was deposited using a spin coater while rotating the medium at 80 rpm, and then dried at a rotational speed of 4,000 rpm to recoat the lubricant. After deposition, the lubricant layer thickness was measured using FT-IR and found to be 1.7 nm. This magnetic disk was subjected to CSS testing and no head crush took place until 200,000 times.

Further, a magnetic pattern was formed on a magnetic disk under the same conditions, and the magnetic pattern was reproduced by a MR head for hard disks that has a reproducing element width of 0.9 $\mu$m. Its waveform was confirmed using an oscilloscope. The output of the observed waveform was equal to the output of a magnetic pattern written using a conventional magnetic head.

EXAMPLE 5-2

A magnetic disk was prepared in the same manner as in Example 5-1. An inspection of defects was carried out over the entire surface of the magnetic disk using a magnetic head.

Then, using an ultrasonic cleaning apparatus, the lubricant was removed with a solvent which was used for diluting the lubricant. The film thickness of the lubricant on the disk after sonification was measured using FT-IR, and no lubricant was found to be present.

Onto this magnetic disk, printing of a magnetic pattern in the same manner as in Example 5-1 was attempted.

The presence or absence of the magnetic pattern was confirmed. It was found that the patterns corresponding to transmitting portions and non-transmitting portions of the mask were printed on the magnetic disk.

Then, the same fluorinated lubricant as previously used was coated using a spin coater while rotating the medium at 80 rpm, which was then rotated at 4,000 rpm for drying. The lubricant was hereby re-coated. After coating, the lubricant layer thickness was measured using FT-IR and found to be 1.5 nm.

Further, under the same conditions, a magnetic pattern was formed on a magnetic disk and reproduction was carried out in the same manner as in Example 5-1. The output of the observed waveform was equal to the output of the magnetic pattern written using a conventional magnetic head.

EXAMPLE 5-3

A magnetic disk was prepared in the same manner as in Example 5-1 except that, as a lubricant layer, a fluorinated lubricant was coated with a thickness of 0.7 nm by dip-coating. A solution having Fomblin-Z-DOL4000 manufactured by Ausimont Co. and diluted with a flon solvent PF5060 was poured into a tank and the disk was immersed. Then, the solution was withdrawn at a rate of 5 liter/min to form a lubricant layer which was then baked at 100° C. for 40 minutes. Using FT-IR, the lubricant layer was probed and found to be 0.7 nm thick.

Then, inspection of defects was carried out using a magnetic head over the entire surface of this magnetic disk. 10,000 such magnetic disks were prepared.

On these magnetic disks, the formation of a magnetic pattern was continuously carried out in the same manner as in Example 5-1. The same mask was used without changing it, but no stain of the mask was observed. The following evaluations were performed on the first, the 1,000th, the 3,000th, the 5,000th, and the 10,000th disk.

The presence or absence of a magnetic pattern was confirmed. It was found that with all the disks, patterns corresponding to transmitting portions and non-transmitting portions of the mask were printed on the magnetic disks.

Then, the same fluorinated lubricant as used initially was coated using a spin coater while rotating the medium at 80 rpm. The medium then rotated at 3,000 rpm for drying. After the coating, the lubricant layer thickness was measured using FT-IR and found to be 1.7 nm.

The resultant magnetic pattern was reproduced using a MR head for hard disks that has a reproducing element width of 0.9 $\mu$m and the waveform was observed. The output of the waveform was equal to the output of the magnetic pattern written using a conventional magnetic head. Further, CSS testing was carried out and no head crush took place until 200,000 times.

EXAMPLE 5-4

A magnetic disk was prepared in the same manner as in Example 5-1 except that no lubricant layer was formed. Then, inspection of defects was carried out using a non-contact optical surface inspection apparatus over the entire surface of this magnetic disk.

10,000 such magnetic disks were prepared.

On these magnetic disks, magnetic pattern was continuously formed in the same manner as in Example 5-1. The same mask was used without replacement and no staining of the mask was observed. The following evaluations were performed on the first, the 1,000th, the 3,000th, the 5,000$^{th}$, and the 10,000th disk.

The presence or absence of a magnetic pattern was confirmed. It was found that with all the disks, patterns corresponding to the transmitting portions and non-transmitting portions of the masks were printed on the magnetic disks.

Then, a fluorinated lubricant was dip-coated and baked at 100° C. for 40 minutes. The lubricant layer thickness was measured using FT-IR and found to be 1.5 nm.

The resultant magnetic pattern was reproduced using a MR head for hard disk that has a reproducing element width of 0.9 μm and the waveform was confirmed by an oscilloscope. The output of the observed waveform was equal to the output of the magnetic pattern written using a conventional magnetic head. Further, CSS testing was carried out and no head crush took place up to 200,000 times.

EXAMPLE 5-5

A magnetic disk was prepared in the same manner as in Example 5-1. An inspection of defects was carried out using a magnetic head over the entire surface of this magnetic disk. Printing of a magnetic pattern in the same manner as in Example 5-1 was attempted on this magnetic disk.

The presence or absence of a magnetic pattern was confirmed. It was found that patterns corresponding to the transmitting portions and the non-transmitting portions of the mask were printed onto the magnetic disk.

However, when the thickness of the lubricant layer was examined using FT-IR, the thickness was found to have decreased to 1.0 nm. This magnetic disk was subjected to CSS testing and head crush took place after 20,000 times. It is considered that, as the free portion of the lubricant layer disappeared, the durability became inadequate.

Further, a magnetic pattern was formed on a magnetic disk under the same conditions, and the magnetic pattern was reproduced using a MR head for hard disks that has a reproducing element width of 0.9 μm and the waveform was confirmed using an oscilloscope. The output of the observed waveform was equal to the output of the magnetic pattern written using a conventional magnetic head.

EXAMPLE 5-6

A magnetic disk was prepared in the same manner as in Example 5-1. The thickness of the lubricant layer was 1.5 nm. Then, inspection of defects was carried out using a magnetic head over the entire surface of this magnetic disk. 10,000 such magnetic disks were prepared.

The formation of a magnetic pattern was continuously carried out in the same manner as in Example 5-1 on these magnetic disks. The same mask was used without replacement and deposition on the mask was observed to start after about 3,000 disks.

After completion of 10,000 pieces, the thickness of the deposition on the mask was examined using FT-IR and found to be 0.20 nm. The deposition on the mask used for this printing was subjected to elemental analysis by a secondary ion mass spectroscopy. Carbon and fluorine peaks were detected and the deposition was identified as the lubricant.

The following evaluation was performed on the first, the 1,000th, the 3,000th, the 5,000$^{th}$, and the 10,000th disk.

The presence or absence of a magnetic pattern was ascertained. It was found that on all the disks, patterns corresponding to the transmitting portions and the non-transmitting portions of the mask were printed.

However, when the lubricant layer thickness was measured using FT-IR, the thickness was found to have decreased to 1.0 nm. These magnetic disks were subjected to CSS testing and no head crush took place after 20,000 times. It is considered that, as the free portion of the lubricant layer disappeared, the durability became inadequate.

The formed magnetic pattern was reproduced using a MR head for hard disks that has a reproducing element width of 0.9 μm and the waveform was confirmed by an oscilloscope. The output of the observed waveform gradually decreased in comparison to the output of the magnetic pattern written using a magnetic head. The output was 90% at the 3,000th disk, 85% at the 5,000th disk, and 80% at the 10,000th disk. The signal intensity was also found to have decreased accordingly.

According to the present invention, it is possible to present a method for producing a magnetic recording medium that has a high impact resistance and a high durability. Patterns can be formed efficiently with high precision. Further, it is possible to present a magnetic recording medium and a magnetic recording device that are highly durable and capable of high density recording in a short period of time and at low cost.

What is claimed as new and desired to be secured by Letters Patent in the United States is:

1. A method for forming a magnetic pattern in a magnetic recording medium, comprising:
    obtaining a recording medium including a magnetic layer, a protective layer, and a lubricant layer formed on a substrate;
    heating locally the magnetic layer in said magnetic pattern; and
    applying an external magnetic field to the magnetic layer, wherein
        said heating locally step comprises irradiating the magnetic layer with energy beams having an energy density variation of 15% or less.

2. The method for forming a magnetic pattern according to claim 1, wherein said obtaining step comprises obtaining said recording medium including said lubricant layer having a thickness of 10 nm or less.

3. The method for forming a magnetic pattern according to claim 1, wherein said obtaining step comprises obtaining said recording medium including said protective layer having a thickness of 50 nm or less.

4. The method for forming a magnetic pattern according to claim 3, wherein said obtaining step comprises obtaining said recording medium including said protective layer comprising a carbon material.

5. The method for forming a magnetic pattern according to claim 4, wherein said obtaining step comprises obtaining said recording medium including said protective layer comprising a diamond-like carbon.

6. The method for forming a magnetic pattern according to claim 1, wherein said obtaining step comprises obtaining said recording medium including a surface roughness Ra of 3 nm or less after said heating and applying steps.

7. The method for forming a magnetic pattern according to claim 1, wherein said heating locally step comprises heating locally the magnetic layer in said magnetic pattern comprising a control pattern having information for controlling a recording/reproduction magnetic head.

8. The method for forming a magnetic pattern according to claim 7, wherein said heating locally step comprises heating locally the magnetic layer in said control pattern comprising one of a servo pattern used to control a position of the recording/reproduction magnetic head and a standard pattern used to record the servo pattern.

9. The method for forming a magnetic pattern according to claim 1, wherein the magnetic pattern includes a pattern extending in an oblique direction with respect to a running direction of the magnetic head.

10. The method for forming a magnetic pattern according to claim 1, wherein a minimum width of the magnetic pattern is 2 $\mu$m or less.

11. The method for forming a magnetic pattern according to claim 1, wherein said applying an external magnetic field to the magnetic layer comprises:
magnetizing uniformly said magnetic layer in a predetermined direction by applying a first external magnetic field; and
applying a second external magnetic field to magnetize the magnetic layer in the direction opposite to the predetermined direction during said heating locally step to magnetize a locally heated area.

12. The method for forming a magnetic pattern according to claim 1, wherein said irradiating step comprises irradiating the magnetic layer with pulsed energy beams.

13. The method for forming a magnetic pattern according to claim 12, wherein said irradiating step comprises irradiating the magnetic layer with pulsed energy beams comprising a power per pulse of 1,000 mJ/cm$^2$ or less.

14. The method for forming a magnetic pattern according to claim 1, wherein said irradiating step comprises illuminating a same position of the magnetic layer for 1 $\mu$sec or less with the energy beams.

15. The method for forming a magnetic pattern according to claim 1, further comprising equalizing a spatial intensity distribution of the energy beams prior to said irradiating step.

16. The method for forming a magnetic pattern according to claim 15, wherein said equalizing step comprises:
dividing the energy beams into a plurality of portions; and
overlapping said plurality of portions.

17. The method for forming a magnetic pattern according to claim 1, further comprising transmitting the energy beams onto the magnetic recording medium through a mask.

18. The method for forming a magnetic pattern according to claim 1, further comprising transmitting the energy beams onto the magnetic recording medium through a mask having a transmitting portion configured to transmit a portion of an incident energy beam.

19. The method for forming a magnetic pattern according to claim 17, further comprising separating the mask and the medium by a separation distance over at least a magnetic pattern forming area in the magnetic recording medium.

20. The method for forming a magnetic pattern according to claim 19, wherein the separation distance between the mask and the magnetic recording medium is 0.1 $\mu$m or more.

21. The method for forming a magnetic pattern according to claim 17, further comprising placing a shading plate configured to selectively shield a portion of an incident energy beam over a desired area at a shading plate location, said shading plate location being one of between an energy beam source and the mask and between the mask and the magnetic recording medium.

22. The method for forming a magnetic pattern according to claim 17, further comprising a step of cooling said mask.

23. The method for forming a magnetic pattern according to claim 1, further comprising reducing an image size of a pattern having an intensity distribution corresponding to the magnetic pattern to be formed.

24. The method for forming a magnetic pattern according to claim 23, further comprising changing the intensity distribution of the energy beams to correspond to the image of the magnetic pattern to be formed before said reducing said image size step.

25. The method for forming a magnetic pattern according to claim 24, wherein said changing the intensity distribution step comprises passing said energy beams through a mask having a transmitting portion.

26. The method for forming a magnetic pattern according to claim 23, wherein said obtaining step comprises obtaining said recording medium comprising a magnetic disk having a diameter of 65 mm or less.

27. The method for forming a magnetic pattern according to claim 1, further comprising forming a second lubricant layer atop said recording medium after the heating locally step.

28. The method for forming a magnetic pattern according to claim 1, further comprising taking the center of rotation of the hub structure as a standard during said heating step, wherein the magnetic recording medium comprises a hub structure in a central portion of the substrate.

29. The method for forming a magnetic pattern according to claim 1, wherein said magnetic layer comprises a Co alloy.

30. The method for forming a magnetic pattern according to claim 1, wherein said forming said lubricant layer step is performed after said heating locally step.

31. The method for forming a magnetic pattern according to claim 1, wherein said heating locally step comprises irradiating light onto a diffraction limited spot on said magnetic recording medium.

32. The method for forming a magnetic pattern according to claim 1, wherein said heating locally step comprises irradiating light onto a smaller than 20 $\mu$m spot on said magnetic recording medium.

33. The method for forming a magnetic pattern according to claim 1, wherein said heating locally step comprises irradiating light onto a smaller than 10 $\mu$m spot on said magnetic recording medium.

34. The method for forming a magnetic pattern according to claim 1, wherein said heating locally step comprises irradiating light onto a smaller than 5 $\mu$m spot on said magnetic recording medium.

35. A magnetic recording medium having a magnetic pattern formed by the magnetic pattern forming method described in any one of claims 1–11, 12–14, and 15 to 34.

36. A magnetic recording device comprising:
a magnetic recording medium in which a magnetic pattern is formed by the magnetic pattern forming method described in any one of claims 1 to 11, 12–14, and 15–34;
a driver configured to drive the magnetic recording medium in a recording direction;
a magnetic head including a recording portion and a reproducing portion;
a motion device configured to move the magnetic head relative to the magnetic recording medium; and
a recording/reproduction signal processor configured to supply a recording signal to the magnetic head and receive a reproduction signal from the magnetic head.

37. The magnetic recording device according to claim 36, wherein said magnetic recording device does not comprise an energy beam source.

38. The magnetic recording device according to claim 36, further comprising:
a magnetic pattern reproduced by the magnetic head to produce signals; and
servo burst signals recorded by said magnetic head moving based on the signals, wherein said magnetic pattern is reproduced and said servo burst signals recorded after the magnetic recording medium has been inserted into the magnetic recording device.

39. A magnetic pattern forming device configured to form a magnetic pattern in a magnetic recording medium, said magnetic pattern forming device comprising:
a support device configured to hold the magnetic recording medium;
an external magnetic field source configured to apply an external magnetic field to the magnetic recording medium;
an energy beam source configured to emit energy beams;
a projection device configured to project and transmit the energy beams from the energy beam source onto the magnetic recording medium;
a mask located between the energy beam source and the magnetic recording medium and configured to change the intensity distribution of the energy beams in accordance with a desired magnetic pattern; and
an intensity distribution equalizer configured to equalize a spatial intensity distribution of the energy beams emitted from the energy beam source disposed between the energy beam source and the projection device, and to divide the energy beams into a plurality of portions and overlap the divided portions.

40. The magnetic pattern forming device according to claim 39, wherein the mask comprises a transmitting portion configured to selectively transmit a part of the energy beams.

41. The magnetic pattern forming device according to claim 39, wherein the energy beam source comprises a pulsed laser beam source.

42. The magnetic pattern forming device according to claim 39, wherein the mask is disposed between the intensity distribution equalizer and the magnetic recording medium.

43. The magnetic pattern forming device according to claim 39, wherein the projection device comprises an image forming device located between the mask and the magnetic recording medium and is configured to reduce an image size of a pattern of an intensity distribution of said energy beams to form thereby a reduced image in the medium surface.

44. The magnetic pattern forming device according to claim 43, further comprising a condenser lens disposed between the energy beam source and the mask.

45. The magnetic pattern forming device according to claim 39, further comprising a cooling device configured to cool said mask.

46. A method for producing a magnetic recording medium, comprising:
forming a magnetic layer and a protective layer in that order on a substrate;
forming a lubricant layer on the protective layer; and
forming a magnetic pattern in the magnetic layer, including heating locally the magnetic layer and applying an external magnetic field, wherein
said heating locally comprises irradiating the magnetic layer with energy beams having an energy density variation of 15% or less.

47. The method for producing a magnetic recording medium according to claim 46, wherein the forming the lubricant layer step is performed after the forming the magnetic pattern step.

48. The method for producing a magnetic recording medium according to claim 47, wherein said forming the lubricant layer step comprises:
forming a first lubricant layer on the protective layer prior to the forming of the magnetic pattern step; and
forming a second lubricant layer on at least one of the protective layer and the first lubricant layer after the forming of the magnetic pattern step.

49. The method for producing a magnetic recording medium according to claim 48, further comprising inspecting the magnetic recording medium with a magnetic head prior to the forming of the magnetic pattern step and after the forming the first lubricant layer step.

50. The method for producing a magnetic recording medium according to claim 46, wherein said forming a magnetic pattern step comprises taking the center of rotation of a hub structure as standard, wherein the magnetic recording medium includes the hub structure in a central portion of the substrate.

51. A magnetic recording medium produced by the method described in any one of claims 46 to 50.

52. A magnetic recording device comprising:
a magnetic recording medium produced by the method described in any one of claims 46 to 50;
a driver configured to drive the magnetic recording medium in a recording direction;
a magnetic head including a recording portion and a reproducing portion;
a motion device configured to move the magnetic head relative to the magnetic recording medium; and
a recording/reproduction signal processor configured to supply a recording signal to the magnetic head and receive a reproduction signal from the magnetic head.

53. The magnetic recording device according to claim 52, further comprising:
a magnetic pattern reproduced by the magnetic head to produce signals; and
servo burst signals recorded by the magnetic head, moving based on said signals,
wherein the magnetic pattern is reproduced and the servo burst signals recorded after the magnetic recording medium has been inserted into the magnetic recording device.

54. A method for forming a magnetic pattern in a magnetic recording medium, comprising:
obtaining a recording medium including a magnetic layer, a protective layer, and a lubricant layer formed sequentially on a substrate;
heating locally the magnetic layer in said magnetic pattern by irradiating the magnetic layer with energy beams through a mask separated from the medium by a separation distance over at least a magnetic pattern forming area in the magnetic recording medium, said magnetic pattern forming one of a servo pattern used to control a position of the recording/reproduction magnetic head and a standard pattern used to record the servo pattern; and
applying an external magnetic field to the magnetic layer including magnetizing uniformly said magnetic layer in a predetermined direction by applying a first external magnetic field and applying a second external magnetic field to magnetize the magnetic layer in the direction opposite to the predetermined direction s during said heating locally step to magnetize a locally heated area, wherein said heating locally step comprises irradiating the magnetic layer with energy beams having an energy density variation of 15% or less.

55. A magnetic recording medium having a magnetic pattern formed by a method comprising:

obtaining a recording medium including a magnetic layer, a protective layer, and a lubricant layer formed sequentially on a substrate;

heating locally the magnetic layer in said magnetic pattern by irradiating the magnetic layer with energy beams through a mask separated from the medium by a separation distance over at least a magnetic pattern forming area in the magnetic recording medium, said magnetic pattern forming one of a servo pattern used to control a position of the recording/reproduction magnetic head and a standard pattern used to record the servo pattern; and applying an external magnetic field to the magnetic layer including magnetizing uniformly said magnetic layer in a predetermined direction by applying a first external magnetic field and applying a second external magnetic field to magnetize the magnetic layer in the direction opposite to the predetermined direction during said heating locally step to magnetize a locally heated area, wherein said heating locally step comprises irradiating the magnetic layer with energy beams having an energy density variation of 15% or less.

56. A magnetic recording device comprising:

a magnetic recording medium in which a magnetic pattern is formed by a method including obtaining a recording medium including a magnetic layer, a protective layer, and a lubricant layer formed sequentially on a substrate, heating locally the magnetic layer in said magnetic pattern by irradiating the magnetic layer with energy beams through a mask separated from the medium by a separation distance over at least a magnetic pattern forming area in the magnetic recording medium, said magnetic pattern forming one of a servo pattern used to control a position of the recording/reproduction magnetic head and a standard pattern used to record the servo pattern, and applying an external magnetic field to the magnetic layer including magnetizing uniformly said magnetic layer in a predetermined direction by applying a first external magnetic field and applying a second external magnetic field to magnetize the magnetic layer in the direction opposite to the predetermined direction during said heating locally step to magnetize a locally heated area, wherein said heating locally step comprises irradiating the magnetic layer with energy beams having an energy density variation of 15% or less;

a driver configured to drive the magnetic recording medium in a recording direction;

a magnetic head including a recording portion and a reproducing portion;

a motion device configured to move the magnetic head relative to the magnetic recording medium; and a recording/reproduction signal processor configured to supply a recording signal to the magnetic head and receive a reproduction signal from the magnetic head.

57. A magnetic recording device comprising:

a magnetic recording medium in which a magnetic pattern is formed by the magnetic pattern forming method described in any one of claims 1–11, 12–14, and 15 to 34, means for driving the magnetic recording medium in a recording direction;

a magnetic head including a means for recording portion and a means for reproducing portion;

means for moving the magnetic head relative to the magnetic recording medium; and means for processing recording/reproduction signals by supplying a recording signal to the magnetic head and receiving a reproduction signal from the magnetic head.

58. A magnetic pattern forming device for forming a magnetic pattern in a magnetic recording medium, said magnetic pattern forming device comprising:

means for supporting the magnetic recording medium;

means for applying an external magnetic field to the magnetic recording medium;

means for emitting energy beams;

means for projecting and transmitting the energy beams from the means for emitting onto the magnetic recording medium;

means for changing the intensity distribution of the energy beams in accordance with a desired magnetic pattern; and means for equalizing a spatial intensity distribution of the energy beams emitted from the means for emitting disposed between the means for emitting and the means for projecting and transmitting, said means for equalizing including means for dividing the energy beams into a plurality of portions and overlapping the divided portions.

59. A magnetic recording device comprising:

a magnetic recording medium in which a magnetic pattern is formed by a method including obtaining a recording medium including a magnetic layer, a protective layer, and a lubricant layer formed sequentially on a substrate, heating locally the magnetic layer in said magnetic pattern by irradiating the magnetic layer with energy beams through a mask separated from the medium by a separation distance over at least a magnetic pattern forming area in the magnetic recording medium, said magnetic pattern forming one of a servo pattern used to control a position of the recording/reproduction magnetic head and a standard pattern used to record the servo pattern, and applying an external magnetic field to the magnetic layer including magnetizing uniformly said magnetic layer in a predetermined direction by applying a first external magnetic field and applying a second external magnetic field to magnetize the magnetic layer in the direction opposite to the predetermined direction during said heating locally step to magnetize a locally heated area, wherein said heating locally step comprises irradiating the magnetic layer with energy beams having an energy density variation of 15% or less;

means for driving the magnetic recording medium in a recording direction;

a magnetic head including a means for recording portion and a means for reproducing portion;

means for moving the magnetic head relative to the magnetic recording medium; and a means for processing recording/reproduction signals by supplying a recording signal to the magnetic head and receiving a reproduction signal from the magnetic head.

60. A magnetic recording device comprising:

a magnetic recording medium produced by the method described in any one of claims 46 to 50;

means for driving the magnetic recording medium in a recording direction;

a magnetic head including a means for recording and a means for reproducing; means for moving the magnetic head relative to the magnetic recording medium; and means for processing recording/reproduction signals by supplying a recording signal to the magnetic head and receiving a reproduction signal from the magnetic head.

* * * * *